US008724731B2

(12) United States Patent
Hahn et al.

(10) Patent No.: US 8,724,731 B2
(45) Date of Patent: May 13, 2014

(54) METHODS AND SYSTEMS FOR NOISE AND INTERFERENCE CANCELLATION

(75) Inventors: Wilhelm Steffen Hahn, Los Altos, CA (US); Wei Chen, Newark, CA (US)

(73) Assignee: Intersil Americas Inc., Milpitas, CA (US)

( * ) Notice: Subject to any disclaimer, the term of this patent is extended or adjusted under 35 U.S.C. 154(b) by 778 days.

(21) Appl. No.: 13/014,681

(22) Filed: Jan. 26, 2011

(65) Prior Publication Data
US 2011/0211649 A1 Sep. 1, 2011

Related U.S. Application Data

(60) Provisional application No. 61/308,697, filed on Feb. 26, 2010, provisional application No. 61/375,491, filed on Aug. 20, 2010.

(51) Int. Cl.
H04B 15/00 (2006.01)
(52) U.S. Cl.
USPC ........................................... 375/285; 375/284
(58) Field of Classification Search
CPC ................ H04L 25/0305; H04L 2025/03611; H04L 2025/0367; H04L 2025/0349; H04L 2025/03343; H04L 25/063; H04L 1/0026; H04B 3/32
USPC ................ 375/285, 287, 148, 295; 455/67.13
See application file for complete search history.

(56) References Cited

U.S. PATENT DOCUMENTS

| 5,737,035 | A | 4/1998 | Rotzoll |
| 6,131,013 | A | 10/2000 | Bergstrom et al. |
| 6,441,843 | B1 | 8/2002 | Limberg |
| 6,915,112 | B1 * | 7/2005 | Sutton et al. ............... 455/67.13 |
| 6,968,171 | B2 | 11/2005 | Vanderhelm et al. |
| 7,336,745 | B2 | 2/2008 | Casabona et al. |
| 7,423,699 | B2 | 9/2008 | Vorenkamp et al. |
| 7,515,895 | B2 | 4/2009 | Vorenkamp et al. |
| 7,538,621 | B2 | 5/2009 | Birleson et al. |
| 7,619,282 | B2 | 11/2009 | Yamazaki et al. |
| 2005/0153677 | A1 | 7/2005 | Vorenkamp et al. |
| 2005/0180520 | A1 * | 8/2005 | Kim et al. ...................... 375/287 |
| 2005/0270094 | A1 | 12/2005 | Nakatani |
| 2006/0013289 | A1 * | 1/2006 | Hwang ......................... 375/148 |
| 2007/0218850 | A1 | 9/2007 | Pan |

* cited by examiner

Primary Examiner — Daniel Washburn
Assistant Examiner — Fitwi Hailegiorgis
(74) Attorney, Agent, or Firm — King & Spalding

(57) ABSTRACT

Signals propagating from an aggressor communication channel can cause detrimental interference in a victim communication channel. One or more noise cancellers can generate an interference compensation signal to suppress or cancel the interference based on one or more settings. A controller can execute algorithms to find preferred settings for the noise canceller(s). The controller can use a feedback signal (e.g., receive signal quality indicator) received from a victim receiver during the execution of the algorithm(s) to find the preferred settings. One exemplary algorithm includes sequentially evaluating the feedback resulting from a predetermined list of settings. Another algorithm includes determining whether to move from one setting to the next based on the feedback values for both settings. Yet another algorithm includes evaluating a number of sample settings to determine which of the sample settings result in a better feedback value and searching around that sample setting for a preferred setting.

24 Claims, 32 Drawing Sheets

METHODS AND SYSTEMS FOR NOISE AND INTERFERENCE CANCELLATION

CROSS REFERENCE TO RELATED APPLICATIONS

This patent application claims to the benefit of U.S. Provisional Patent Application No. 61/308,697, entitled "High Power Cascaded Filter Based Noise Canceller" and filed Feb. 26, 2010. This application also claims to the benefit of U.S. Provisional Patent Application No. 61/375,491, entitled "Methods and Systems for Noise and Interference Cancellation" and filed Aug. 20, 2010. This application is related to U.S. patent application Ser. No. 13/014,657, entitled "Cascaded Filter Based Noise and Interference Canceller," filed on the same date as this application. The entire contents of each of the foregoing priority and related applications are hereby fully incorporated herein by reference.

BRIEF DESCRIPTION OF THE DRAWINGS

FIG. 14, depict a flow chart of a method for calibrating a Q-Enhanced-BPF of the HIPCF canceller of FIG. 2, in accordance with certain exemplary embodiments.

Figure 1:
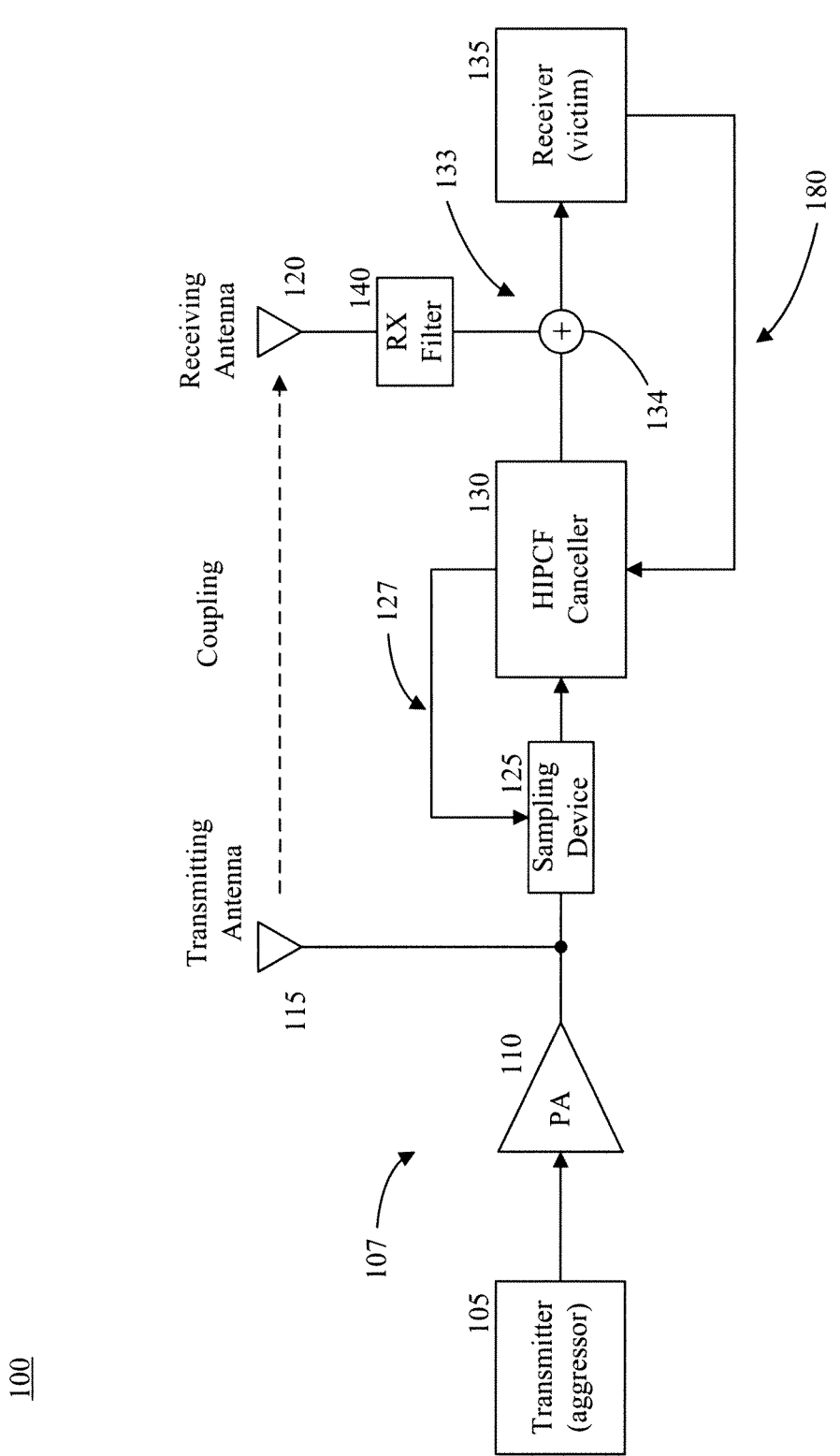
FIG. 1 is a functional block diagram of a communication system, in accordance with certain exemplary embodiments.

Many aspects of the invention can be better understood with reference to the above drawings. The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements.

DETAILED DESCRIPTION OF EXEMPLARY EMBODIMENTS

The present invention is directed to systems and methods for compensating for signal interference occurring between two or more communication channels or between two or more communication elements in a communication system. Compensating for interference can improve signal quality, enhance communication bandwidth or information carrying capability, or improve receiver sensitivity. A communication channel may comprise a transmission line, a printed circuit board (PCB) trace, a flex circuit trace, an electrical conductor, a waveguide, a bus, a communication antenna, a medium that provides a signal path, or an active or passive circuit or circuit element such as a filter, oscillator, diode, VCO, PLL, amplifier, digital or mixed signal integrated circuit. Thus, a channel can comprise a global system for mobile communications (GSM) device, a processor, a detector, a source, a diode, an inductor, an integrated circuit, a connector, a circuit trace, or a digital signal processing (DSP) chip, to name only a few possibilities.

Exemplary embodiments described herein can include a high input power cascaded filter (HIPCF) noise and interference canceling device. Exemplary HIPCF cancellers described herein can support selectively canceling, correcting, addressing, or compensating for interference, electromagnetic interference (EMI), noise (e.g., phase noise, intermodulation products, and other interfering noise), spurs, or other unwanted spectral components associated with one or more communication paths of a communication system, such as a high speed digital communication system in a portable electronic device. For the purpose of this specification, the term "high power" generally refers to signals having a power ratio up to approximately +33 dBm (decibels relative to one milliwatt) or more. For example, exemplary HIPCF cancellers described herein can be coupled to the output of cellular telephone power amplifiers having output power of this magnitude.

The HIPCF cancellers can obtain a sample of a communication signal that imposes interference from a communication path of an aggressor transmitting device and process the sampled signal to produce an interference compensation signal. The HIPCF can deliver the interference compensation signal into or onto a communication path of a victim receiver that is a recipient of the interference, to cancel, mitigate, suppress, or otherwise compensate for the received interference.

Turning now to the drawings, in which like numerals indicate like or corresponding (but not necessarily identical) elements throughout the figures, exemplary embodiments of the invention are described in detail. FIG. 1 is a functional block diagram of a communication system 100, in accordance with certain exemplary embodiments. Referring to FIG. 1, the communication system 100 includes a transmitter 105 that transmits electromagnetic signals via a transmitting antenna 115. A transmit path 107, including one or more electrical conductors, couples the transmitter 105 to the transmitting antenna 115. In certain exemplary embodiments, the transmitter 105 conveys data to a remote device using one or more communications standards or methods, such as the Global System for Mobile Communications (GSM), Code Division Multiple Access (CDMA), Long Term Evolution (LTE), Wideband Code Division Multiple Access (W-CDMA), Digital Cellular System (DCS), Personal Communication Service (PCS), and Wireless Local Area Network (WLAN). One of ordinary skill in the art having the benefit of the present disclosure would appreciate that the communication system 100 described herein is not limited to the aforementioned communication standards and methods, but instead can be used with many other types of signal transmitting technologies.

Disposed along the transmit path 107 between the transmitter 105 and the transmitting antenna 115 is a power amplifier 110. The power amplifier 110 adjusts the power level of the transmitter's output signals prior to the signals being propagated by the antenna 115. When a power amplifier 110 adjusts the power level of a signal, unwanted spectral components can be introduced onto the signal. For example, the transmitter 105 can transmit signals having a certain carrier frequency or a certain fundamental tone. The power amplifier 110 can introduce intermodulation products having a different frequency than that carrier frequency or fundamental tone. Other components associated with the transmitter 105 also can cause noise or other unwanted spectral components to be introduced onto the signal. For example, the transmitter 105 may include a local oscillator and/or one or more up-conversion mixer(s) that can cause unwanted spectral components, including out-of-band noise (outside the frequency band of the transmitted signal) sometimes referred to as out-of-band blockers, to be introduced onto the signal.

The communication system 100 also includes a receiver 135 that receives signals via a receiving antenna 120 and a receive path 133 that electrically couples the receiving antenna 120 to the receiver 135. In certain exemplary embodiments, the receiver 135 receives signals within the same or a different frequency band than that of the transmitter 105. For example, a mobile electronic device, such as a mobile telephone, personal digital assistant (PDA) or mobile computer, may include a transmitter 105 that communicates via one of the communication protocols discussed above and a receiver 135 that communicates in a different frequency band, such as a mobile TV tuner, a Bluetooth receiver, a Worldwide Interoperability for Microwave Access (WiMAX) receiver, or a Global Positioning System (GPS) receiver. In the illustrated embodiment, the receive path 133 includes an optional receive (RX) filter 140. The optional receive filter 140 can include a band-pass filter or other filter arrangement that allows communication signals received by the antenna 120 within the frequency band of the receiver 135 to pass to the receiver 135, while blocking signals outside the frequency band of the receiver 135.

The frequency band of the receiver 135 may be near the frequency band of the transmitter 105 such that phase noise or other unwanted spectral components produced by the power amplifier 110 or another component disposed along the transmit path 107 degrades the sensitivity of the receiver 135. For example, the communication system 100 may be embodied in a mobile device having a CDMA, GSM or LTE transmitter 105 and a mobile TV tuner as receiver 135. Certain types of CDMA and GSM transmitters 105 transmit signals within a frequency band of approximately 800 MHz to 900 MHz and certain types of LTE transmitters 105 operate within a frequency band of 698 MHz to 798 MHz. These transmitted signals often include phase noise having a frequency between 450 MHz and 776 MHz, which falls within the receive band of some mobile TV tuners and many other communication devices. If this in-band phase noise is imposed onto the signal path of the receiver 135 (e.g., air coupled from the transmitting antenna 115 to the receiving antenna 120), the phase noise can degrade the sensitivity of the receiver 135. Generally, receive filters, such as receive filter 140, do not filter out in-band noise as the noise is within the frequency band of the receiver 135 and thus, the pass-band of receive filter 140. Therefore, the phase noise may pass through the receive filter 140 and degrade the sensitivity of the receiver 135.

To prevent a degradation of the sensitivity of the receiver 135 caused by in-band noise (noise having a frequency within the frequency band of the receiver 135) or nearby out-of-band noise caused by the transmissions from the transmitting antenna 115, the communication system 100 includes a HIPCF canceller 130. An input of the HIPCF canceller 130 is coupled to the transmit path 107 at the output of the power amplifier 110 by way of a sampling device 125. The sampling device 125 can include a capacitor, (e.g., a sampling or tapping capacitor), a resistor, a coupler, a coil, a transformer, a signal trace, or an antenna/detector. Sampling devices having two ports or two terminals, such as a resistor, capacitor, coil, transformer, or signal trace, can have a first port electrically coupled to the transmit path 107 and a second port electrically coupled to the input of the HIPCF canceller 130. In an antenna/detector, having mostly one terminal, the second terminal is formed by the electromagnetic field protruding from the device, allowing for locating the device close to the transmit path 107.

In the illustrated embodiment, the sampling device 125 is connected to the transmit path 107 at the output of the power amplifier 110. The sampling device 125 obtains samples of the signal ("sampled transmit signals") at the output of the power amplifier 110 and provides the sampled transmit signals to the HIPCF canceller 130. In certain exemplary embodiments, the sampling device 125 may produce attenuation on the sampled transmit signals. For example, the amplitude of the sampled transmit signal may be 20 dBc (decibels relative to carrier) lower than the signal at the output of the power amplifier 110.

In certain exemplary embodiments, the sampling device 125 includes a voltage-controlled capacitor (varactor) for trimming frequency dependent attenuation to a desired value and hence, compensate for gain ripple. In one example, the sampling device 125 includes a voltage controlled varactor. The capacitance of the varactor can be adjusted via a control voltage. This control voltage can be generated by a controller 235 (FIG. 2) of the HIPCF Canceller 130 and transmitted to the sampling device 125 via one or more electrical conductors 127.

The HIPCF canceller 130 selectively suppresses or cancels interfering signals (e.g., phase noise, intermodulation products, unwanted spectral components, etc.) produced by the power amplifier 110 (or another component along the transmit path 107) having a frequency within or near the receive frequency band of the receiver 135 that would otherwise interfere with the sensitivity of the receiver 135. The HIPCF canceller 130 obtains samples of the signals output by the power amplifier 110 and processes the sampled transmit signals to produce an interference compensation signal that, when applied to an input of the receiver 135, suppresses or cancels the interfering signals. In certain exemplary embodiments, the HIPCF canceller 130 tunes the interference compensation signal using feedback, such as a receive signal quality indicator, obtained from the receiver 135 via a feedback path 180 including one or more electrical conductors. The exemplary HIPCF canceller 130 is described in further detail below in connection with FIGS. 2-31.

The interference compensation signal is applied to the receive path 133 of the receiver 135 at a cancellation point 134. In certain exemplary embodiments, the cancellation point 134 is implemented by converging an electrical conductor of the receive path 133 with an electrical conductor along the output path of the HIPCF canceller 130 such that the electrical conductors make electrical contact. For example, a flex circuit trace of the receive path 134 may be connected to a flex circuit trace of the HIPCF output. In certain exemplary embodiments, a component, such as a coupler, a summation node, an adder, or another suitable technology may be used to apply the interference compensation signal to the receiver path 133 of the receiver 135.

The communication system 100 illustrated in FIG. 1 can transmit electromagnetic signals having a frequency within a first frequency range and receive electromagnetic signals having a frequency within a second frequency range. The first frequency range may be close to the second frequency range or even include frequencies that overlap or are included in the second frequency range. In operation, the transmitter 105 transmits signals along the transmit path 107 to the power amplifier 110. The power amplifier 110 adjusts the intensity of the signals received from the transmitter 105 and outputs the intensity adjusted signal to the transmitting antenna 115. The transmitting antenna 115 transmits the signals received from the power amplifier 110. A portion of the signals transmitted by the transmitting antenna 115 is coupled to the receiving antenna 120 via air. If received by the receiver 135, signals coupled onto the receiving antenna 120 originating from the transmitting antenna 105 may interfere with or degrade the sensitivity of the receiver 135. For example, signals transmitted by the transmitting antenna 115 having a frequency within the frequency band or close to the frequency band of the receiver 135 (e.g., intermodulation spectra appearing like phase noise tails generated by the power amplifier 110) can degrade the sensitivity of the receiver 135. To compensate for this interference or sensitivity degradation, the HIPCF canceller 130 obtains samples of the signals output by the power amplifier 110 (via the sampling device 125) and processes the sampled transmit signals to produce an interference compensation signal that, when applied to an input of the receiver 135, compensates for the interference imposed on the receiver 135 by the signals transmitted by transmitting antenna 115.

Figure 2:
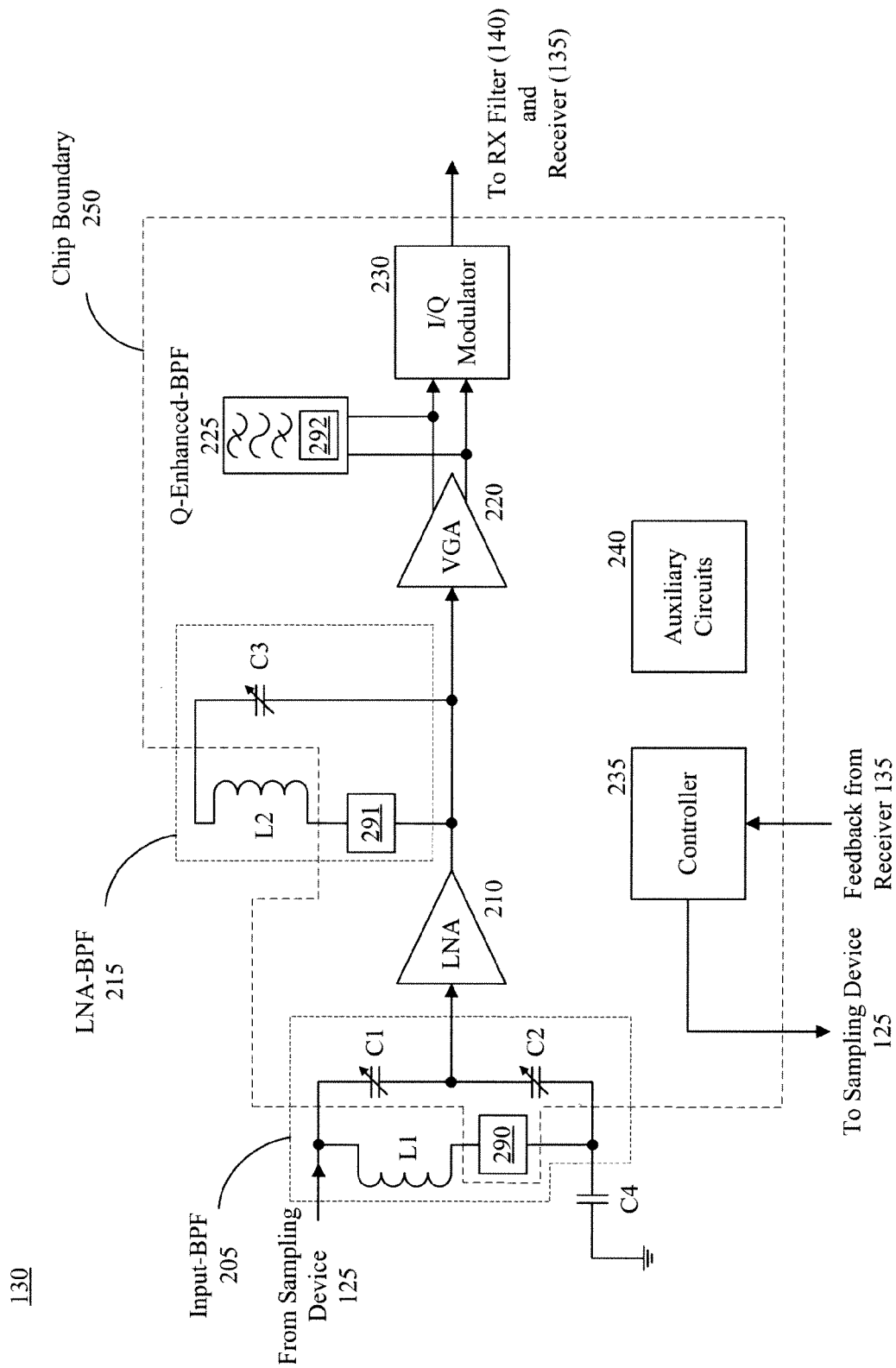
FIG. 2 is a block schematic diagram of a high input power cascaded filter (HIPCF) canceller, in accordance with certain exemplary embodiments.

FIG. 2 is a block schematic diagram of the HIPCF canceller 130 of FIG. 1, in accordance with certain exemplary embodiments. The exemplary HIPCF canceller 130 includes a band-pass filter (Input-BPF) 205 that receives signal samples from the sampling device 125. In this exemplary embodiment, the Input-BPF 205 includes an inductor L1 and two switchable capacitors C1 and C2. The resonant frequency of the Input-BPF 205 is tunable by adjusting capacitance of one or both of the switchable capacitors C1 and C2. The switchable capacitors C1 and C2 are described in further detail below in connection with FIG. 3.

In certain exemplary embodiments, the inductor L1 is a high-Q inductor. The use of a high-Q inductor can provide performance advantages, such as providing additional attenuation to signals outside of the pass band of the Input-BPF 205 and hence to protect subsequent components in the HIPCF canceller 130, allowing to trade linearity for a lower noise floor. In certain exemplary embodiments, the inductor L1 is a low-Q inductor. In certain exemplary embodiments, the Input-BPF 205 includes a Q-enhancement circuit 290 to improve the quality factor (Q-factor) of the inductor L1. However, some Q-enhancement circuits may introduce noise or interference onto signals passed through the Input-BPF 205.

The resonant frequency of the Input-BPF 205 can be tuned to (or near) the receive frequency of the receiver 135 in order to pass interfering signals at that frequency that may be present on the sampled transmit signals and block or filter out aggressor signals, such as fundamental tones or carrier signals transmitted by the transmitter 105 as well as other out-of-band blocker signals (signals having a frequency outside of the receiver's frequency band). If the receiver 135 includes a mobile TV tuner or other frequency adjustable device, the resonant frequency of the Input-BPF 205 may be adjusted to match the frequency of a current channel to which the mobile TV tuner is set. For example, channel 50 of a mobile TV tuner may have a receive frequency within the frequency band of 686 MHz to 692 MHz. While the mobile TV is tuned to this frequency, the Input-BPF 205 also can be tuned to this frequency automatically. If the mobile TV is subsequently tuned to another channel having a different receive frequency, the resonant frequency of the Input-BPF 205 can be adjusted to match the receive frequency of the new channel. For example, the controller 235 may communicate with the receiver 135 to obtain the current receive frequency for the receiver 135. In response, the controller 235 may adjust the switchable capacitors C1 and C2 such that the resonant frequency of the Input-BPF 205 is close to or equal to the receive frequency.

The Input-BPF 205 reduces the amplitude of signals having frequencies differing from the resonant frequency of the Input-BPF 205. For example, if the receiver 135 and the transmitter 105 are operating at different frequencies, the Input-BPF 205 can reduce the amplitude of the fundamental tones of the sampled transmit signal. In certain exemplary embodiments, the Input-BPF 205 may reduce the amplitude of the fundamental tones of the sampled transmit signal located at 824 MHz by approximately 13-18 dBc while its center frequency is tuned to 749 MHz (corresponding to channel 60 of a mobile TV tuner). The output of the Input-BPF 205 is electrically coupled to a low noise amplifier (LNA) 210. The LNA 210 amplifies the signal output by the Input-BPF 205 and passes this amplified signal to a second band-pass filter, referred to herein as LNA-BPF 215. In certain exemplary embodiments, the LNA 210 is a cascode LNA.

In this exemplary embodiment, the LNA-BPF 215 includes an inductor L2 and a switchable capacitor C3. In certain exemplary embodiments, the inductor L2 is a high-Q inductor. In certain exemplary embodiments, the inductor L2 is a low-Q inductor. In certain exemplary embodiments, the LNA-BPF 215 includes a Q-enhancement circuit 291 to improve the Q-factor of the inductor L2. In certain exemplary embodiments, the Q-factor of L2 is less than the Q-factor of L1. In certain exemplary embodiments, the Q-factor of L2 is greater than the Q-factor of L2.

Similar to the Input-BPF 205, the resonant frequency of the LNA-BPF 215 can be set to the receive frequency of the receiver 135 to pass signals at that frequency and to further filter the fundamental tones and out-of-band blockers from the sampled transmit signal. In certain exemplary embodiments, the LNA-BPF 215 may further reduce the amplitude of the fundamental tones located at 824 MHz by approximately 13-18 dBc while its center frequency is tuned to 749 MHz.

The output of the LNA-BPF 215 is electrically coupled to a variable gain amplifier (VGA) 220 that adjusts the amplitude of signals output by the LNA-BPF 215. In certain exemplary embodiments, the VGA 220 includes multiple variable gain amplifiers for adjusting the amplitude of the signal received from the LNA-BPF 215. The amplitude adjusted signal output by the VGA 220 is then passed to a third band-pass filter (Q-Enhanced-BPF) 225.

The Q-Enhanced-BPF 225 can include an inductor L3 and a switchable capacitor 615 (FIG. 6) for tuning the Q-Enhanced-BPF 225 to the receive frequency of the receiver 135 to pass any signals at that frequency and to further filter the fundamental tones and out-of-band blockers of the sampled transmit signal. In certain exemplary embodiments, the inductor L3 can be a high-Q inductor (e.g., off-chip), or a low-Q on-chip spiral inductor. In certain exemplary embodiments, the Q-Enhanced-BPF 225 also includes a Q-enhancement circuit 292. In certain exemplary embodiments, the Q-Enhanced-BPF 225 includes current switching (FIG. 6) to adjust its Q-factor. In certain exemplary embodiments, the Q-Enhanced-BPF 225 can further reduce the amplitude of the fundamental tones remaining in the signal received from the VGA 220 located at 824 MHz by up to 26 dBc or more while its center frequency is tuned to 749 MHz. The output of the Q-Enhanced BPF 225 is electrically coupled to an I/Q modulator 230.

Although in the illustrated embodiment, a cascade of band-pass filters 205, 215, and 225 are used to filter noise or other signals having frequencies outside the frequency band of the receiver 135, other types of filters may be utilized in addition to or in place of one or more of the band-pass filters 205, 215, and 225. For example, one or more high-pass and/or low-pass filters can be used in certain exemplary embodiments. The cascade of band-pass filters 205, 215, 225 block or reduce the amplitude of signals outside of the receive frequency band of the receiver 135 which would normally not interfere with the receiver's sensitivity. The signals within the receive frequency band of the receiver 135 are passed through the band-pass filters 205, 215, and 225 to the I/Q modulator 230. These in-band signals are also amplified by the LNA 210 and the VGA 220.

The I/Q modulator 230 adjusts at least one of the phase, amplitude, and delay of the signal received from the Q-Enhanced-BPF 225 to produce an interference compensation signal that, when applied to the receive path 133 of the receiver 135, reduces, suppresses, cancels, or otherwise compensates for the noise and/or interference present on the received path 133 of the receiver 135 imposed by signals transmitted by the transmitting antenna 115. In certain exemplary embodiments, this interference compensation signal has a 180 degree phase shift relative to that of the in-band noisy signal and an amplitude close to or the same as that of the in-band noisy signal. Thus, the interference compensation signal reduces or cancels the in-band noisy signal.

In certain exemplary embodiments, the aforementioned parameters of amplitude, phase, and delay are tuned based on a set of instructions (e.g., algorithms) stored in a memory device 760 (FIG. 7) and executed by the controller 235 using feedback from the victim receiver's receive signal quality indicator, such as Bit-Error-Rate (BER), Packet-Error-Rate (PER), Receive Signal Strength Indicator (RSSI), noise floor, Signal-Noise-Ratio (SNR), Error Vector Magnitude (EVM), and Position Accuracy (for GPS) etc. Exemplary algorithms for determining settings for adjusting the amplitude, phase, and delay are described below with reference to FIGS. 17-31.

Figure 7:
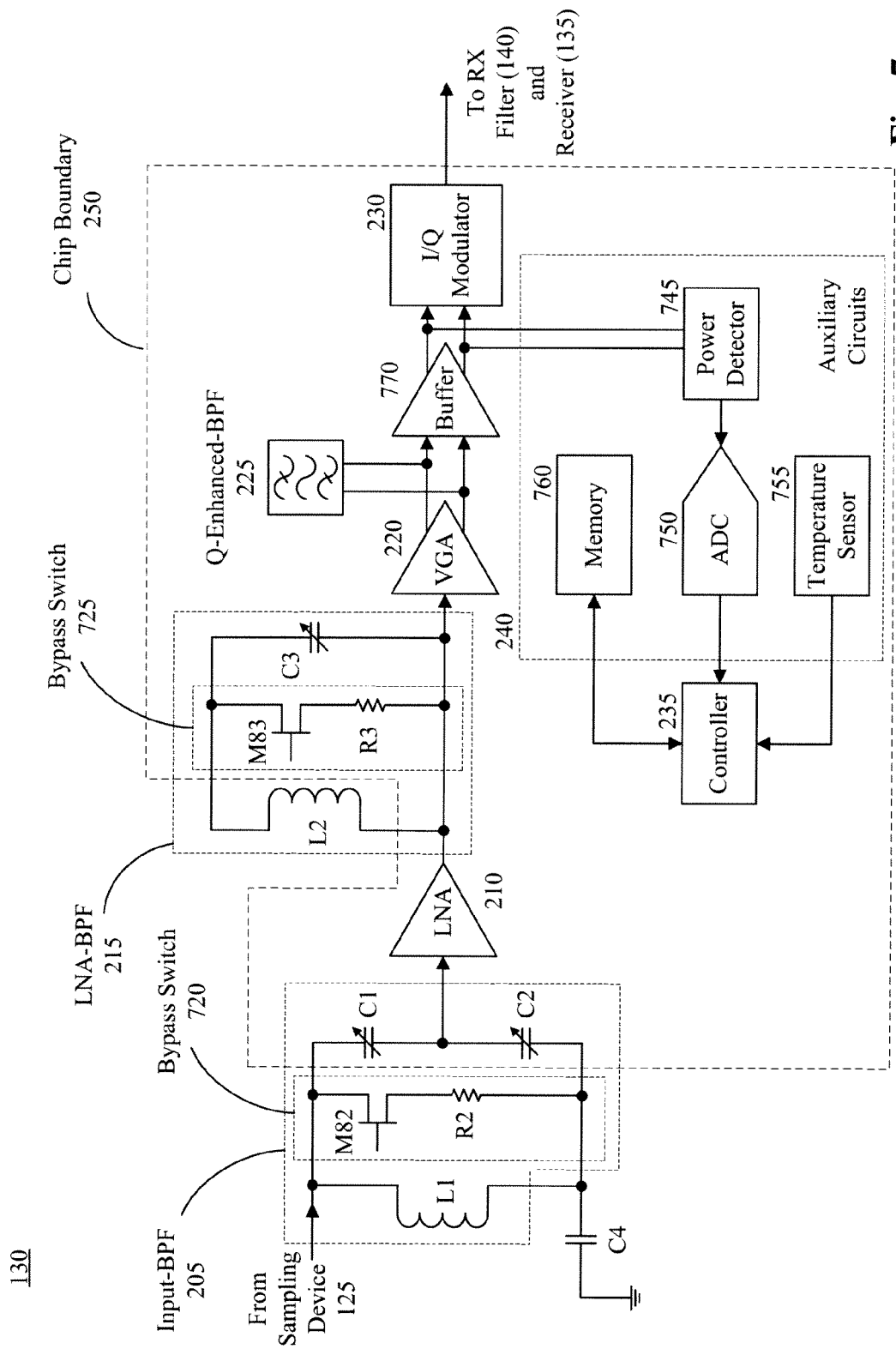
FIG. 7 is a block schematic diagram illustrating additional components of the HIPCF canceller of FIG. 2, in accordance with certain exemplary embodiments.

As shown in FIG. 7, in certain exemplary embodiments, the HIPCF canceller 130 includes a power detector 745, such as a peak detector, coupled to the input of the I/Q modulator 230. The power detector 745 senses or measures the power level of the signal at the input of the I/Q modulator 230 and provides an indication of the power level to the controller 235. The controller 235 uses this power level value to trim the currents and hence $Q_{max}$ of the Q-Enhanced-BPF 225 for maintaining an acceptable suppression of the noise and/or interference imposed on the receiver 135 by signals transmitted by the transmitting antenna 115. In certain exemplary embodiments, the HIPCF canceller 130 includes an analog-to-digital (A/D) converter 750 that receives the power level value from the power detector 745 and provides a digital representation of the power level value to the controller 235. The controller 235 executes a calibration routine to ensure an acceptable level of suppression of the noise and/or interference imposed on the receiver 135 by signals transmitted by the transmitting antenna 115. Exemplary calibration routines are described below with reference to FIGS. 9-16.

Figure 6:
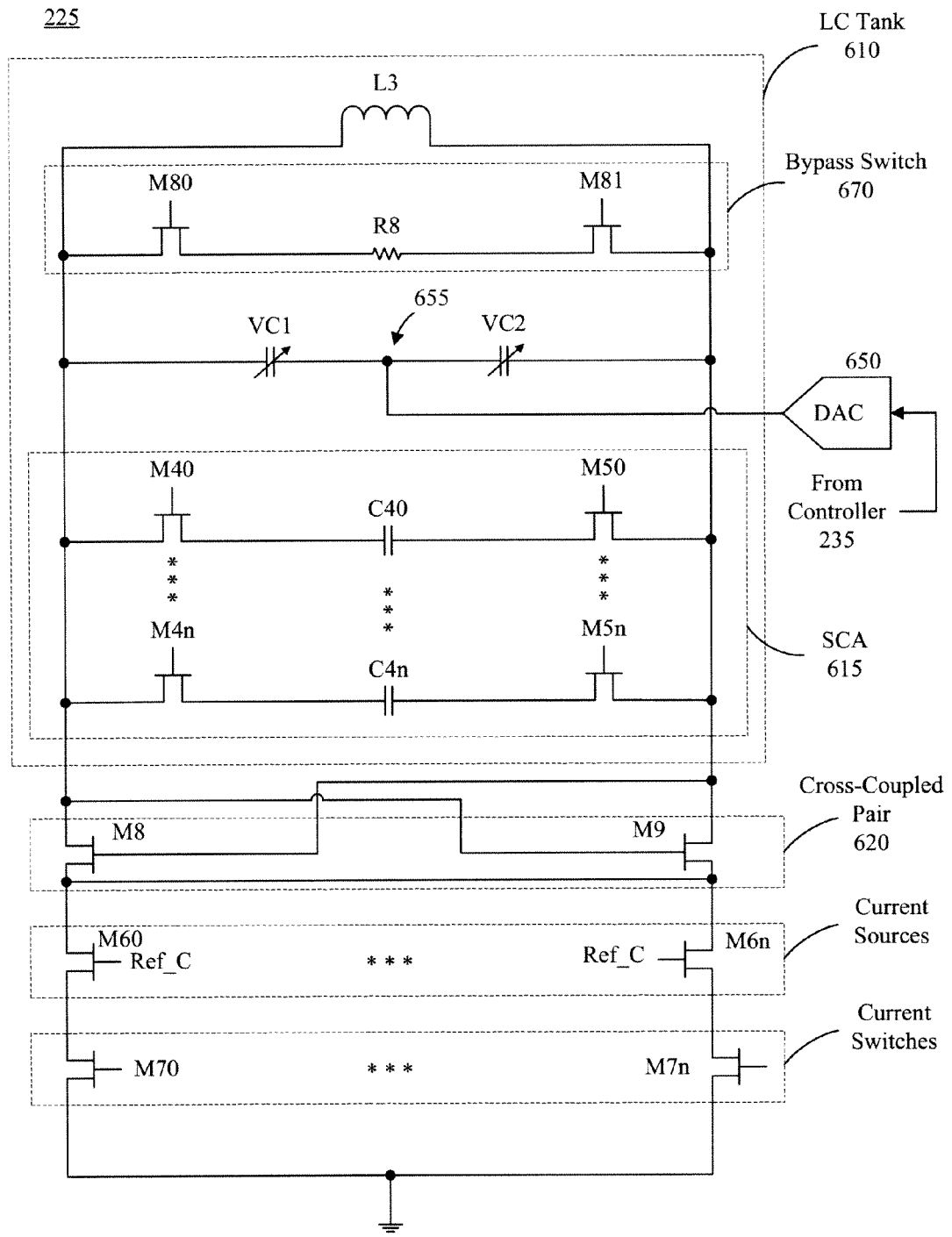
FIG. 6 is a block schematic diagram of a Q-enhanced band-pass filter (Q-Enhanced-BPF), in accordance with certain exemplary embodiments

The controller 235 can be implemented in the form of a microcontroller, microprocessor, computer, state machine, programmable device, control logic, analog and digital circuitry, or other appropriate technology. The controller 235 can execute one or more processes or programs for adjusting the settings of each of the band-pass filters 205, 215, and 225 and for operating the switchable capacitors C1-C3 and SCA 615 (FIG. 6). In one example, the controller 235 automatically adjusts the resonant frequencies of one or more of the band-pass filters 205, 215, 225 in response to a change in frequency of the receiver 135. For example, if the receiver 135 comprises a mobile TV tuner, the controller 235 adjusts the resonant frequency of the band-pass filters 205, 215, 225 to match or correspond to the receiver frequency. The controller 235 adjusts the resonant frequencies of the band-pass filters 205, 215, 225 by adjusting the capacitance of the switchable capacitors C1-C3 and SCA 615, respectively, as discussed below with reference to FIG. 3.

The controller 235 also can adjust or refine the settings of the I/Q modulator 230, the band-pass filters 205, 215, and 225, and the VGA 220 to account for environmental changes, such as changes to temperature, supply voltage, and antenna coupling. In certain exemplary embodiments, the controller 235 executes a calibration routine (FIG. 16) to identify acceptable settings based on these environmental changes and stores the identified optimal settings for subsequent use. The algorithm(s) can be embodied as software stored on the controller 235 or on a memory storage device 760. Alternatively, the algorithm(s) can be implemented in one or more hardware devices, such as discrete logic gates.

The HIPCF canceller 130 also includes auxiliary circuits 240. As shown in FIG. 7, the auxiliary circuits 240 include a temperature sensor 755, a power detector 745, one or more analog to digital converters 750, digital to analog converters, and other types of circuits for use by the HIPCF canceller 130. The auxiliary circuits 240 can also include one or more memory storage devices 760, such as RAM, ROM, and/or flash memory. Settings for each band-pass filter 205, 215, and 225 may be stored on the memory storage device 760. Additionally, settings for the I/Q modulator 230 may be stored on the memory storage device 760. For example, settings for each channel of a mobile TV tuner may be stored on the memory storage device 760.

Certain elements or functions of the HIPCF canceller 130 can be embodied in an integrated circuit, for example as depicted by the chip boundary 250 that FIG. 2 illustrates. For example, the switchable capacitors C1-C3, the LNA 210, the VGA 220, the Q-Enhanced-BPF 225, the I/Q modulator 230, the controller 235 and one or more of the auxiliary circuits 240 can be embodied in a single integrated circuit or multiple integrated circuits. Although the inductors L1 and L2 are illustrated as off-chip inductors in the illustrated exemplary embodiment, other exemplary embodiments may employ on-chip inductors in the band-pass filters 205 and 215. The integrated circuit(s) and/or the inductors L1 and L2 can be installed on a mobile device, such as a mobile phone, as well as other communication devices. The single or multiple integrated circuits can be embodied in or on a complementary-metal-oxide semiconductor (CMOS).

Referring to FIGS. 1 and 2, the HIPCF canceller 130 suppresses, cancels, or otherwise compensates for in-band or nearby out-of-band (relative to the receive frequency of the receiver 135) interfering signals imposed on the receiver 135 by signals transmitted by the transmitter 105 via the transmitting antenna 115. That is, the HIPCF canceller 130 compensates for interfering signals transmitted by the transmitting antenna 115 that has a frequency within or near the frequency band of the receiver 135. The HIPCF canceller 130 obtains samples of signals transmitted by the transmitter 105 from the sampling device 125 and process the samples to produce an interference compensation signal that, when applied to an input of the receiver 135, compensates for the imposed interfering signals.

The exemplary HIPCF 130 includes three band-pass filters 205, 215, and 225 that each filter, block, or reduce the intensity of signal components of the sampled transmit signals received from the sampling device 125 that are out-of-band with respect to the receive frequency of the receiver 135. The components of the sampled transmit signals in-band with respect to the receiver 135 are used to generate the interference compensation signal. At least one of phase, amplitude, and delay of these components of the sampled transmit signal are adjusted by the I/Q modulator 230 to generate the interference compensation signal. The controller 235 can execute one or more calibration algorithms and/or one or more tuning algorithms to improve the level of interference compensation. The controller 235 can obtain feedback from the power detector 745 or from the receiver 135 and use this feedback during execution of the algorithms. These algorithms are discussed in detail below with reference to FIGS. 9-31.

Figure 3:
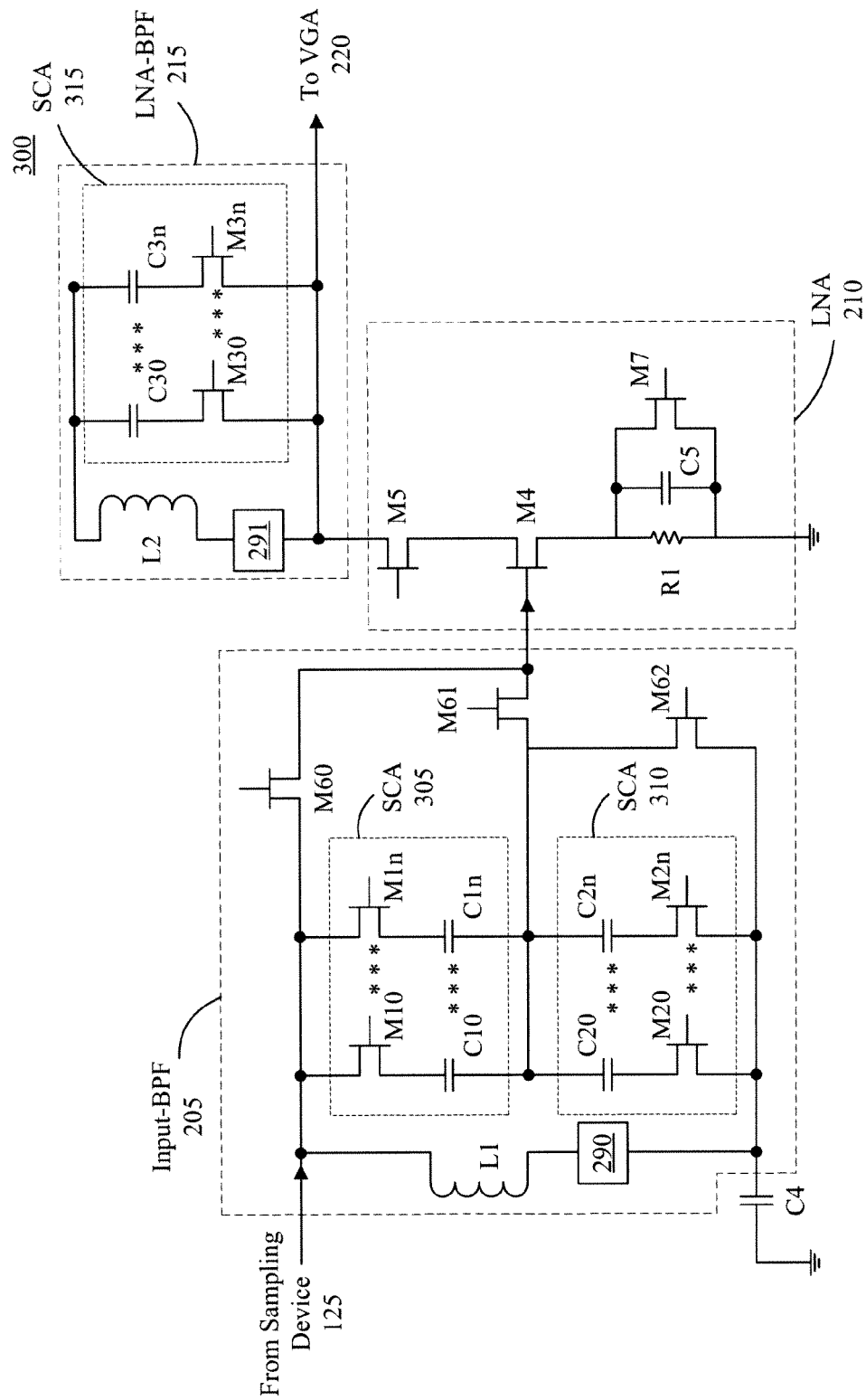
FIG. 3 is a block schematic diagram of certain components of the HIPCF canceller of FIG. 2, in accordance with certain exemplary embodiments.

FIG. 3 is a block schematic diagram 300 of certain components of the HIPCF canceller 130 of FIG. 2, in accordance with certain exemplary embodiments. In particular, FIG. 3 is a transistor level diagram of an exemplary Input-BPF 205, an exemplary LNA-BPF 215, and an exemplary LNA 210. Referring to FIG. 3, the Input-BPF 205 includes a first switched capacitor array (SCA) 305 and a second SCA 310. Each of the SCAs 305, 310 includes an array having a number 'n+1' of capacitors which typically include 1 or 2 standard capacitor sizes (unity cap). Each capacitor in the SCAs 305, 310 has a corresponding transistor switch (e.g., a MOS transistor) for activating the capacitor. The resonant frequency of the Input-BPF 205 can be adjusted by selecting one or more of the capacitors from the SCAs 305 and 310. The capacitor(s) can be selected by activating the switch associated with each selected capacitor(s). For example, the capacitor C10 can be selected by activating (or turning on) switch M10. Each capacitor in the SCAs 305, 310 can have a different value of capacitance corresponding to a different resonant frequency for the Input-BPF 205, or have a different weighted value to cover the frequency band of the receiver 135. In certain exemplary embodiments, the controller 235 can activate and deactivate the switches in the SCAs 305 and 310 to select the resonant frequency for the Input-BPF 205.

The SCAs 305 and 310 also can provide a voltage divider function. This is particularly useful for mobile telephone embodiments having a wide-band mobile TV tuner as a receiver 135. In certain exemplary embodiments, the SCAs 305 and 310 have a capacitor ratio (e.g., 1:5) that produces an additional 15 dBc reduction of the amplitude of the sampled transmit signal, thus either reducing the linearity requirements for the subsequent stages or allowing for more gain when a smaller ratio (e.g., 1:1) is selected. The ratio also may be varied depending on the channel in order to flatten or adjust the overall gain over the entire mobile TV band. To configure the Input-BPF 205 for high UHF (ultra high frequency) channels (such as channel 50 for a mobile TV tuner) that have frequencies close to that of a GSM, CDMA, or LTE transmitter 105, switch M61 can be activated and switches M60 and M62 can be deactivated. This provides a voltage divider between a capacitor in the first SCA 305 and a capacitor in the second SCA 310.

To configure the Input-BPF 205 for low UHF channels, such as channel 26 of a mobile TV tuner which may have a frequency between 542 MHz and 548 MHz, the second SCA 310 can be disconnected from the Input-BPF 205 circuit by activating switches M60 and M62 and deactivating switch M61. In certain exemplary embodiments, this configuration reduces the attenuation of the sampled signal by 15 dB. This compensates for frequency dependent gain variations of the three band-pass filters 205, 215, and 225.

In certain exemplary embodiments, the inductor L1 of the Input-BPF 205 can be biased at half of Vdd for an integrated circuit that the inductor L1 is coupled to in order to maximize the input voltage swing without violating the integrated circuit's specification while capacitor C4 provides a return path to ground. In certain exemplary embodiments, the bias voltage for the inductor L1 may be higher if adequate precautions are taken regarding the maximum breakdown voltage of the circuit, for example by employing zener diodes for ESD, cascoded input stages, larger channel devices, LDD MOSFETs, etc.

The LNA-BPF 215 also includes an SCA 315 having 'n+1' number of capacitors. In this exemplary embodiment, each capacitor in the SCA 315 includes a corresponding transistor switch (e.g., a MOS transistor) for activating the capacitor. Similar to the Input-BPF 205, the resonant frequency of the LNA-BPF 215 can be adjusted by selecting one or more of the capacitors of the SCA 315.

In this exemplary embodiment, the LNA 210 is a cascode LNA having two transistors M4 and M5. The cascode LNA 210 can use a frequency dependent degeneration that can be activated at high frequencies by deactivating switch M7. This serves the purpose of increasing input linearity at high frequencies as well as providing sufficient gain at low frequencies for maintaining low noise figure of the LNA 210 by activating switch M7.

The capacitors and the switches in each of the SCAs 305, 310, and 315 can be configured to avoid charge pumping due to their single ended nature. As shown in FIG. 3, this can be accomplished by inserting MOS switches M10 to M1n between capacitor C10 to C1n and the chip input, MOS switches M20 to M2n between capacitor C20 to C2n and the AC coupling capacitor C4, and MOS switches M30 to M3n between capacitor C30 to C3n and the output of LNA 210. High-Q external inductors L1 and L2 may be used in the HIPCF canceller 130 instead of on-chip inductors to provide higher frequency selectivity. The use of SCAs 305, 310, and 315 with sufficient tuning range can compensate for the spread of the two off-chip inductors L1 and L2 and parasitic capacitance associated with printed circuit boards. The integrated circuit having components of the HIPCF canceller 130 can have an input pin, an AC ground pin, and an LNA pull-up pin, each having multiple ESD diodes arranged in series to allow for a larger signal swing.

In certain exemplary embodiments, one or more of the band-pass filters 205, 215, and 225 are implemented as parallel resonance circuits. In certain exemplary embodiments, one or more of the band-pass filters 205, 215, and 225 are implemented as series resonance circuits. In certain exemplary embodiments, one or more of the band-pass filters 205, 215, and 225 are implemented as a low-pass filter rather than a band-pass filter. For example, each of the band-pass filters 205, 215, and 225 may be replaced with a low-pass filter if the main tone of the transmitter 105 has a frequency greater than the frequency range for interference suppression. In certain exemplary embodiments, one or more of the band-pass filters 205, 215, and 225 are implemented as a high-pass filter rather than a band-pass filter. For example, each of the band-pass filters 205, 215, and 225 may be replaced with a high-pass filter if the main tone of the transmitter 105 has a frequency less than the frequency range for interference suppression. In certain exemplary embodiments, a combination of low-pass, high-pass, and band-pass filters may be used in place of the band-pass filters 205, 215, and 225.

Figure 4:
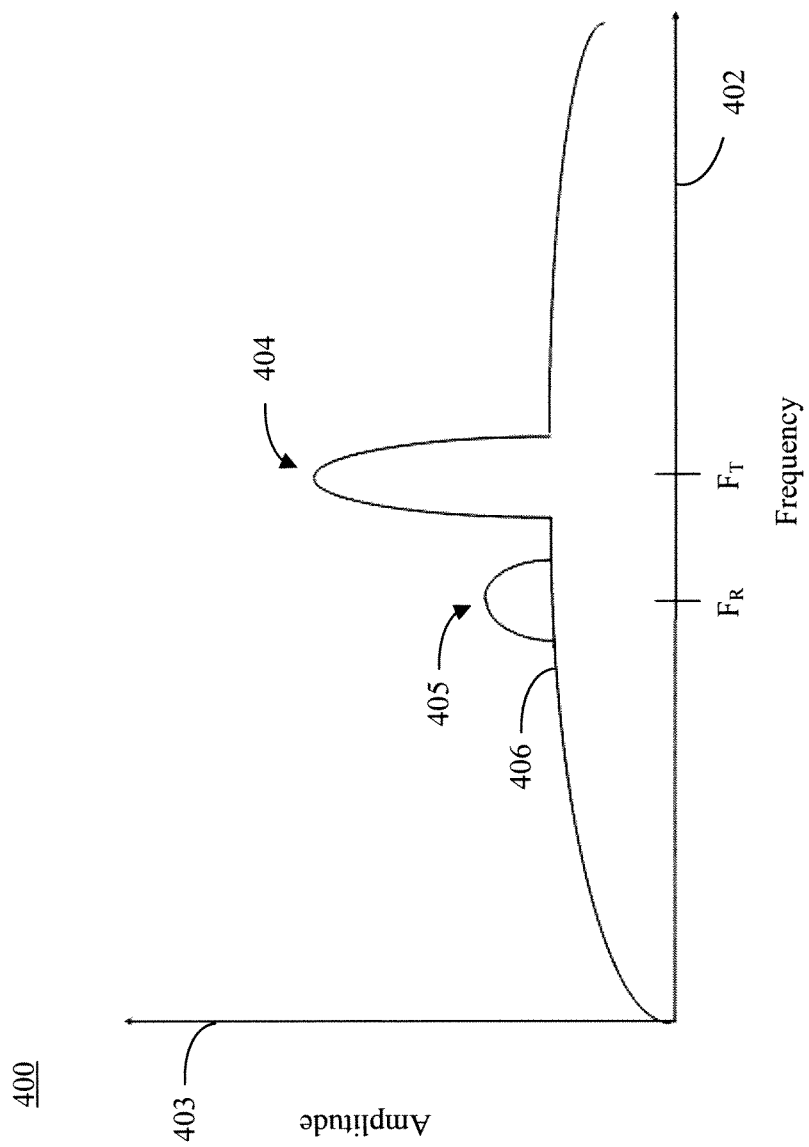
FIG. 4 depicts a spectral diagram of signals received at a victim receiver antenna, in accordance with certain exemplary embodiments.

FIG. 4 depicts a spectral diagram 400 of signals received at a victim receiver antenna, such as antenna 120 of FIG. 1, in accordance with certain exemplary embodiments. Referring to FIGS. 1 and 4, the spectral diagram 400 shows the amplitude 403 of the signals received at the antenna 120 plotted against signal frequency 402. The spectral diagram 400 includes a first peak 404 corresponding to the carrier frequency $F_T$ of the aggressor transmitter 105 and a second peak 405 corresponding to the channel frequency $F_R$ of the victim receiver 135. The spectral diagram 400 also includes a noise sideband 406 corresponding to the phase noise or other unwanted spectral components generated by the aggressor transmitter 105. In certain exemplary embodiments, the victim receiver's preferred signal-to-noise ratio (SNR) for proper reception is not met by the amplitude difference between the second peak 405 and the noise sideband 406.

Figure 5:
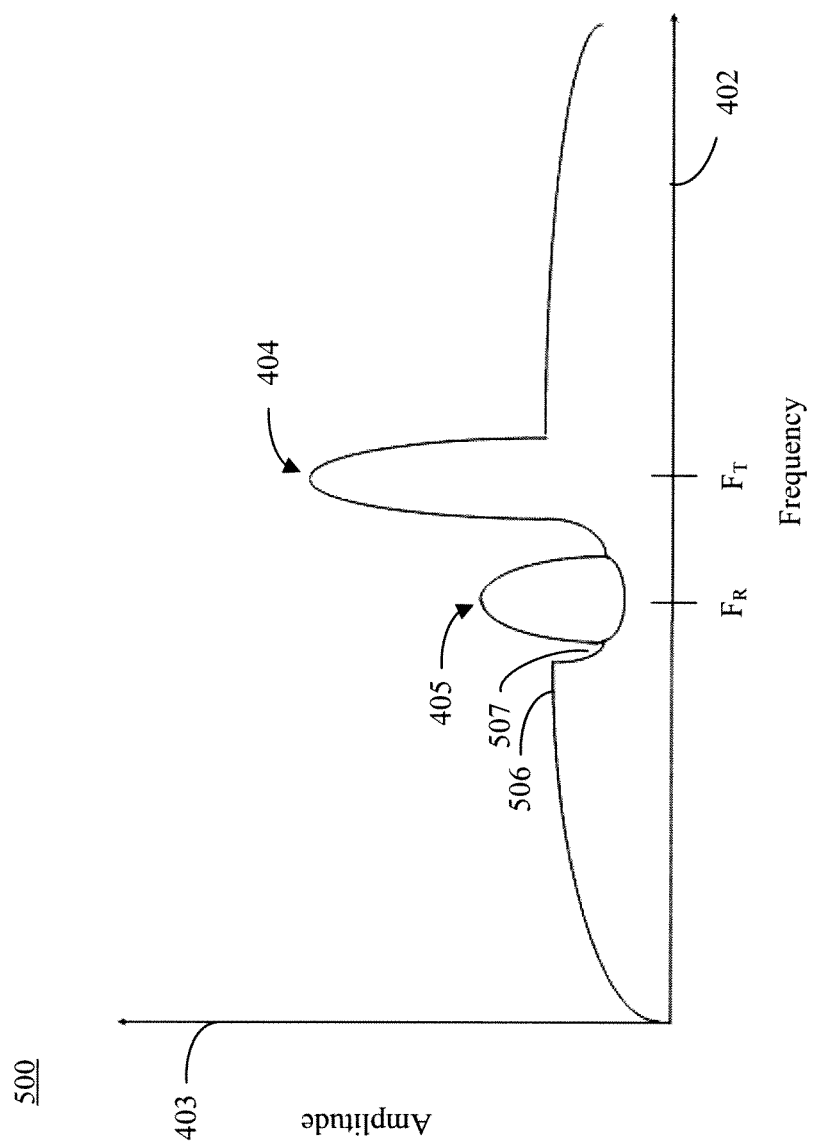
FIG. 5 depicts a spectral diagram of signals received at the input of a victim receiver after cancellation of in-band unwanted spectral components by an HIPCF canceller, in accordance with certain exemplary embodiments.

FIG. 5 depicts a spectral diagram 500 of signals received at the input of a victim receiver, such as receiver 135 of FIG. 1, after cancellation of in-band unwanted spectral components by an HIPCF canceller, such as the HIPCF canceller 130 of FIG. 1, in accordance with certain exemplary embodiments. Referring to FIGS. 1 and 5, the spectral diagram 500 shows the amplitude 403 of the signals received at the receiver 135 plotted against signal frequency 402. The spectral diagram 500 includes a noise sideband 506 corresponding to the phase noise or other unwanted spectral components generated by the aggressor transmitter 105. This noise sideband 506 differs from the noise sideband 406 of spectral diagram 400 in that the noise sideband 506 includes a notch 507 centered at the channel frequency $F_R$ of the victim receiver 135. This notch 507 results from the compensation provided by the interference compensation signal generated by the HIPCF canceller 130 and applied to the input of the receiver 135. In certain exemplary embodiments, the SNR of the signal is improved by an amount corresponding to the depth of the notch 507. Thus, the notch 507 improves the signal SNR, thus increasing the sensitivity of the victim receiver 135. For example, improved cancellation of phase noise or other unwanted spectral components by the HIPCF canceller 130 results in a deeper notch 507 and thus, better SNR for the victim receiver 135.

FIG. 6 is a block schematic diagram of the Q-enhanced BPF 225 of FIG. 2, in accordance with certain exemplary embodiments. In particular, FIG. 6 is a transistor level diagram of the Q-enhanced BPF 225. The exemplary Q-enhanced BPF 225 includes an LC tank 610 having an inductor L3, a bypass switch 670, and an SCA 615. In certain exemplary embodiments, the inductor L3 is a low-Q on-chip spiral inductor. In certain exemplary embodiments, the inductor L3 is a high-Q off-chip inductor. Similar to the band-pass filters 205 and 215, the resonant frequency of the Q-Enhanced-BPF 225 can be set (e.g., automatically by the controller 235) to the receive frequency of the receiver 135 to pass in-band signal components and to further filter, block, or reduce the intensity of the fundamental tones and out-of-band blockers from the sampled transmit signal.

The SCA 615 includes a number 'n+1' of capacitors C40-C4n. In the illustrated embodiment, each capacitor C40-C4n includes two corresponding transistor switches (e.g., a MOS transistor) for activating the capacitor. For example, the capacitor C40 includes transistor switches M40 and M50. In addition, the Q-Enhanced-BPF 225 also includes two series-connected voltage controlled capacitors VC1 and VC2 in parallel with the SCA 615. In certain exemplary embodiments, the voltage controlled capacitors VC1 and VC2 are varactors. Disposed between the two voltage controlled capacitors VC1 and VC2 is a center tap 655 that electrically couples the voltage controlled capacitors VC1 and VC2 to a digital-to-analog (D/A) converter 650. The D/A converter 650 varies the voltage level of the voltage control capacitors VC1 and VC2 in response to a signal received from the controller 235. The controller 235 can adjust the resonant frequency of the Q-Enhanced-BPF 225 by activating one or more of the capacitors C40-C4n (via switches M40-M4n and M50-M5n) and by controlling the voltage level at the center tap 655 and thus, the capacitance of the voltage controlled capacitors VC1 and VC2. The voltage controlled capacitors VC1 and VC1 enable the controller 235 to finely tune the resonant frequency of the Q-Enhanced-BPF 225.

The exemplary Q-Enhanced-BPF 225 also includes a cross-coupled pair 620 of transistor switches M8 and M9 in parallel with the SCA 615. The cross-coupled pair 620 provides a negative resistance to reduce the resistance of an LC tank formed by inductor L3, the SCA 615, and voltage controlled capacitors VC1 and VC2.

The Q-Enhanced-BPF 225 includes a number 'n+1' of current sources M60-M6n (e.g., binary weighted), each having a gate terminal electrically coupled together and with a reference current (Ref_C). The Q-Enhanced-BPF 225 also includes a number 'n+1' of current switches M70-M7n. By selecting one or more of the current sources M60-M6n via activating and deactivating (e.g., by the controller 235) the corresponding current switch(es) M70-M7n, the current in switches M8 and M9 can be adjusted which in turn adjusts the resistance of the LC tank 610. Thus, the Q-factor of the Q-Enhanced-BPF 225 can be adjusted. For example, the Q-factor of the Q-Enhanced-BPF 225 can be adjusted to a desired level such that filtering of out-of-band signals is improved or maximized without the Q-Enhanced-BPF 225 oscillating.

The Q-Enhanced-BPF 225 also includes a bypass switch 670 having a resistor R8 electrically coupled to and disposed between two transistor switches M80 and M81. As discussed in further detail with reference to FIGS. 11-15, the switches M80 and M81 can be activated or turned on during calibration of the Input-BPF 205 and the LNA-BPF 215 while current sources M60-M6n are deactivated. When the switches M80 and M81 are activated, the resistor R8 may detune the LC tank. During normal operation, the switches M80 and M81 are typically deactivated.

FIG. 7 is another block schematic diagram of the HIPCF canceller 130 depicting additional components of the HIPCF 130, in accordance with certain exemplary embodiments. As shown in FIG. 7, the exemplary HIPCF 130 also includes bypass switches 720 and 725 for use during calibration of the HIPCF 130. In particular, the Input-BPF 205 includes the bypass switch 720 and the LNA 215 includes the bypass switch 725. The bypass switch 720 includes a transistor switch M82 and a resistor R2. Similarly, the bypass switch 725 includes a transistor switch M83 and a resistor R3. During the configuration of the HIPCF 130 (e.g., using automatic test equipment (ATE), bench measurement, or in-site calibration), each of the bypass switches 720, 725 and the bypass switch 670 of the Q-Enhanced-BPF 225 can be activated and deactivated to selectively tune the band-pass filters 205, 215, and 225.

The HIPCF canceller 130 also includes a buffer 770 disposed between the VGA 220, Q-enhanced-BPF 225, and the I/Q Modulator 230. The auxiliary circuits 240 include a power detector 745 electrically coupled to the output of the buffer 770. The power detector 745 measures the power level of the sampled transmit signal at the output of the buffer 770 and provides an indication of the measurement to an A/D converter 750. The A/D converter 750 converts the indication to a digital signal and provides the digital signal to the controller 235.

The auxiliary circuits 240 also include a temperature sensor 755 having an output electrically coupled to the controller 235. The temperature sensor 755 is positioned on the chip (integrated circuit) that the HIPCF canceller 130 is mounted or fabricated on to measure the temperature of the chip. The controller 235 can receive temperature measurements from the temperature sensor 755 and use these measurements for monitoring, calibration, and for temperature compensation. In certain exemplary embodiments, the output of the temperature sensor 755 is coupled to an A/D converter, such as A/D converter 750 or a second A/D converter. In exemplary embodiments having a shared A/D converter 750 for the power detector 745 and the temperature sensor 755, the controller 235 can provide a signal to the A/D converter requesting which of the two measurements (power or temperature) to obtain.

Figure 8:
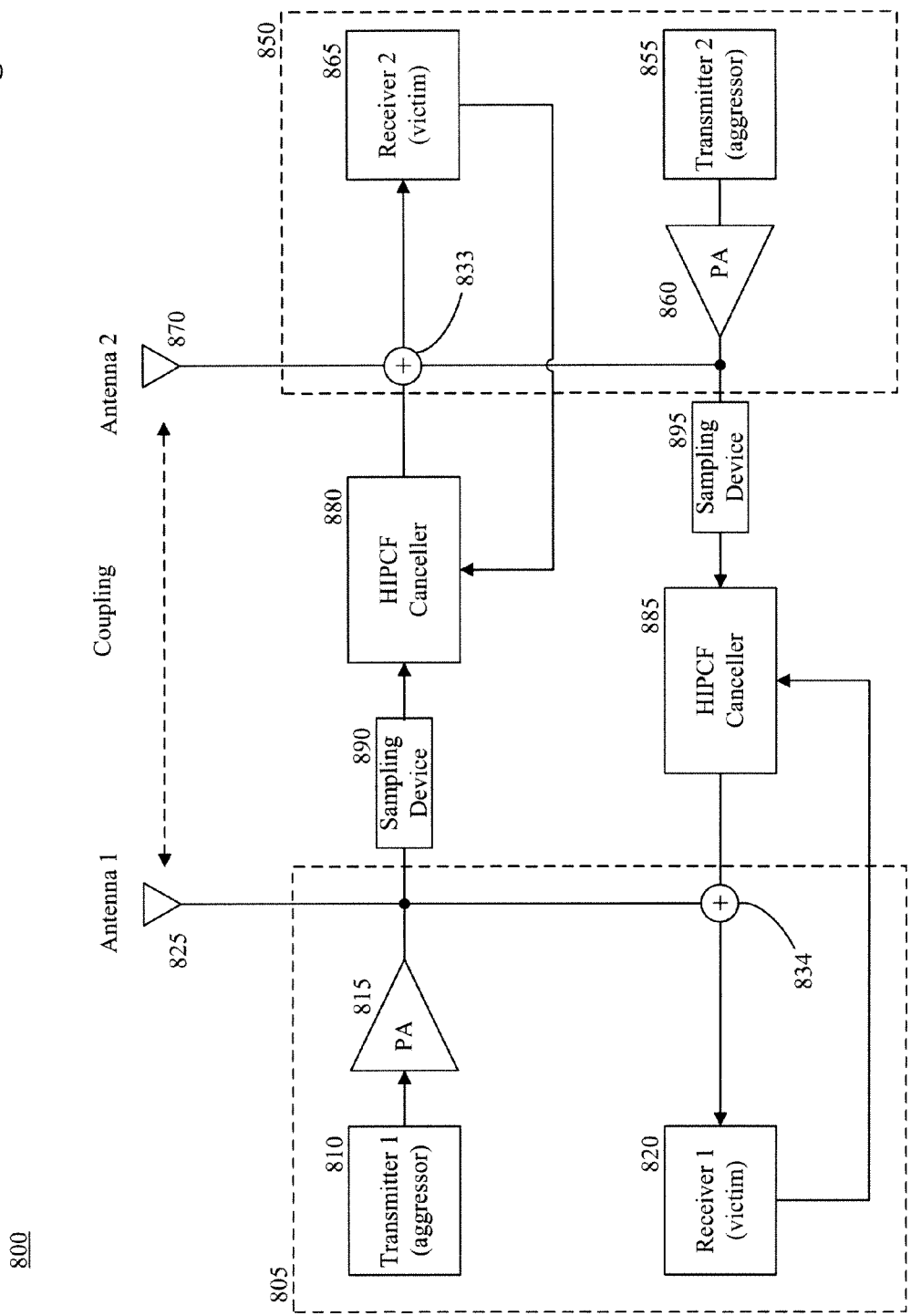
FIG. 8 depicts a functional block diagram of a communication system, in accordance with certain exemplary embodiments.

FIG. 8 depicts a functional block diagram of a communication system 800, in accordance with certain exemplary embodiments. The exemplary communication system 800 includes two communication devices 805 and 850, each having a transmitter 810 and 855, respectively, and a receiver 820 and 865, respectively. The communication system 800 includes a first HIPCF canceller 880 for compensating for noise and/or interference imposed onto an input of the receiver 865 from signals transmitted by the transmitter 810 via a first antenna 825. The communication system 800 also includes a second HIPCF canceller 885 for compensating for noise and/or interference imposed onto an input of the receiver 820 from signals transmitted by the transmitter 855 via a second antenna 870. Thus, the communication system 800 includes interference compensation circuits for protecting both communication devices 805 and 850. For example, the communication device 805 may be a cellular radio and the communication device 850 may be a WiFi radio. In this example, the cellular radio would be protected from interference imposed on the cellular radio receiver caused by signals transmitted by the WiFi radio and, conversely, the WiFi radio would be protected from interference imposed on the WiFi receiver from signals transmitted by the cellular radio.

The HIPCF canceller 880 receives samples of signals transmitted by the transmitter 810 via a sampling device 890 electrically coupled to the output of the transmitter's power amplifier 815 and processes those samples to generate an interference compensation signal. The HIPCF canceller 880 applies the generated interference compensation signal to the input of the receiver 865 at cancellation point 833 and, in turn, the interference compensation signal cancels, suppresses, or otherwise compensates for noise and/or interference imposed on the receiver 865. The HIPCF canceller 880 can include a controller similar to controller 235 of FIG. 2 that executes one or more calibration and one or more tuning algorithms to improve the noise and/or interference compensation. The controller can receive feedback, such as a "receive signal quality indicator," and use the feedback during the execution of the algorithms to improve the noise and/or interference compensation. Similar to the cancellation point 134, the cancellation point 833 can be implemented as converging electrical conductors, a coupler, a summation node, an adder, or other suitable technology.

Similarly, the HIPCF canceller 885 receives samples of signals transmitted by the transmitter 855 via a sampling device 895 electrically coupled to the output of the transmitter's power amplifier 860 and processes those samples to generate an interference compensation signal. The HIPCF canceller 885 applies the generated interference compensation signal to the input of the receiver 820 at cancellation point 834 and, in turn, the interference compensation signal cancels, suppresses, or otherwise compensates for noise and/or interference imposed on the receiver 820. The HIPCF canceller 885 can include a controller similar to controller 235 of FIG. 2 that executes one or more calibration and one or more tuning algorithms to improve the noise and/or interference compensation. The controller can receive feedback, such as a "receive signal quality indicator," and use the feedback during the execution of the algorithms to improve the noise and/or interference compensation. Similar to the cancellation point 134, the cancellation point 834 can be implemented as converging electrical conductors, a coupler, a summation node, an adder, or other suitable technology.

Figure 9:
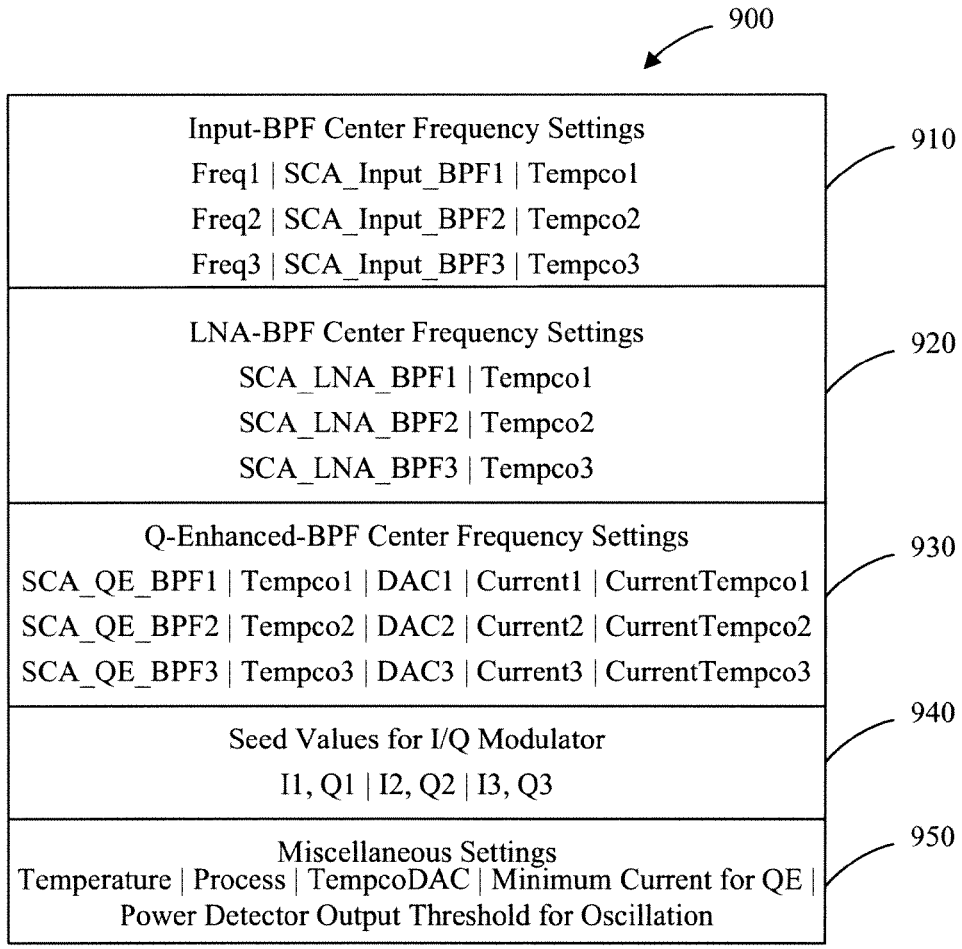
FIG. 9 depicts a lookup table, in accordance with certain exemplary embodiments.

FIG. 9 depicts a lookup table 900, in accordance with certain exemplary embodiments. Referring to FIGS. 2, 7, and 9, the lookup table 900 can be stored in the memory device 760 of the HIPCF canceller 130. The exemplary lookup table 900 includes center frequency settings 910 for the Input-BPF 205, center frequency settings 920 for the LNA-BPF 215, and center frequency settings 930 for the Q-Enhanced-BPF 225. In this exemplary embodiment, the Input-BPF center frequency settings 910 include three frequency values (Freq1, Freq2, and Freq3) for which the band-pass filters 205, 215, and 225 have been characterized. For example, each of the band-pass filters 205, 215, and 225 may be characterized at 450 MHz, 600 MHz, and 770 MHz in a mobile TV receiver 135 embodiment. The Input-BPF center frequency settings 910 also include switched capacitor array settings (SCA_Input_BPF1-SCA-Input_BPF3) for each of the three frequency values (Freq1-Freq3), respectively. The switched capacitor array settings (SCA_Input_BPF1-SCA-Input_BPF3) control how the SCA 305 and the SCA 310 are controlled for each of the frequencies (Freq1-Freq3) and thus, the resonant frequency of the Input-BPF 205 for those frequencies. The Input-BPF center frequency settings 910 also include temperature coefficient values (Tempco1-Tempco3) for each frequency value (Freq1-Freq3), respectively. The temperature coefficient values (Tempco1-Tempco3) are used by the controller 235 to adjust the settings of the SCA 305 and 310 based on changes in temperature.

Similarly, the LNA-BPF center frequency settings 920 includes switched capacitor array settings (SCA_LNA_BPF1-SCA-LNA_BPF3) for each of the three frequency values (Freq1-Freq3), respectively. The switched capacitor array settings (SCA_LNA_BPF1-SCA-LNA_BPF3) control how the SCA 315 is controlled for each of the frequencies (Freq1-Freq3) and thus, the resonant frequency of the LNA-BPF 215 for those frequencies. The LNA-BPF center frequency settings 920 also include temperature coefficient values (Tempco1-Tempco3) for each frequency value (Freq1-Freq3), respectively. These temperature coefficient values (Tempco1-Tempco3) are used by the controller 235 to adjust the settings of the SCA 315 based on changes in temperature.

The Q-Enhanced-BPF center frequency settings 930 include switched capacitor array settings (SCA_QE_BPF1-SCA-QE_BPF3) for each of the three frequency values (Freq1-Freq3), respectively. The switched capacitor array settings (SCA_QE_BPF1-SCA-QE_BPF3) control how the SCA 615 is controlled for each of the frequencies (Freq1-Freq3) and thus, the resonant frequency of the Input-BPF 205 for those frequencies. The Q-Enhanced-BPF center frequency settings 920 also include temperature coefficient values (Tempco1-Tempco3) for each frequency value (Freq1-Freq3), respectively. These temperature coefficient values (Tempco1-Tempco3) are used by the controller 235 to adjust the settings of the SCA 615 based on changes in temperature. The Q-Enhanced-BPF center frequency settings 930 also include DAC settings (DAC1-DAC3) for the voltage controlled capacitors VC1 and VC2 for each frequency (Freq1-Freq3), respectively. The Q-Enhanced-BPF center frequency settings 920 also include temperature coefficient values (CurrentTempco1-CurrentTempco3) for each frequency value (Freq1-Freq3), respectively. These temperature coefficient values (CurrentTempco1-CurrentTempco3) are used by the controller 235 to adjust the settings of the current switches M70-M7n, and thus, the bias current in the Q-enhanced-BPF 225 based on changes in temperature.

The exemplary lookup table 900 also includes seed values 940 for the I/Q modulator 230. The seed values 940 include in-phase and quadrature (I, Q) settings ((I1, Q1)-(I3, Q3)) for the I/Q modulator 230 at each frequency (Freq1-Freq3), respectively. The lookup table 900 also includes miscellaneous settings 950. The miscellaneous settings 950 include the temperature at which a calibration of the HIPCF canceller 130 was performed, the process parameters of the lot the HIPCF canceller 130 was fabricated in, the temperature coefficient of the settings of the DAC 650, the minimum current required to keep the transistor switches M8 and M9 of the Q-Enhanced-BPF 225 turned on, and the threshold of detecting oscillation for the on-chip power detector 745.

The lookup table 900 is stored on the memory device 760 and accessed by the controller 235 to adjust the settings of certain components within the HIPCF canceller 130 during normal operation and during calibration and tuning processes discussed below. Many of the settings in the lookup table 900 are also populated during these calibration and tuning processes, as discussed in further detail below.

Figure 10:
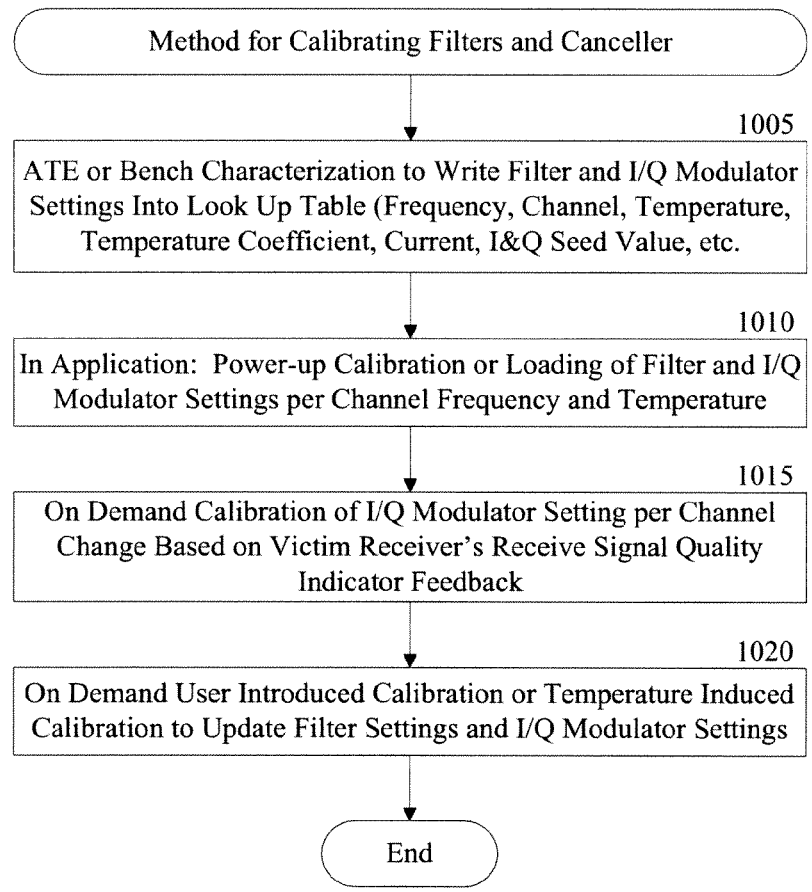
FIG. 10 is a flow chart depicting a method for calibrating certain components of the HIPCF canceller of FIG. 2, in accordance with certain exemplary embodiments.

FIG. 10 is a flow chart depicting a method 1000 for calibrating certain components of the HIPCF canceller 130, in accordance with certain exemplary embodiments. After fabrication of the HIPCF canceller 130, for example in an integrated circuit, initial settings shown in the lookup table 900 of FIG. 9 are populated during an ATE or bench characterization process in block 1005. In block 1010, in the application stage when the HIPCF canceller 130 is powered on, the values for the settings in the lookup table 900 are loaded into an internal register of the controller 235. The controller 235 can access the lookup table 900 and control the components of the HIPCF canceller 130 using a current temperature measurement from the temperature sensor 755 and the channel frequency that the receiver 135 is tuned to. An optional calibration routine may also be performed in block 1010 to calibrate the band-pass filters 205, 215, and 225 and/or the I/Q modulator 230.

In block 1015, if the channel of the receiver 135 changes, the I/Q modulator 230 is recalibrated by the controller 235. This recalibration can improve the noise and/or interference cancellation based on the receiver's receive signal quality indicator and cancellation algorithms described below. In block 1020, the controller 235 triggers the calibration of the band-pass filters 205, 215, 225 and the I/Q modulator 230 in response to a command from a user or in response to the temperature change exceeding a preset threshold, for example 10 degrees C. During the calibration process of the method 1000, the values in the lookup table 900 are updated.

Figure 11:
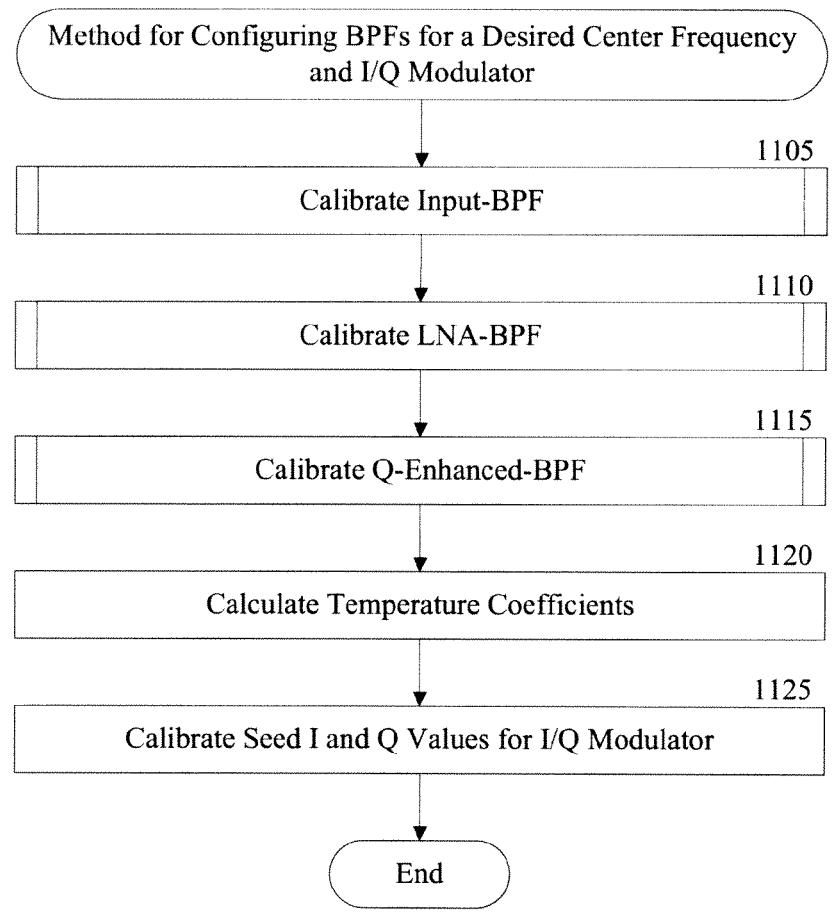
FIG. 11 is a flow chart depicting a method for configuring the filters of the HIPCF canceller of FIG. 2 for a desired center frequency, in accordance with certain exemplary embodiments.

FIG. 11 is a flow chart depicting a method 1100 for configuring the filters of the HIPCF canceller 130 for a desired center frequency (e.g., 450 MHz, 600 MHz, or 770 MHz for a mobile TV embodiment), in accordance with certain exemplary embodiments. In block 1105, the Input-BPF 205 is calibrated. The LNA-BPF 215 and the Q-Enhanced-BPF 225 are bypassed by activating bypass switches 725 and 670 and deactivating bypass switch 720. A pilot tone or tuner signal is applied to the input of the HIPCF canceller 130 and the power level of the pilot tone or tuner signal is measured at the output of the HIPCF canceller 130. The settings of the SCA 305 and the SCA 310 are adjusted based on the measured power level until the power level reaches an acceptable level. The settings of the SCA 305 and the SCA 310 corresponding to the acceptable power level are populated in the lookup table 900 for later use by the controller 235. Block 1105 is discussed in further detail below with reference to FIG. 12.

In block 1110, the LNA-BPF 215 is calibrated. The Input-BPF 205 and the Q-Enhanced-BPF 225 are bypassed by activating bypass switches 720 and 670 and deactivating bypass switch 725. With the pilot tone or tuner signal still applied to the input of the HIPCF canceller 130, the settings of the SCA 315 are adjusted based on the measured power level until the measured power level reaches an acceptable level. The settings of the SCA 315 corresponding to the acceptable power level are populated in the lookup table 900 for later use by the controller 235. Block 1110 is discussed in further detail below with reference to FIG. 13. In block 1115, the Q-Enhanced-BPF 225 is calibrated. Block 1115 is discussed in further detail below with reference to FIG. 14.

In block 1120, the temperature coefficients for the band-pass filters 205, 215, and 225 are calculated. In certain exemplary embodiments, the ATE (or bench measurement equipment) calibrates the settings for each of the band-pass filters 205, 215, and 225 for more than one temperature. For example, the band-pass filters may be calibrated at room temperature (e.g., 27° C.), at 70° C., and at 0° C. The controller 235 can calculate the temperature coefficients by taking the difference between the settings for each band-pass-filter 205, 215, 225 at each temperature. The temperature coefficients can be stored in the lookup table 900 in the corresponding fields of fields 910, 920, 930, and 950.

In block 1125, the I and Q seed values for the I/Q modulator 230 are calibrated. In certain exemplary embodiments, the ATE (or bench measurement equipment) can employ a setup similar to the circuit 100 depicted in FIG. 1. The transmitter 105 can be activated and one or more of the cancellation algorithms discussed below can be executed to identify a preferred or acceptable cancellation point for the desired center frequency. The (I, Q) settings corresponding to the identified cancellation point can be stored in field 940 of the lookup table 900.

After block 1125, the method 1100 ends. Of course, the method 1100 could be executed more than one time. For example, the method 1100 may be executed during ATE and then executed again after the chip or system being placed into operation.

Figure 12:
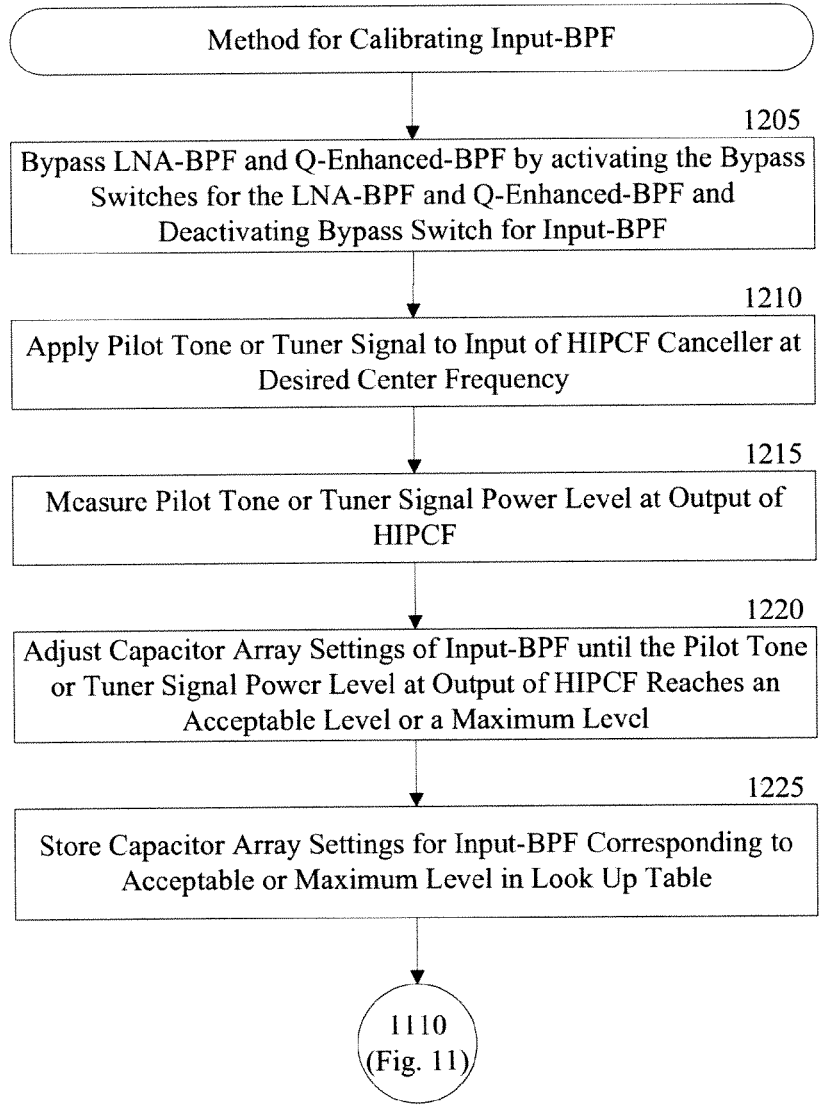
FIG. 12 is a flow chart depicting a method for calibrating an input band-pass filter (Input-BPF) of the HIPCF canceller of FIG. 2, in accordance with certain exemplary embodiments.

FIG. 12 is a flow chart depicting a method 1105 for calibrating the Input-BPF 205 of the HIPCF canceller 130, in accordance with certain exemplary embodiments, as referenced in FIG. 11. In block 1205, the bypass switches 725 and 670 are activated and bypass switch 720 is deactivated. This bypasses the LNA-BPF 215 and the Q-Enhanced-BPF 225 for the calibration of the Input-BPF 205. In certain exemplary embodiments, the controller 235 operates the bypass switches 670, 720, and 725 in response to a command to configure the band-pass filters 205, 215, and 225.

In block 1210, a pilot tone or a tuner signal (e.g., a mobile TV signal) with the desired center frequency (e.g., 450 MHz, 600 MHz, or 770 MHz) is applied to the input of the HIPCF canceller 130. In certain exemplary embodiments, the HIPCF canceller 130 generates the pilot tone or tuner like signal using an on-chip phase locked loop. In certain exemplary embodiments, the pilot tone or tuner signal is generated by re-using the phase locked loop of the receiver 135, for example via one of the receiver's output pins.

In block 1215, the power level of the pilot tone or tuner signal is measured at the output of the HIPCF canceller 130. In certain exemplary embodiments, the output power level of the pilot tone or tuner signal is measured using ATE or bench characterization equipment. For example, the ATE or bench characterization equipment may include a spectrum analyzer. In certain exemplary embodiments, the output power level of the pilot tone or tuner signal is measured using a receive signal quality indicator obtained from the receiver 135. In certain exemplary embodiments, the output power level of the pilot tone or tuner signal is measured using the power detector 745.

In block 1220, the controller 235 makes one or more adjustments to the settings of the SCA 305 and the SCA 310 and measures the output power level of the pilot tone or tuner signal resulting from each adjustment. The controller 235 can continue to make adjustments until the output power level of the pilot tone or tuner signal reaches or exceeds an acceptable, preferred, or maximum level. In addition or in the alternative, the controller 235 can make a certain number of adjustments and record the output power level of the pilot tone or tuner signal (e.g., in memory device 760) and identify the recorded output power level having the best, preferred, or highest power level. In certain exemplary embodiments, the controller 235 sweeps the setting values for the SCA 305 and the SCA 310 in a monotonically increasing or decreasing process (e.g., one least significant bit ("LSB") or multiple LSBs at a time for digital SCAs). In certain exemplary embodiments, a binary algorithm, such as the algorithm illustrated in FIG. 20 and discussed below, could be used to find a preferred setting for the SCA 305 and SCA 310.

In block 1225, the controller 235 stores the desired center frequency and the settings for the SCA 305 and SCA 310 corresponding to the acceptable, preferred, or maximum level in the lookup table 900 in the memory device 760. For example, the desired center frequency may be stored in the field "Freq1" and the settings for the SCA 305 and the SCA 310 may be stored in field "SCA_Input_BPF1." After block 1225, the method 1105 proceeds to block 1110, as referenced in FIG. 11.

Figure 13:
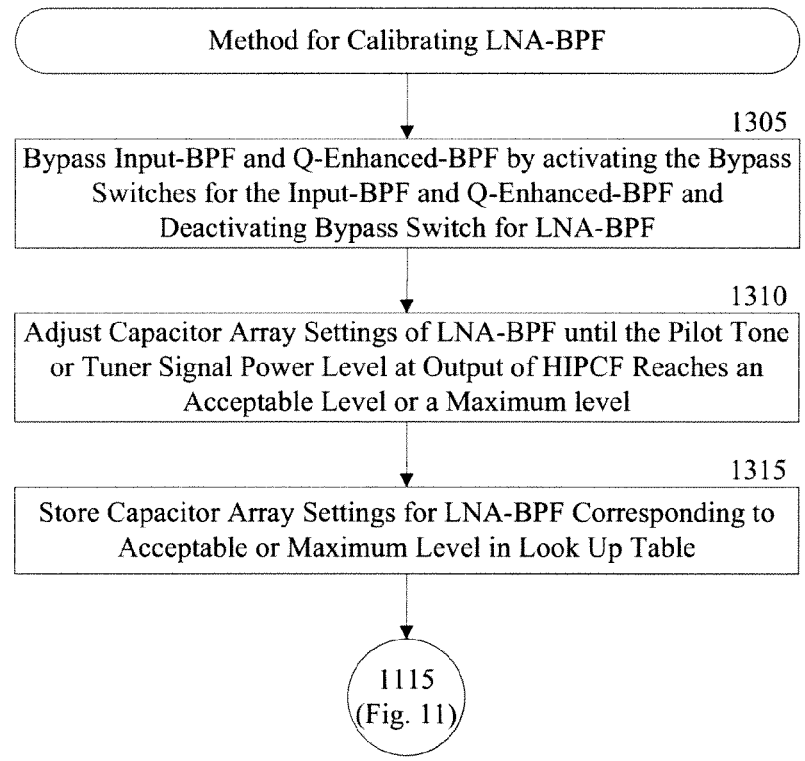
FIG. 13 is a flow chart depicting a method for calibrating a low noise amplifier band-pass filter (LNA-BPF) of the HIPCF canceller of FIG. 2, in accordance with certain exemplary embodiments.

FIG. 13 is a flow chart depicting a method 1110 for calibrating the LNA-BPF 215 of the HIPCF canceller 130, in accordance with certain exemplary embodiments, as referenced in block 1110 of FIG. 11. In block 1305, the bypass switches 720 and 670 are activated and bypass switch 725 is deactivated. This bypasses the Input-BPF 205 and the Q-Enhanced-BPF 225 for the calibration of the LNA-BPF 215.

In block 1310, the controller 235 makes one or more adjustments to the settings of the SCA 315 and measures the output power level of the pilot tone or tuner signal resulting from each adjustment. The controller 235 can continue to make adjustments until the output power level of the pilot tone or tuner signal reaches or exceeds an acceptable, preferred, or maximum level. In addition or in the alternative, the controller 235 can make a certain number of adjustments and record the output power level of the pilot tone or tuner signal (e.g., in memory device 760) and identify the recorded output power level having the best, preferred, or highest power level. In certain exemplary embodiments, the controller 235 sweeps the setting values for the SCA 315 in a monotonically increasing or decreasing process (e.g., one LSB or multiple LSBs at a time for digital SCAs). In certain exemplary embodiments, a binary algorithm, such as the algorithm illustrated in FIG. 20 and discussed below, could be used to find a preferred setting for the SCA 315.

In block 1315, the controller 235 stores the settings for the SCA 315 corresponding to the acceptable, preferred, or maximum level in the lookup table 900 in the memory device 760. For example, the settings for the SCA 315 may be stored in field "SCA_LNA_BPF1." After block 1315, the method 1110 proceeds to block 1115, as referenced in FIG. 11.

Figure 14A:
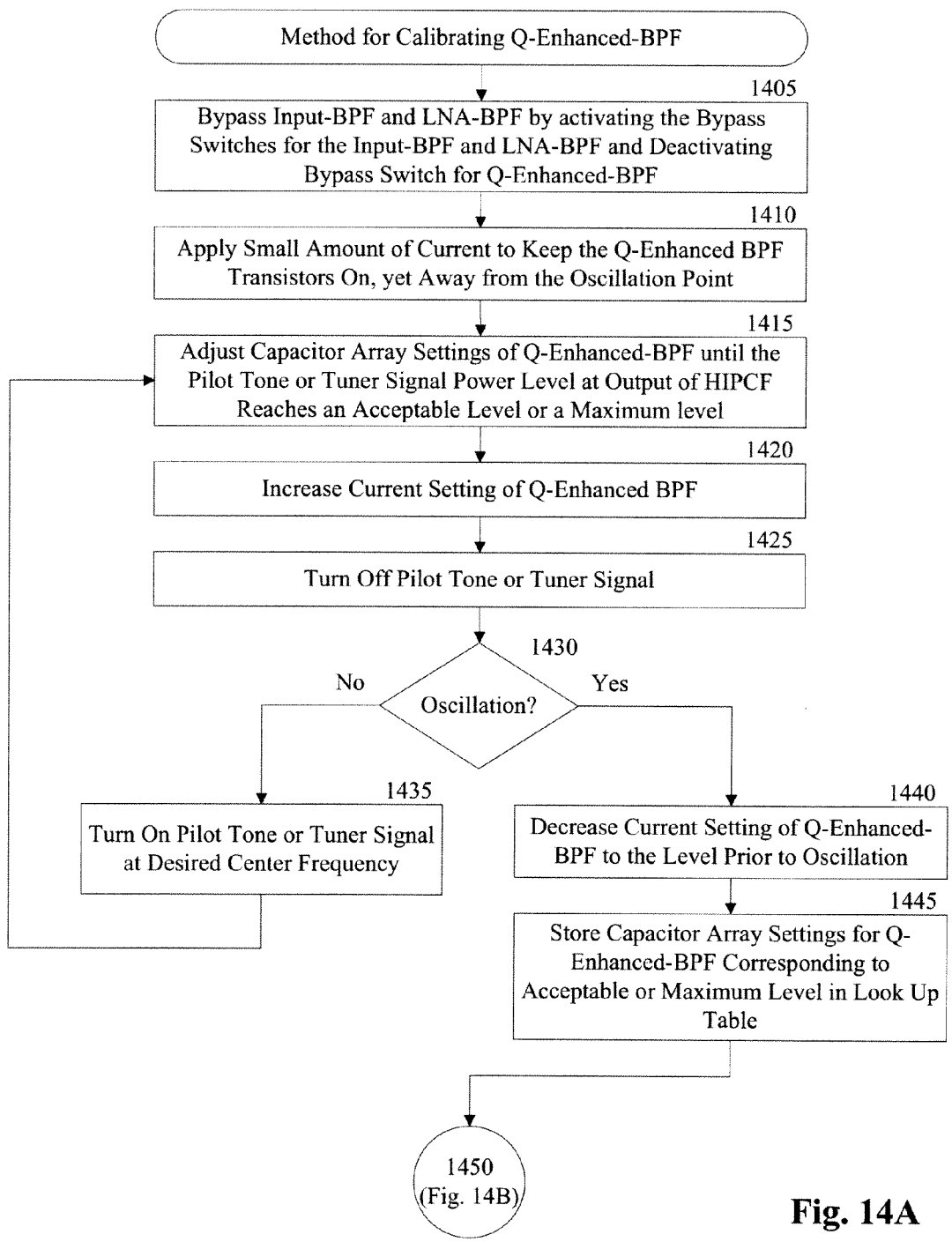
FIGS. 14A and 14B, collectively
Figure 14B:
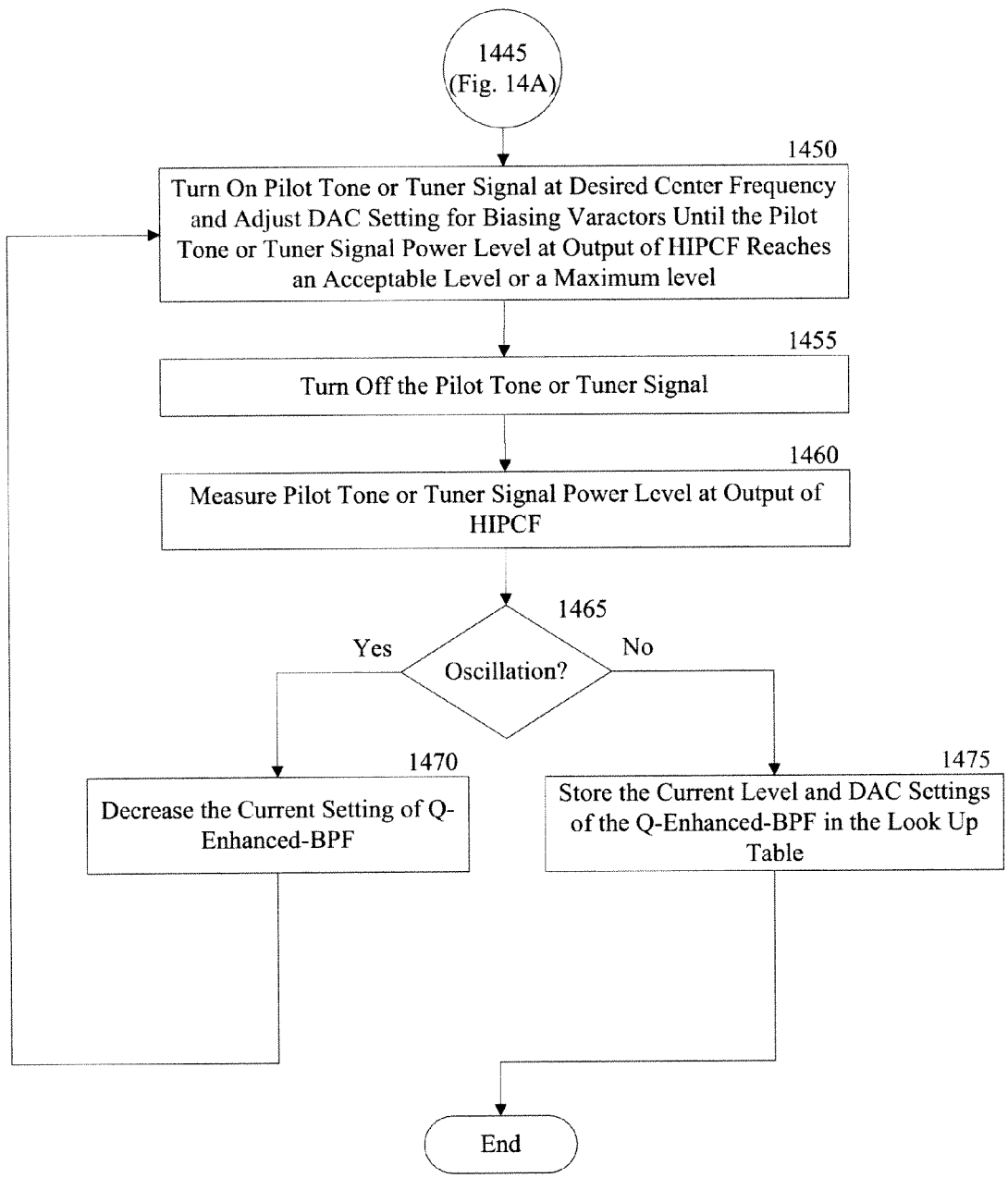

FIGS. 14A and 14B, collectively FIG. 14, depict a flow chart of a method 1115 for calibrating the Q-Enhanced-BPF 225 of the HIPCF canceller 130, in accordance with certain exemplary embodiments, as referenced in block 1115 of FIG. 11. In block 1405, the bypass switches 720 and 725 are activated and bypass switch 670 is deactivated. This bypasses the Input-BPF 205 and the LNA-BPF 215 for the calibration of the Q-Enhanced-BPF 225.

In block 1410, a bias current is applied (e.g., by the controller 235) to the current switches M70-M7n for the purpose of keeping the transistor switches M8 and M9 in the cross-coupled pair 620 and the current sources M60-M6n active or turned on, yet avoiding oscillation of the Q-Enhanced-BPF 225. The amount of current applied to the current switched M70-M7n may correspond to the value of the "Minimum Current for QE" field of the lookup table 900.

In block 1415, the controller 235 makes one or more adjustments to the settings of the SCA 615 and measures the output power level of the pilot tone or tuner signal resulting from each adjustment. The controller 235 can continue to make adjustments until the output power level of the pilot tone or tuner signal reaches or exceeds an acceptable, preferred, or maximum level. In addition or in the alternative, the controller 235 can make a certain number of adjustments and record the output power level of the pilot tone or tuner signal (e.g., in memory device 760) and identify the recorded output power level having the best, preferred, or highest power level. In certain exemplary embodiments, the controller 235 sweeps the setting values for the SCA 615 in a monotonically increasing or decreasing process (e.g., one LSB or multiple LSBs at a time for digital SCAs). In certain exemplary embodiments, a binary algorithm, such as the algorithm illustrated in FIG. 20 and discussed below, could be used to find a preferred setting for the SCA 615.

In block 1420, the controller 235 increases the amount of current applied to the cross-coupled transistor switches M8, M9 by increasing the settings of the current switches M70-M7n. In certain exemplary embodiments, the amount of current is increased by a few (e.g., 4) LSB. In block 1425, the pilot tone or tuner signal is turned off. In block 1430, an inquiry is conducted by the controller 235 as to whether there is any oscillation generated by the Q-Enhanced-BPF 225. In certain exemplary embodiments, this inquiry includes comparing the measured output power level of the HIPCF canceller 130 with a predetermined threshold value at the ATE or a threshold value "Power Detector Output Threshold for Oscillation" stored in the miscellaneous values 950 of the lookup table 900. If the measured output power level is below the threshold, then the controller 235 determines that there is no oscillation. If the controller 235 determines that there is no or sufficiently low oscillation, the method 1115 proceeds to block 1435, where the controller 235 turns on the pilot tone or tuner signal again and applies the pilot tone or tuner signal to the input of the HIPCF canceller 130. After block 1435, the method 1115 returns to block 1415. If the controller 235 determines that there is oscillation, the method 1115 proceeds to block 1440.

In block 1440, the controller 235 decreases the amount of current applied to the current switches M70-M7n to the level prior to oscillation. In block 1445, the controller 235 stores the settings for the SCA 615 corresponding to current level prior to oscillation in the lookup table 900 in the memory device 760. For example, the settings for the SCA 615 may be stored in field "SCA_QE_BPF1."

In block 1450, the pilot tone or tuner signal is reactivated and applied to the input of the HIPCF canceller 130. The controller 235 makes one or more adjustments to the settings for the DAC 650 for biasing the voltage controlled capacitors VC1 and VC2 and measures the output power level of the pilot tone or tuner signal resulting from each adjustment. The adjustments to the DAC 650 adjust the voltage level at the voltage controlled capacitors VC1 and VC2. The controller 235 can continue to make adjustments until the output power level of the pilot tone or tuner signal reaches or exceeds an acceptable, preferred, or maximum level. In addition or in the alternative, the controller 235 can make a certain number of adjustments and record the output power level of the pilot tone or tuner signal (e.g., in memory device 760) and identify the recorded output power level having the best, preferred, or highest power level. In certain exemplary embodiments, the controller 235 sweeps the setting values for the DAC 650 in a monotonically increasing or decreasing process (e.g., one LSB or multiple LSBs at a time). In certain exemplary embodiments, a binary algorithm, such as the algorithm illustrated in FIG. 20 and discussed below could be used to find a preferred setting for the DAC 650.

In block 1455, the pilot tone or tuner signal is turned off. In block 1460, the output power level of the HIPCF canceller 130 is measured. In block 1465, an inquiry is conducted by the controller 235 as to whether there is any oscillation generated by the Q-Enhanced-BPF 225, similar to block 1430. If the controller 235 determines that there is oscillation, the method 1115 proceed to block 1470. If the controller 235 determines that there is no oscillation, the method 1115 proceeds to block 1475.

In block 1470, the controller 235 lowers the current level for biasing the cross-coupled transistors M8, M9 by decreasing the settings of current switches M70-7n, for example by a few LSB. After the current level is lowered, the method 1115 returns to block 1450.

In block 1475, the controller 235 stores the settings for the DAC 650 and the current switches M70-M7n in the lookup table 900 in the memory device 760. For example, the setting for the current switches M70-M7n may be stored in the field "Current1" and the setting for the DAC 650 may be stored in field "DAC1." After block 1475, the method 1115 ends. Of course, the method 1100 can be repeated any number of times for any number of frequencies. For example, the band-pass filters 205, 215, and 225 may be calibrated for three frequencies (Freq1, Freq2, and Freq3).

Figure 15:
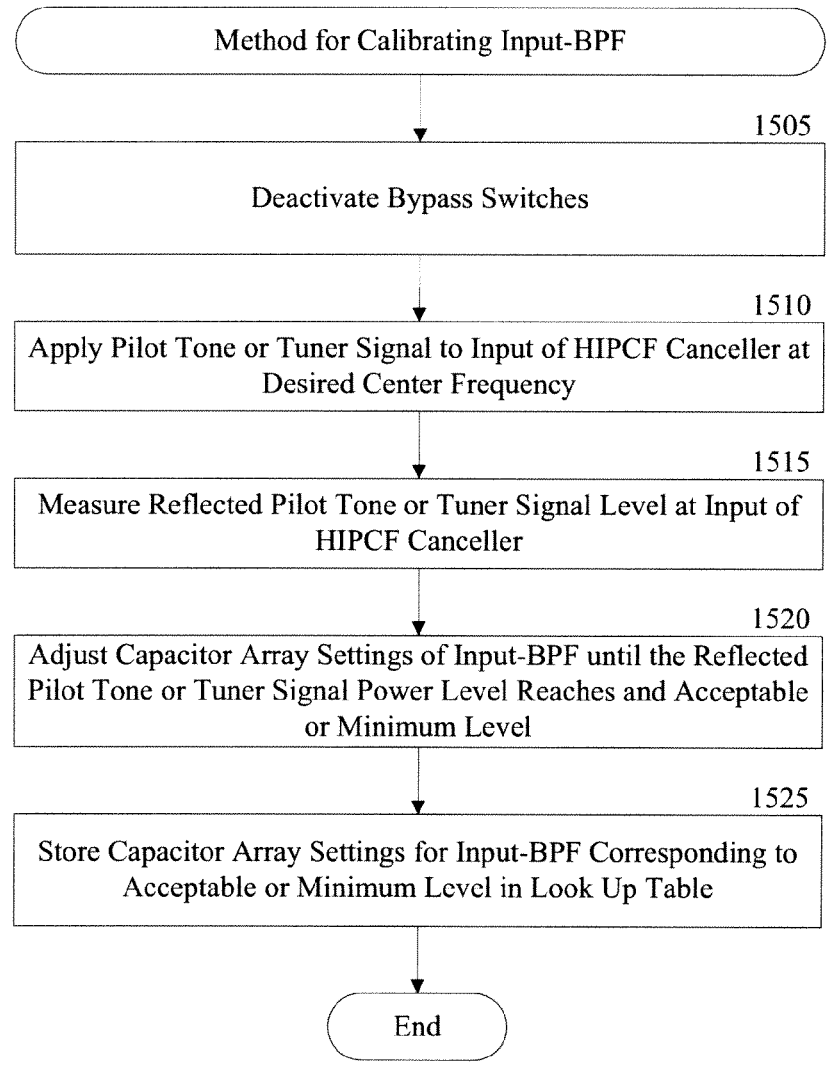
FIG. 15 is a flow chart depicting a method for calibrating the Input-BPF of the HIPCF canceller of FIG. 2, in accordance with certain exemplary embodiments.

FIG. 15 is a flow chart depicting a method 1500 for calibrating the Input-BPF 205 of the HIPCF canceller 130 of FIG. 7, in accordance with certain exemplary embodiments. This method 1500 is an alternative method to that of the method 1105 of FIG. 12. In block 1505, the bypass switches 720, 725, and 670 are deactivated. For example, the controller 235 may deactivate the bypass switches 720, 725, and 670.

In block 1510, a pilot tone or tuner signal with the desired center frequency is applied to the input of the HIPCF canceller 130. In block 1515, a measurement of the reflected pilot tone or tuner signal (e.g., reflection coefficient or return loss) is made at the input of the HIPCF canceller 130. This measurement may be made by a power detector or spectral analyzer, for example. In block 1520, the controller 235 makes one or more adjustments to the settings of the SCA 305 and the SCA 310 and measures the reflected pilot tone or tuner signal. The controller 235 can continue to make adjustments until the reflected pilot tone or tuner signal reaches or exceeds an acceptable, preferred, or minimum level. In addition or in the alternative, the controller 235 can make a certain number of adjustments and record the reflected pilot tone or tuner signal (e.g., in memory device 760) and identify the recorded reflected pilot tone or tuner signal having the best, preferred, or lowest level. In certain exemplary embodiments, the controller 235 sweeps the setting values for the SCA 305 and the SCA 310 in a monotonically increasing or decreasing process (e.g., one LSB or multiple LSBs at a time for digital SCAs). In certain exemplary embodiments, a binary algorithm, such as the algorithm illustrated in FIG. 20 and discussed below could be used to find a preferred setting for the SCA 305 and SCA 310.

In block 1525, the controller 235 stores the desired center frequency and the settings for the SCA 305 and SCA 310 corresponding to the acceptable, preferred, or minimum level in the lookup table 900 in the memory device 760. For example, the desired center frequency may be stored in the field "Freq1" and the settings for the SCA 305 and the SCA 310 may be stored in field "SCA_Input_BPF1."

Figure 16:
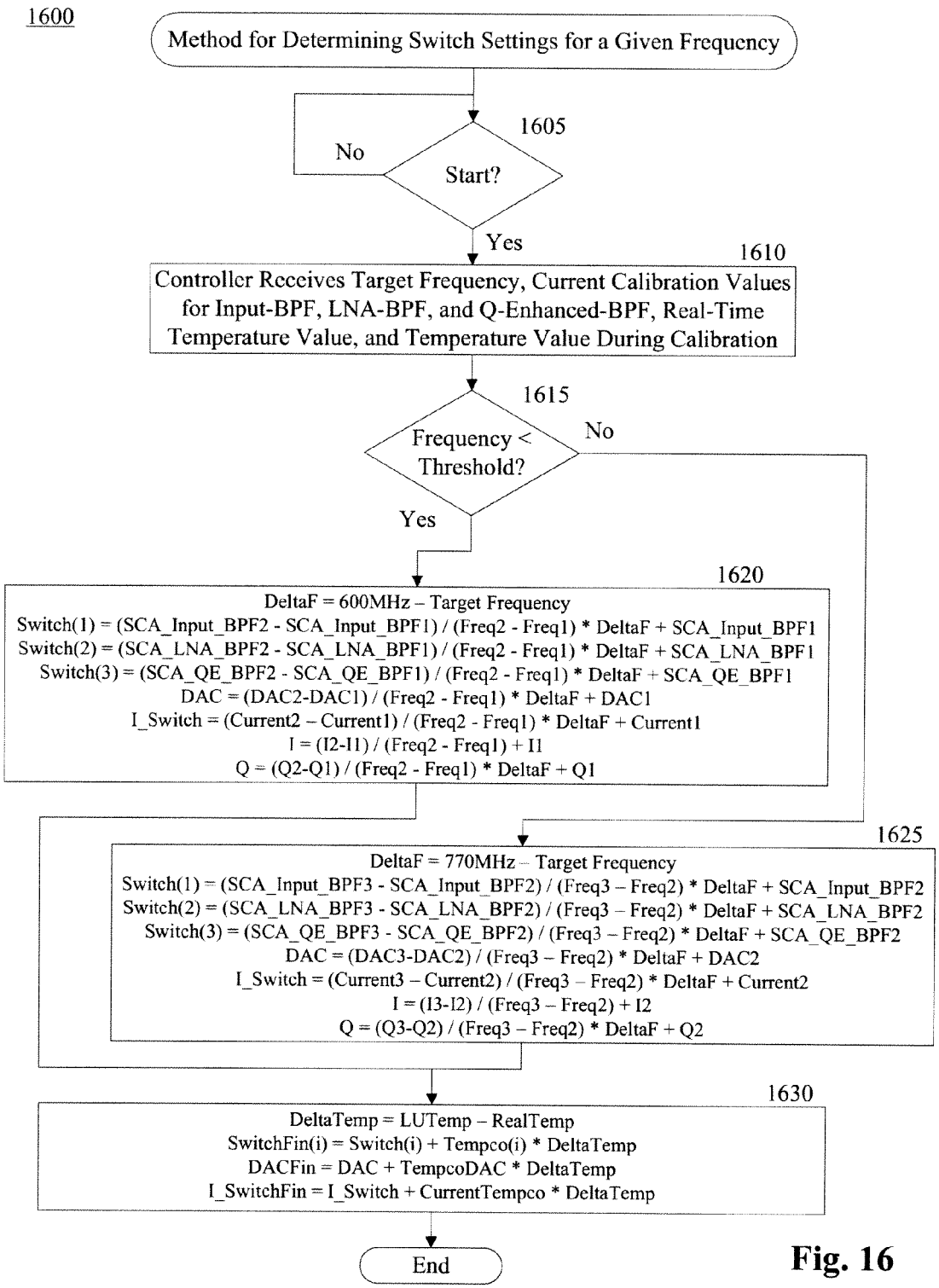
FIG. 16 is a flow chart depicting a method for determining switch settings for a given frequency, in accordance with certain exemplary embodiments.

FIG. 16 is a flow chart depicting a method 1600 for determining switch settings for a given frequency, in accordance with certain exemplary embodiments. For example, the method 1600 may be performed in response to a user applying a channel change for a mobile TV. In certain exemplary embodiments, the lookup table 900 includes the settings for each band-pass filter 205, 215, and 225 and the I and Q seed values for each channel the receiver 135 may tune to. In certain exemplary embodiments, the lookup table 900 includes the settings for each band-pass filter 205, 215, and 225 and the I and Q seed values for a predetermined number (e.g., 3) of channel frequencies. For such embodiments that do not include calibrated settings for each channel frequency, the method 1600 provides an exemplary process for computing the SCA switch settings for each band-pass filter 205, 215, and 225 at any application selectable channel frequency. The exemplary method 1600 takes into account the calibration values in the lookup table 900 identified for the predetermined number of channel frequencies and the actual temperature measured by an on-chip temperature sensor, such as temperature sensor 755.

In block 1605, the controller 235 conducts an inquiry to determine whether to start determining switch settings for each band-pass filter 205, 215, 225. In certain exemplary embodiments, the controller 235 communicates with the receiver 135 to determine whether the receive frequency for the receiver 135 has changed, for example as a result of a change in channel for the receiver 135. If the receive frequency for the receiver has changed, the controller 235 determines to start determining the switch settings for each band-pass filter 205, 215, 225 and proceeds to block 1610. Otherwise, the method 1600 remains in block 1605.

In certain exemplary embodiments, the controller 235 determines whether the temperature of the chip that the HIPCF canceller 130 resides has changed. The controller 235 monitors the temperature measurement received to determine whether the temperature has changed by a certain threshold. If the controller 235 determines that the temperature has changed by an amount equal to or exceeding the threshold, the controller 235 determines to start determining the switch settings for each band-pass filter 205, 215, 225 and proceeds to block 1610. Otherwise, the method 1600 remains in block 1605.

In certain exemplary embodiments, the controller 235 determines whether the lookup table 900 has changed or whether a setting or value in the lookup table 900 has been updated. If the controller 235 determines that the lookup table has changed, the controller 235 determines to start determining the switch settings for each band-pass filter 205, 215, 225 and proceeds to block 1610. Otherwise, the method 1600 remains in block 1605.

In block 1610, the controller 235 receives the receive frequency for the receiver 135 ("target frequency"), the current calibration values for the band-pass filters 205, 215, and 225 from the lookup table 900, a real-time or near real-time temperature measurement from the temperature sensor 755, and the temperature value during calibration from the lookup table 900.

In block 1615, the controller 235 conducts an inquiry to determine whether the target frequency is less than a frequency threshold. For example in certain mobile TV embodiments, this frequency threshold is set at 600 MHz which corresponds to the middle of the receive band of certain mobile TV tuners. If the target frequency is less than the frequency threshold, the method 1615 proceeds to block 1620. Otherwise, the method 1600 proceeds to block 1625.

In block 1620, controller 235 computes a variable "DeltaF" indicating the difference between the target frequency and the frequency threshold. The controller 235 performs an interpolation process, for example linear interpolation, using two or more of the calibration values in the lookup table 900 to determine the settings for the SCAs 305, 310, 315, and 615, the DAC settings for the voltage controlled capacitors VC1 and VC2, and bias current switch settings for the current switches M70-M7n. For example, for each aforementioned component, the controller 235 uses the setting stored for a first frequency, such as Freq1, and the setting stored for a second frequency, such as Freq2, in a linear interpolation calculation with DeltaF to determine the setting for that component.

In block 1625, the controller computes the variable DeltaF indicating the difference between the target frequency and a second frequency value. In certain exemplary embodiments, if the frequency threshold if 600 MHz, the second frequency value is 770 MHz. These frequency values are exemplary, rather than limiting, and other frequency values can be used without departing from the scope and spirit of the present invention. Similar to block 1620, the controller performs an interpolation process using two or more of the calibration values in the lookup table 900 to determine the settings for the SCAs 305, 310, 315, and 615, the DAC settings for the voltage controlled capacitors VC1 and VC2, and bias current switch settings for the current switches M70-M7n. For example, for each aforementioned component, the controller 235 uses the setting stored for a first frequency, such as Freq2, and the setting stored for a second frequency, such as Freq3, in a linear interpolation calculation with DeltaF to determine the setting for that component.

As shown in blocks 1620 and 1625, the method 1600 uses two different sets of calibrated settings to determine the settings for the components of the HIPCF canceller 130 depending upon the target frequency. This enables the controller 235 to use the calibrated settings nearest the target frequency to determine the appropriate settings for the components.

In block 1630, the controller 235 determines a temperature compensation by computing a variable "DeltaTemp" which yields the difference between actual temperature and the temperature at which the last calibration was performed (stored in field 950 of the lookup table 900). The controller 235 also computes offset values caused by the temperature difference for the settings for each component. The controller 235 uses the offset values to determine final setting for the components at the target frequency. The controller 235 stores the final settings in internal registers for use in operating the components. Note that the I and Q settings for the I/Q modulator 230 may not be temperature compensated in the method 1600 as the I and Q settings may be calibrated using one of the cancellation algorithms discussed below with reference to FIGS. 17-31.

Figure 17:
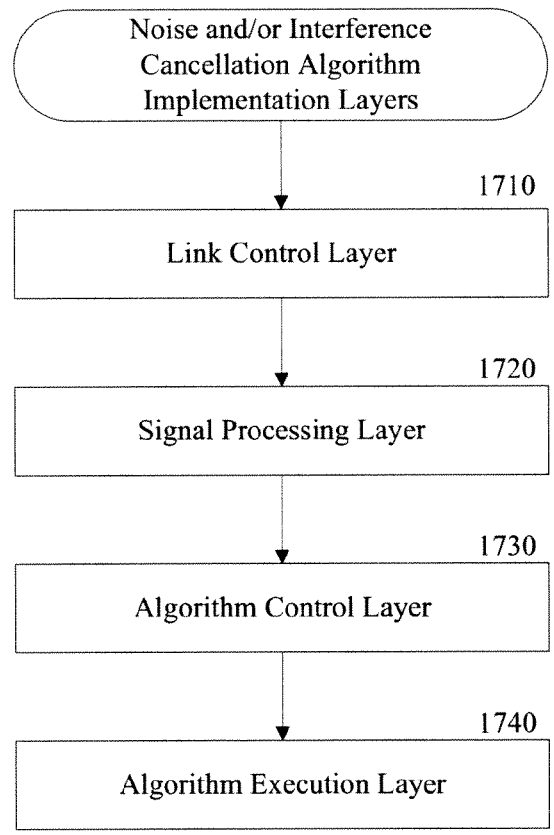
FIG. 17 depicts implementation layers of noise and/or interference cancellation algorithms, in accordance with certain exemplary embodiments.

FIG. 17 depicts implementation layers 1700 of noise and/or interference cancellation algorithms, in accordance with certain exemplary embodiments. These algorithms can use a feedback signal from the victim receiver 135 to determine appropriate I and Q settings for the HIPCF canceller 130. This feedback signal includes a quality indicator (e.g., BER, PER, RSSI, noise floor, SNR, EVM, and Position Accuracy, etc.) for the communication system 100. This exemplary implementation of algorithms includes four layers, a link control layer 1710, a signal processing layer 1720, an algorithm control layer 1730, and an algorithm execution layer 1740. In certain exemplary embodiments, each of the layers 1710-1740 may reside in any of the following three components: 1) a baseband integrated circuit of the victim receiver 135, 2) a stand alone microcontroller, or 3) the on-chip controller 235 (or another control device) of the HIPCF 130. For ease of discussion, the layers 1710-1740 will be discussed hereinafter in terms of the controller 235 performing the respective functions.

In the link control layer 1710, the feedback signal is analyzed and tested for quality to determine whether cancellation should be activated to improve the sensitivity of the victim receiver 135. Due to the nature of the active noise and/or interference cancellation which the HIPCF canceller 130 provides, the HIPCF canceller 130 may also output its own noise floor while canceling the noise and/or interference generated by the power amplifier 110 (or another component) at the input of the victim receiver 135. As a result, the overall noise floor seen by the victim receiver 135 is the summation of the output noise floor of the HIPCF canceller 130, the receiving antenna 120, the power amplifier noise and/or interference received by the receiving antenna 120, and the phase and gain adjusted noise floor of the power amplifier 110 (via the HIPCF canceller 130), which in turn can affect the sensitivity of the victim receiver 135. Thus, the determination as to whether or not to activate the HIPCF canceller 130 to improve the sensitivity of the victim receiver 135 may be decided based on the actual noise and/or interference of the power amplifier 110 received by the victim receiver 135.

Figure 18:
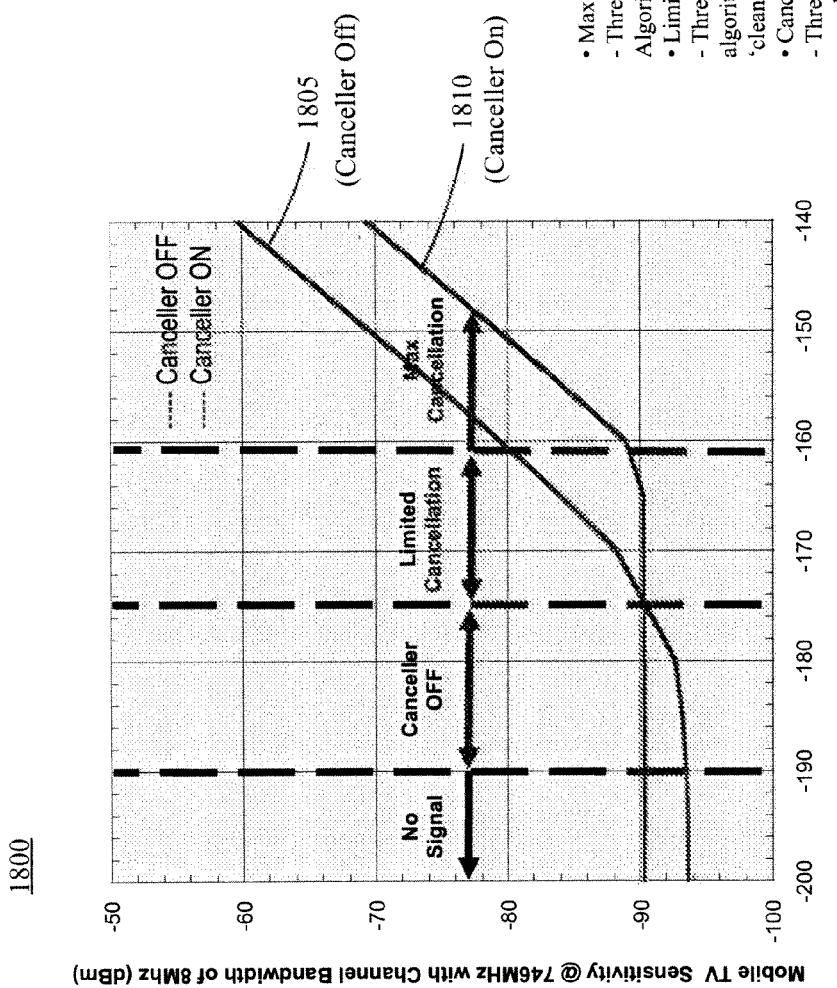
FIG. 18 is a diagram depicting receiver sensitivity plotted versus coupled power amplifier phase noise, in accordance with certain exemplary embodiments.

FIG. 18 depicts a diagram 1800 of receiver sensitivity plotted versus coupled power amplifier noise for a mobile TV tuner tuned at 746 MHz with a channel bandwidth of 8 MHz and a CDMA800 power amplifier, in accordance with certain exemplary embodiments. Referring to FIG. 18, the diagram 1800 includes a first curve 1805 depicting the mobile TV tuner sensitivity with the HIPCF canceller 130 inactive and a second curve 1810 depicting the mobile TV tuner sensitivity with the HIPCF canceller 130 canceling or suppressing the power amplifier noise. As illustrated in the exemplary implementation, there is no advantage to activating the HIPCF noise canceller 130 for power amplifier noise below −174 dBm/Hz as the output noise floor of the HIPCF canceller 130 would exceed the benefit of canceling the coupled power amplifier noise. For power amplifier noise above approximately −160 dBm/Hz, maximum cancellation/sensitivity improvement (e.g., approximately 10 dB in this exemplary implementation) would be achieved with the HIPCF canceller 130 active as the received power amplifier noise is typically much higher than the output noise floor of the HIPCF canceller 130. Additionally, the link control layer 1710 detects in multi-channel systems whether a particular channel has been optimized in the past and passes the setting corresponding to prior optimization from the memory to the HIPCF 130. An indication of whether the channel has been optimized previously can be stored in memory by the controller 235 at the conclusion of or during an optimization.

Figure 19:
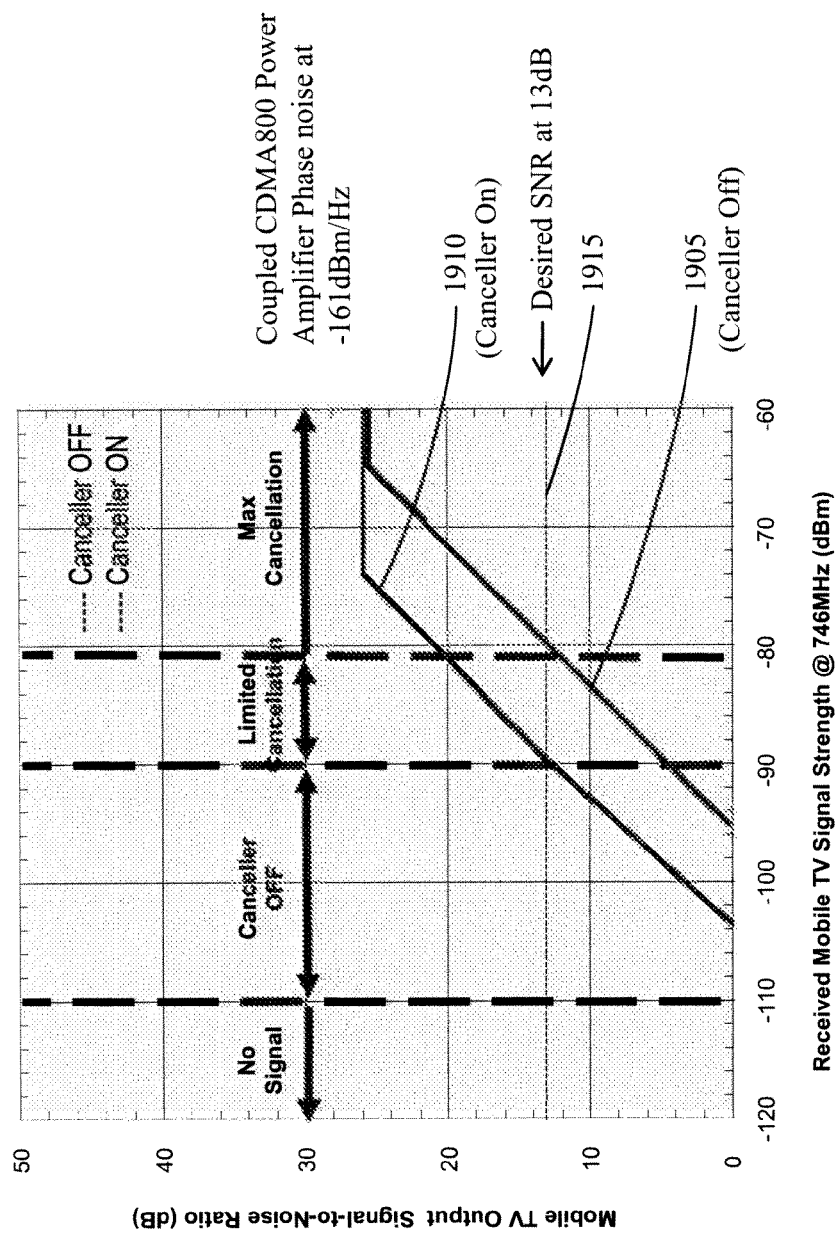
FIG. 19 is a diagram depicting an output signal to noise ratio (SNR) of a mobile TV tuner plotted versus a received mobile TV tuner signal strength, in accordance with certain exemplary embodiments.

The desired victim receive signal quality may be assessed with respect to feedback (e.g., BER, PER, RSSI, noise floor, SNR, EVM, and Position Accuracy, etc.) received from the receiver to determine whether to activate the HIPCF canceller 130. For example, the HIPCF 130 may be activated if the feedback indicates that the receive signal is above the combined noise floor (i.e., the summation of the output noise floor of the HIPCF canceller 130, the receiving antenna 120, the power amplifier noise and/or interference received by the receiving antenna 120, and the phase and gain adjusted noise floor of the power amplifier 110 (via the HIPCF canceller 130). This feature is illustrated in FIG. 19, which depicts a diagram 1900 of an output SNR of a mobile TV tuner tuned at 746 MHz with a channel bandwidth of 8 MHz versus received mobile TV signal strength with a coupled CDMA800 power amplifier phase noise at −161 dBm/Hz at the input of victim receiver 135, in accordance with certain exemplary embodiments. Referring to FIG. 19, the diagram 1900 includes a first curve 1905 depicting the mobile TV tuner output SNR with the HIPCF canceller 130 inactive, and a second curve 1910 depicting the mobile TV tuner output SNR with the HIPCF canceller 130 canceling or suppressing the power amplifier phase noise. A third curve 1915 depicts a desired minimum SNR output for the mobile TV tuner. As illustrated in the exemplary implementation, there may not be an advantage in activating the HIPCF noise canceller 130 when the received mobile TV signal is below −90 dBm.

The exemplary link control layer 1710 includes several modes of operation. The controller 235 can determine which mode of operation to be active based on the signal quality of the signal received by the receiver 135. In certain exemplary embodiments, the link control layer 1710 includes four modes of operation, a maximum cancellation mode, a limited cancellation mode, a wait for acceptable signal mode, and a no signal mode. In this exemplary embodiment, if the received signal strength is acceptable (e.g., above an acceptable threshold level which is −81 dBm in FIG. 19), the controller 235 commences the maximum cancellation mode whereby the noise and/or interference cancellation of the HIPCF canceller 130 is at a high level. If the received signal strength is low (e.g., between an acceptable level threshold and a very low level threshold, which is between −81 dBm and −90 dBm in FIG. 19), the controller 235 commences the limited cancellation mode of the HIPCF canceller 135 whereby the noise and/or interference cancellation level is bounded by the noise floor. If the received signal is lower than a threshold indicating, for example, a very low signal (e.g. around −90 dBm in FIG. 19), the controller 235 will commence the wait for acceptable signal mode whereby the controller 235 delays entering the subsequent layers 1720-1740 until the received signal meets or exceeds the threshold. If the received signal meets or exceeds the threshold while the controller 235 is in the wait for acceptable signal mode, the controller 235 can enter the subsequent layers 1720-1740. If there is no signal received at the receiver 135, then the controller 235 commences the no signal mode whereby the HIPCF canceller 130 is inactive.

The link control layer 1710 also may deduct information on the time dependent passing of the thresholds, for example when both threshold levels are passed in less than one second. A mobile device may be transported into a tunnel or under a bridge and all settings can be held constant until the passing of the acceptable level threshold indicates that the mobile device has returned from the tunnel or bridge. The operation of the link control layer 1710 can then resume using the held settings.

The signal processing layer 1720 includes several processes that ensure stability and robustness of the feedback signal. A first process includes averaging a predetermined number of feedback values of the feedback signal before executing a noise cancellation algorithm.

A second process includes correction for errors in feedback signals during the execution of a noise cancellation algorithm. One exemplary error correction process includes obtaining two feedback values from the receiver 135 and computing the difference between the two feedback values. If this difference is less than a tolerance level, then the two feedback values are averaged. Otherwise, a third feedback value is obtained from the receiver 135 and the difference between the third feedback value and the second feedback value is determined. If this difference is less than the tolerance level, then the second and third feedback values are averaged. Otherwise, a fourth feedback value is obtained and a similar process is performed for a predetermined number of iterations. If no two feedback values are found that have a difference less than the tolerance level, then an error may be indicated and the HIPCF canceller 130 may be deactivated. A second exemplary error correction process includes ranking a certain number of feedback values and selecting a certain number of the feedback values while a noise cancellation algorithm is running. For example, the controller 235 may rank ten feedback values and select the five feedback values ranked in the middle. The average of the selected feedback signals are calculated and used in the noise cancellation algorithms.

A third process of the signal processing layer 1720 includes SNR averaging. This SNR averaging process includes computing the average value of the SNRs for different satellites (SVs), for example GPS systems, DARS (Digital Audio Radio Service), or Iridium. The SNR averaging may be performed for satellites that have a certain elevation level above an elevation threshold only, to avoid an incorrect decision in the algorithm execution layer 1740.

In the algorithm control layer 1730, several user controls can be implemented to control the algorithms described in the algorithm execution layer 1740. One such user control is the polarity of the logic used to compare two feedback values, for example before and after a change of I and/or Q settings of the HIPCF canceller 130. The polarity can either be positive (e.g., higher feedback value is better) or negative (e.g., lower feedback value is better). Some exemplary feedback signals where a positive polarity may be used are SNR, Carrier to Noise Ratio (C/N), and Repeater Amplifier Gain. Some exemplary feedback signals where a negative polarity may be used are PER, BER, Error Vector Magnitude, Noise Floor Level, Adjacent Channel Power Ratio, and Adjacent Channel Leakage Ratio.

The algorithm execution layer 1740 includes the execution of one of several noise cancellation algorithms. These algorithms include acts to adjust the I and Q values of the HIPCF canceller 130 and evaluate the feedback signal resulting from the adjustment to find acceptable I and Q values for operating the HIPCF canceller 130. The algorithms include two types of binary algorithms (a fast binary algorithm (FBA) and a binary correction algorithm (BCA)), a minstep algorithm (MSA), a blind shot algorithm (BSA), a dual slope algorithm (DSA), and a track and search algorithm (TSA).

Figure 20:
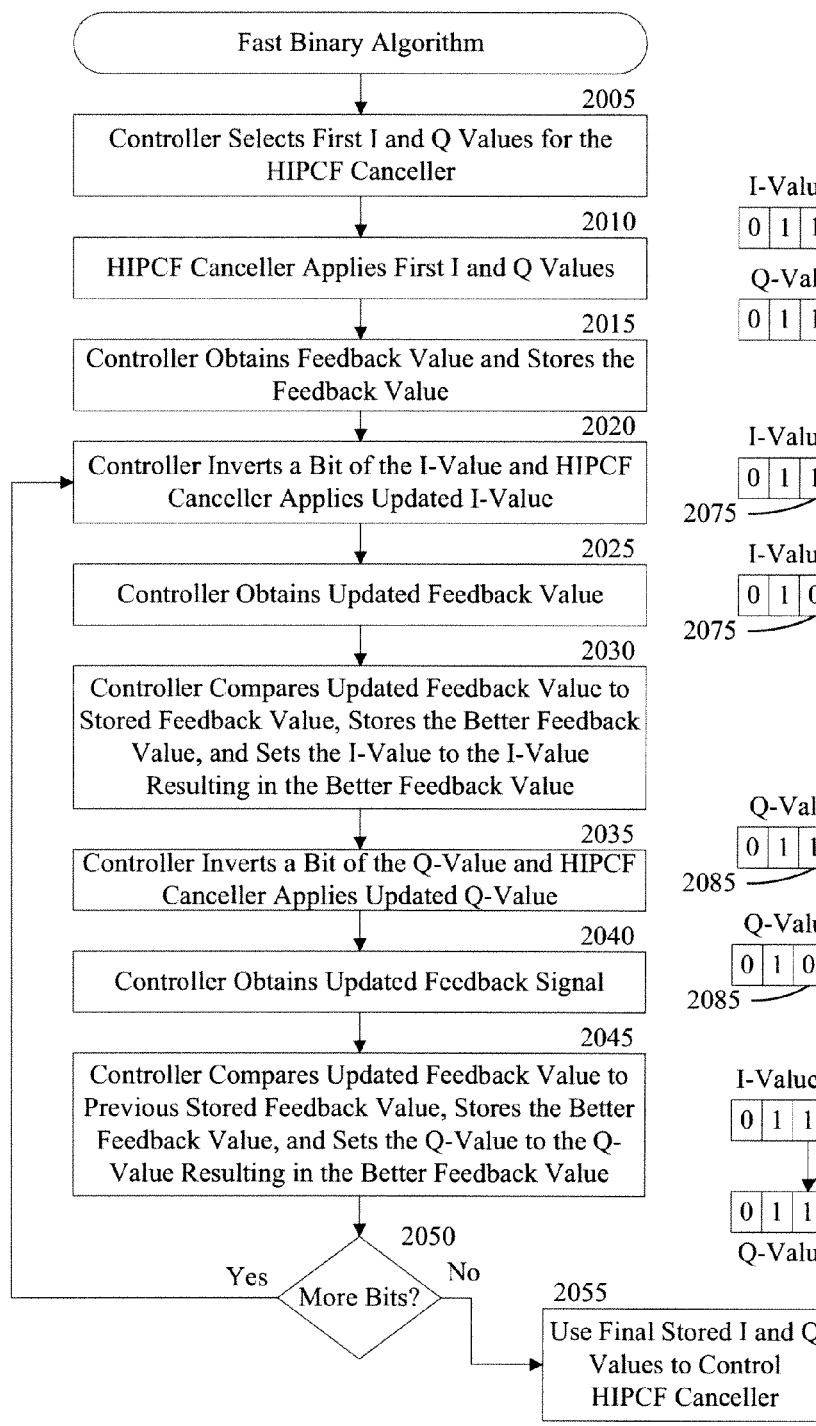
FIG. 20 is a flow chart depicting a fast binary algorithm for canceling noise or interference, in accordance with certain exemplary embodiments.

FIG. 20 is a flow chart depicting a fast binary algorithm 2000 for canceling noise and/or interference, in accordance with certain exemplary embodiments. In this exemplary FBA 2000, each bit in I and Q values for the HIPCF canceller 130 are sequentially reversed and tested for a better feedback value as determined by the polarity defined in the algorithm control layer 1730. The FBA 2000 may start with a start bit and progress sequentially through each of the bits of the I-value and Q-value until reaching a pre-defined stop bit. In certain exemplary embodiments, the start bit and stop bit may be user selected.

In block 2005, the controller 235 selects a first I-value and a first Q-value for operating the HIPCF canceller 130. These first values may be start values from the lookup table 900, seed values, or middle of range values. In block 2010, the HIPCF canceller 130 applies the first I-value and first Q-value to the I/Q modulator 230.

In block 2015, the receiver 135 provides a feedback signal having a feedback value to the controller 235. The feedback value may be an SNR, an RSSI, a Carrier to Noise Ratio (C/N), RSSI, a Repeater Amplifier Gain, a PER, a BER, an Error Vector Magnitude, a Noise Floor Level, an Adjacent Channel Power Ratio, or an Adjacent Channel Leakage Ratio. After obtaining the feedback value from the receiver 135, the controller 235 stores the feedback value in memory.

In block 2020, the controller 235 inverts a bit of the I-value and transmits the updated I-value to the HIPCF canceller 130. In response, the HIPCF canceller 130 applies the updated I-value to the I/Q modulator 230. For example, bit 2075 of I-value 2071 may be inverted from a value of "1" to a value of "0." In the first iteration of this block 2020, the controller 235 may invert the start bit of the I-value. In each subsequent iteration, the next bit may be inverted until the stop bit is completed.

In block 2025, the controller 235 obtains an updated feedback value from the receiver 135. In block 2030, the controller 235 compares the updated feedback value to the stored feedback value to determine which of the two feedback values is better based on the polarity defined in the algorithm control layer 1730. For example, if the polarity is positive and the updated feedback value is greater than the stored feedback value, then the controller 235 will determine that the updated feedback value is better. Likewise, if the polarity is negative and the updated feedback value is greater than the stored feedback value, then the controller 235 will determine that the stored feedback value is better. The controller 235 stores the better feedback value and sets the I-value to the I-value that resulted in the better feedback value. The controller 235 also applies the I-value that resulted in the better feedback value to the HIPCF canceller 130.

In block 2035, the controller 235 inverts a bit of the Q-value and transmits the updated Q-value to the HIPCF canceller 130. In response, the HIPCF canceller 130 applies the updated Q-value to the I/Q modulator 230. For example, bit 2085 of Q-value 2081 may be inverted from a value of "1" to a value of "0." In the first iteration of this block 2035, the controller 235 may invert the start bit of the Q-value. In each subsequent iteration, the next bit may be inverted until the stop bit is completed.

In block 2040, the controller 235 obtains an updated feedback value from the receiver 135. In block 2045, the controller 235 compares the updated feedback value to the stored feedback value to determine which of the two feedback values is better based on the polarity defined in the algorithm control layer 1730. The controller 235 stores the better feedback value and sets the Q-value to the Q-value that resulted in the better feedback value. The controller 235 also applies the Q-value that resulted in the better feedback value to the HIPCF canceller 130.

In block 2050, the controller 235 conducts an inquiry to determine whether there are more bits in the I-value and Q-value to test. For example, the controller 235 may determine whether the previous iteration of blocks 2020-2050 evaluated the stop bit. If there are more bits to test, the "Yes" branch is followed back to block 2020 where another bit is inverted and evaluated for better feedback. Otherwise, the "No" branch is followed to block 2055. In block 2055, the controller 235 operates the HIPCF canceller 130 using the final stored I-value and Q-value.

In certain exemplary embodiments, the FBA 2000 illustrated in FIG. 20 may not cover every condition and thus, it may be improved by assigning a one or two bit start value (e.g., most significant bit (MSB)) for both the I-value and the Q-value. Another improvement to the FBA 2000 includes executing the BSA described below prior to executing the FBA 2000 to obtain a start value for the I-value and for the Q-value.

The BCA is a modification to the fast binary algorithm illustrated in FIG. 20 and described above. In the BCA, each bit of both the I and Q values are sequentially reversed as in the fast binary algorithm, and either increased by a value of "1" if the original value of the bit is "1" (and thus, causing a carry to its immediate neighboring more significant bit) or decreased by "1" if the original value is "0" (and thus, causing a borrow from its immediate neighboring more significant bit). In both cases, the controller 235 would evaluate the feedback value to determine which value (I-value or Q-value depending on the block) resulted in better feedback. Similar to the FBA, the I-value and Q-value that resulted in the better feedback value is stored and used at the completion of the algorithm to control the HIPCF canceller 130. The BCA may begin with a start bit and proceed through each bit until the stop bit is completed. In certain exemplary embodiment, the start and stop bits may be user selected. In certain exemplary embodiments, if no BSA is performed prior to the execution of the binary correction algorithm, the binary correction algorithm may start with the MSB and with bit reversal only for the MSB of the I-value and the Q-value as there is not a more significant bit to carry to or borrow from for the MSB. After the MSB for the I-value and Q-value have been completed, the feature of increasing or decreasing an evaluated bit by a value of "1" may begin with the second MSB.

Figure 21:
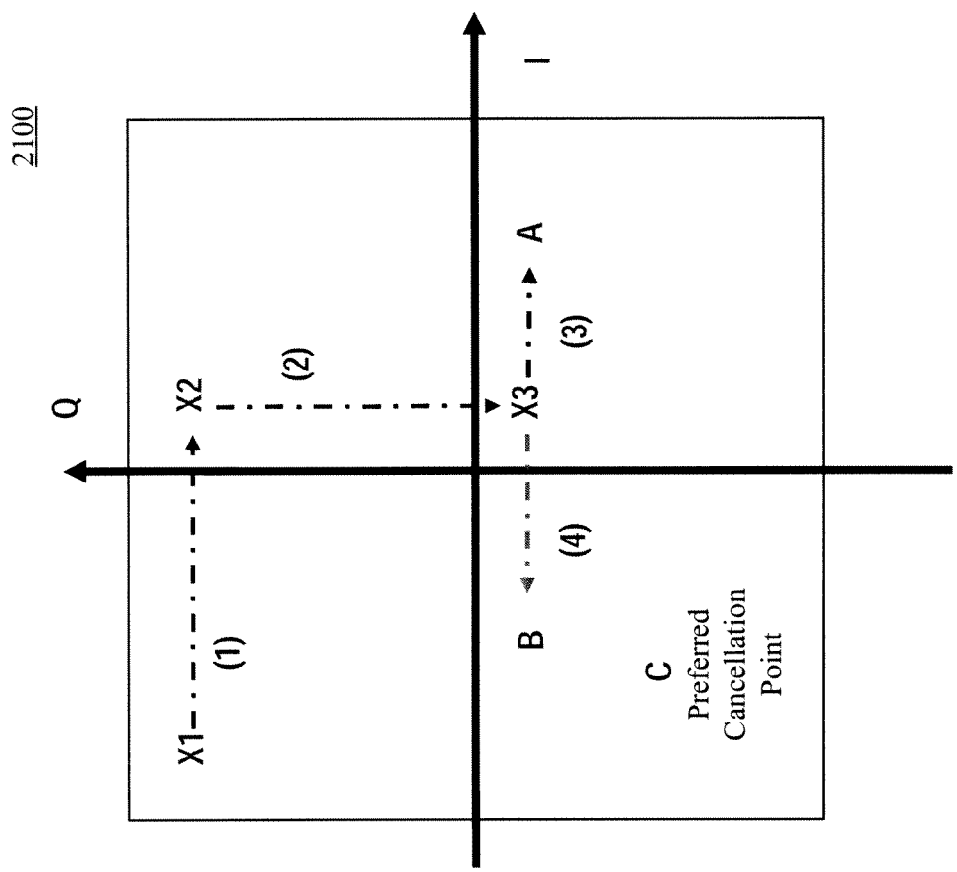
FIG. 21 depicts a graph of in-phase (I) and quadrature (Q) values adjusted using binary algorithms, in accordance with certain exemplary embodiments.

The motivation for implementing the BCA in place of the FBA 2000 can be discussed with reference to FIG. 21, which depicts a graph 2100 of I and Q values adjusted using the binary algorithms. Referring to FIG. 21, point X1 represents a plot of an initial I-value and Q-value for the HIPCF canceller 130. As part of the binary algorithms, the MSB of the I-value is inverted to proceed from point X1 point X2. In this graph, the feedback value at point X2 is determined to be better than the feedback value at point X1. Thus, the binary algorithms would keep the I-value for point X2 and invert the MSB of the Q-value to proceed to point X3.

At point X3, assuming the feedback value is determined to be better at point X3 than at point X2, in the FBA 2000, the second MSB of the I-value would be inverted. This bit inversion would cause the algorithm to proceed from point X3 to point A, which is further away from optimal point C and thus, would have an inferior feedback value to that of point C. In the binary correction algorithm, the feedback value would be tested at both points A and B by increasing or decreasing the second MSB of the I-value by a value of "1" and thus, affecting the MSB. Because point B is closer to the optimal point C, point B would result in a better feedback value than point A and the BCA would continue from point B rather than point X3. Thus, the BCA can be more accurate than the fast binary algorithm. However, the BCA may require more iterations and more hardware in certain implementations.

Figure 22:
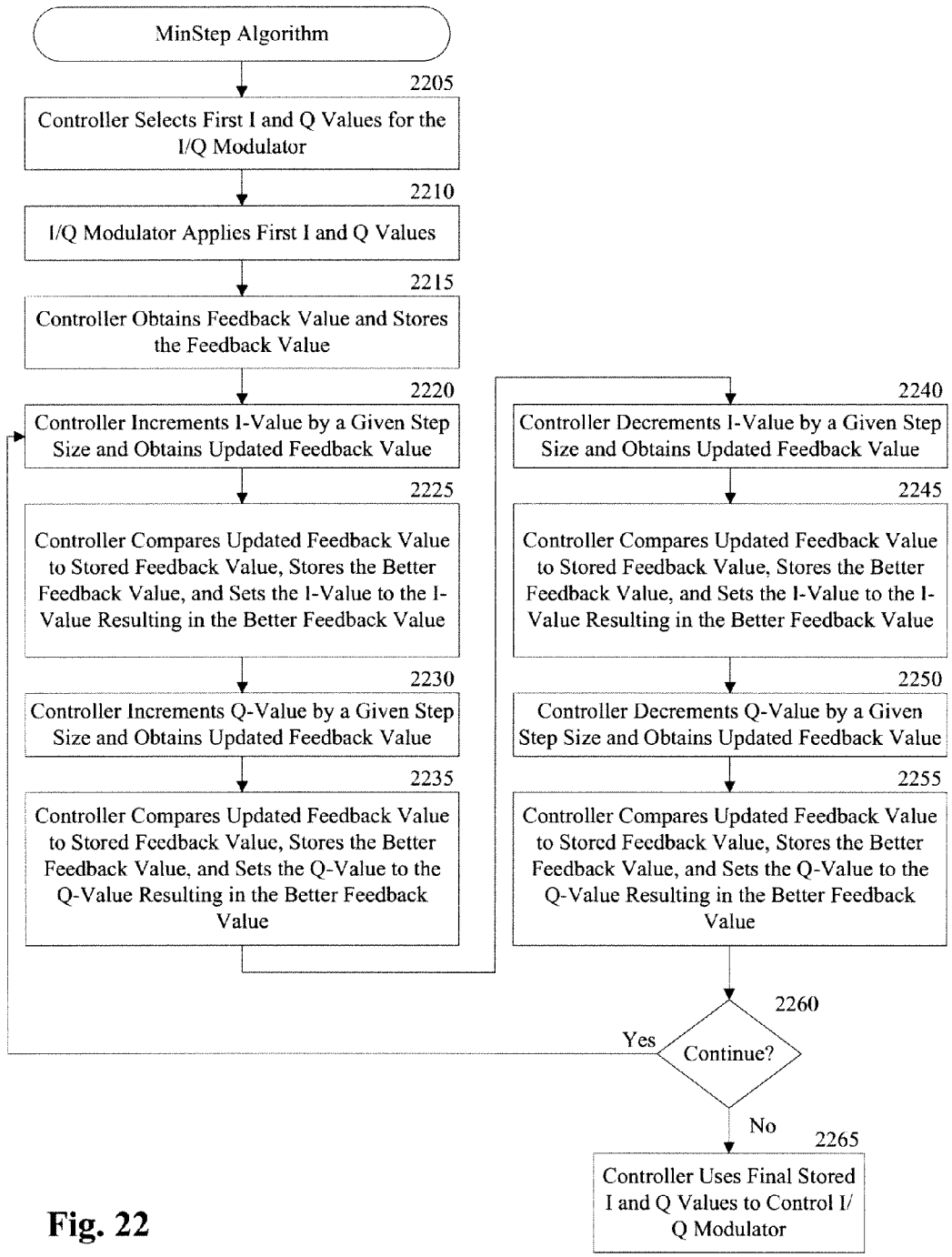
FIG. 22 is a flow chart depicting a minstep algorithm for canceling noise and/or interference, in accordance with certain exemplary embodiments.

FIG. 22 is a flow chart depicting a minstep algorithm 2200 for canceling noise and/or interference, in accordance with certain exemplary embodiments. The exemplary MSA 2200 can provide fine tuning to the noise cancellation, for example after one of the binary algorithms has been executed. The MSA 2200 can follow changes in the coupling channel between an interferer/noise source (e.g., power amplifier 110) and the victim receiver 135. For a given step size (e.g., 1 LSB to 7 LSB resolution), noise and/or interference cancellation can be achieved by incrementing (plus step size) or decrementing (minus step size) I-values and Q-values sequentially. In certain exemplary embodiments, the incrementing or decrementing stops at maximum or minimum values for the appropriate I-value or Q-value (e.g., range criteria). In certain exemplary embodiments, the MSA 2200 runs for a given number of iterations or time period and can be interrupted by a user. I-values and Q-values each oscillate around an desirable value or follow changes in coupling channel.

Referring to FIGS. 1, 2, and 22, in block 2205, the controller 235 selects a first I-value and a first Q-value for operating the HIPCF canceller 130. In block 2210, the HIPCF canceller 130 applies the first I-value and the first Q-value to the I/Q modulator 230.

In block 2215, the receiver 135 provides a feedback signal having a feedback value to the controller 235. The feedback value may be a SNR, a RSSI, a Carrier to Noise Ratio (C/N), a Repeater Amplifier Gain, a PER, a BER, an Error Vector Magnitude, a Noise Floor Level, an Adjacent Channel Power Ratio, or an Adjacent Channel Leakage Ratio, etc. After obtaining the feedback value from the receiver 135, the controller 235 stores the feedback value in memory.

In block 2220, the controller 235 increments the I-value by a given step size (e.g., 1 LSB) and transmits the updated I-value to the HIPCF canceller 130. In response, the HIPCF canceller 130 applies the updated I-value to the I/Q modulator 230. The controller 235 also obtains an updated feedback value from the receiver 135.

In block 2225, the controller 235 compares the updated feedback value to the stored feedback value to determine which of the two feedback values is better based on the polarity defined in the algorithm control layer 1730. The controller 235 stores the better feedback value and sets the I-value to the I-value that resulted in the better feedback value. The controller 235 also applies the I-value that resulted in the better feedback value to the HIPCF canceller 130.

In block 2230, the controller 235 increments the Q-value by a given step size (e.g., one LSB) and transmits the updated Q-value to the HIPCF canceller 130. In response, the HIPCF canceller 130 applies the updated Q-value to the I/Q modulator 230. The controller 235 also obtains an updated feedback value from the receiver 135.

In block 2235, the controller 235 compares the updated feedback value to the stored feedback value to determine which of the two feedback values is better based on the polarity defined in the algorithm control layer 1730. The controller 235 stores the better feedback value and sets the Q-value to the Q-value that resulted in the better feedback value. The controller 235 also applies the Q-value that resulted in the better feedback value to the HIPCF canceller 130.

In block 2240, the controller 235 decrements the I-value by a given step size (e.g., one LSB) and transmits the updated I-value to the HIPCF canceller 130. In response, the HIPCF canceller 130 applies the updated I-value to the I/Q modulator 230. The controller 235 also obtains an updated feedback value from the receiver 135.

In block 2245, the controller 235 compares the updated feedback value to the stored feedback value to determine which of the two feedback values is better based on the polarity defined in the algorithm control layer 1730. The controller 235 stores the better feedback value and sets the I-value to the I-value that resulted in the better feedback value. The controller 235 also applies the I-value that resulted in the better feedback value to the HIPCF canceller 130.

In block 2250, the controller 235 decrements the Q-value by a given step size (e.g., one LSB) and transmits the updated Q-value to the HIPCF canceller 130. In response, the HIPCF canceller 130 applies the updated Q-value to the I/Q modulator 230. The controller 235 also obtains an updated feedback value from the receiver 135.

In block 2255, the controller 235 compares the updated feedback value to the stored feedback value to determine which of the two feedback values is better based on the polarity defined in the algorithm control layer 1730. The controller 235 stores the better feedback value and sets the Q-value to the Q-value that resulted in the better feedback value. The controller 235 also applies the Q-value that resulted in the better feedback value to the HIPCF canceller 130.

In block 2260, the controller 235 conducts an inquiry to determine whether to continue repeating blocks 2220 through 2255. In certain exemplary embodiments, the determination is based on a time period. If the time period has expired, then the controller 235 determines not to continue. In certain exemplary embodiments, the determination is based on the sensitivity of the receiver 135 or based on the feedback value obtained in block 2255. In certain exemplary embodiments, the determination is based on the number of iterations executed. If the controller 235 determines to continue repeating blocks 2220-2255, then the "Yes" branch is followed back to block 2220. Otherwise, the "No" branch is followed to block 2265. In block 2265, the controller 235 operates the HIPCF canceller 130 using the final selected I-value and Q-value.

In certain exemplary embodiments, the decision to change from an increment in I-value or Q-value to a decrement is based upon whether the previous iteration rejected the new feedback value, i.e. the new feedback value was not preferred over the previous feedback value.

Although the FBA 2000, the BCA 2100, and the MSA 2200 have been discussed above in terms of a changing sequence of IQIQIQ, the FBA 2000, the BCA 2100, and the MSA 2200 could also be implemented using other sequences, including IIQQIIQQ, and IIIQQQIIIQQQ, for example.

Figure 23:
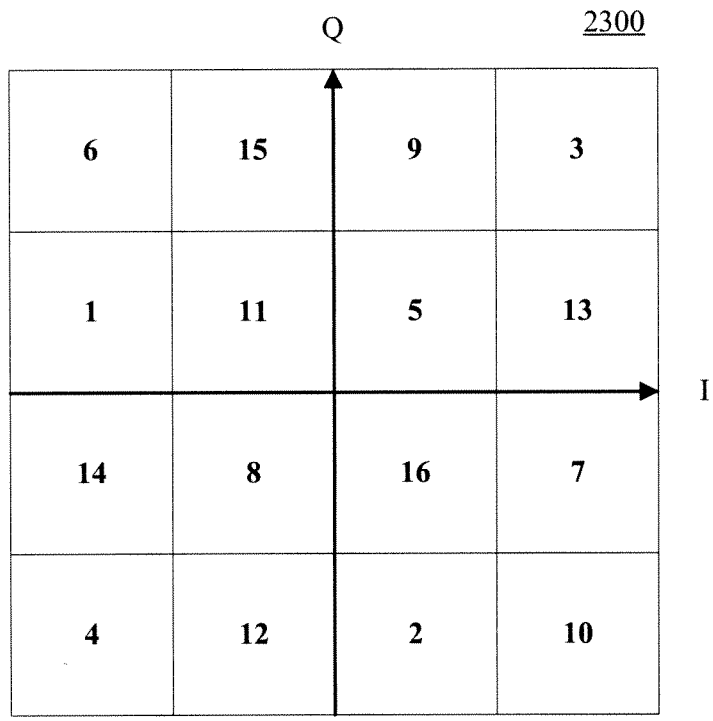
FIG. 23 depicts an I-Q plane with pseudorandom feedback values, in accordance with certain exemplary embodiments.

The BSA can be executed when signal conditions are poor (e.g., acceptable start I- and Q-values are not available), or the victim receiver baseband ICs have limited accuracy for BER or SNR as the feedback value. In such an implementation, the BSA can be executed to determine a start I-value and a start Q-value for the algorithms discussed above (i.e., the FBA 2000, the BCA 2100, or the MSA 2200. FIG. 23 depicts an I-Q plane 2300 having 16 sub-regions with feedback values that are pseudorandom. The BSA can evaluate the feedback for multiple different I and Q pre-samples (e.g., from a lookup table) and select the pre-sample having the best feedback value. After the best pre-sample is determined, the BSA can transition to either the FBA 2000, the BCA 2100, or the MSA 2200 and use the I-value and Q-value for the pre-sample as a starting point for the algorithm.

There are several methods for implementing the BSA. In one method, the I and Q values associated with the best feedback value are selected from a number of samples (e.g., 4 or 16) with preset I and Q values. In the case of 10-bit I and Q values, four samples of feedback values may be taken from the following locations in the I and Q plane:

I=(0xFF, 0x2FF, 0xFF, 0x2FF)
Q=(0x2FF, 0x2FF, 0xFF, 0xFF)

In the case of 10-bit I and Q values, sixteen samples of feedback values may be taken from the following locations in the I and Q plane:

I=(0x80, 0x80, 0x80, 0x80, 0x180, 0x180, 0x180, 0x180, 0x280, 0x280, 0x280, 0x280, 0x380, 0x380, 0x380, 0x380)
Q=0x80, 0x180, 0x280, 0x380, 0x80, 0x180, 0x280, 0x380, 0x80, 0x180, 0x280, 0x380, 0x80, 0x180, 0x280, 0x380)

The above locations are exemplary rather than limiting and many other locations are feasible without departing from the scope and spirit of the present invention.

A second method for implementing the BSA includes obtaining feedback values at each of four (or other number) preset I and Q points. The maximum and minimum feedback values of the obtained feedback values can be identified. A feedback threshold is determined by either a) averaging the minimum and maximum feedback values, or b) adding a user selected offset value to the minimum feedback value. After determining the feedback threshold, the BSA can evaluate the feedback values for I and Q points proximal the best field out of the four I and Q points. For example, the BSA can use a user specified step size to explore I and Q points proximal the best of the four I and Q points. The BSA can terminate when one sample feedback meets or exceeds the feedback threshold. The BSA can then transition to the MSA 2200.

Figure 24:
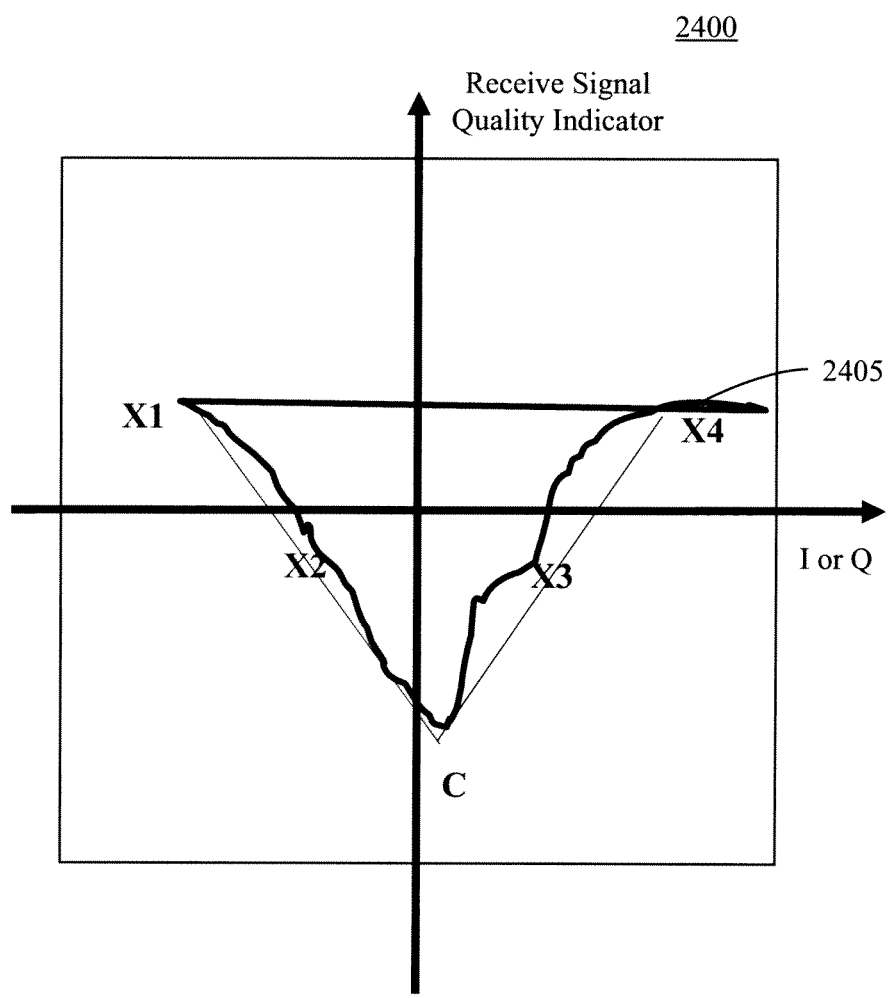
FIG. 24 is a graph depicting a receive quality indicator plotted versus I or Q values resulting from an implementation of a dual slope algorithm (DSA), in accordance with certain exemplary embodiments.

The DSA uses an isosceles triangle approximation with two equal and opposite slopes for approximating a noise funnel curve. FIG. 24 is a graph 2400 depicting a receive signal quality indicator 2405 plotted versus I or Q values resulting from an implementation of a DSA, in accordance with certain exemplary embodiments. The DSA can select four points (X1-X4) along a noise funnel curve formed by the receive signal quality indicator 2405 and compute a vertex, which is close to cancellation point C. The vertex can be computed using point-slope form of a linear equation. Once the vertex is found, the DSA can transition to the MSA 2200, using the vertex as starting I and Q values.

Figure 25:
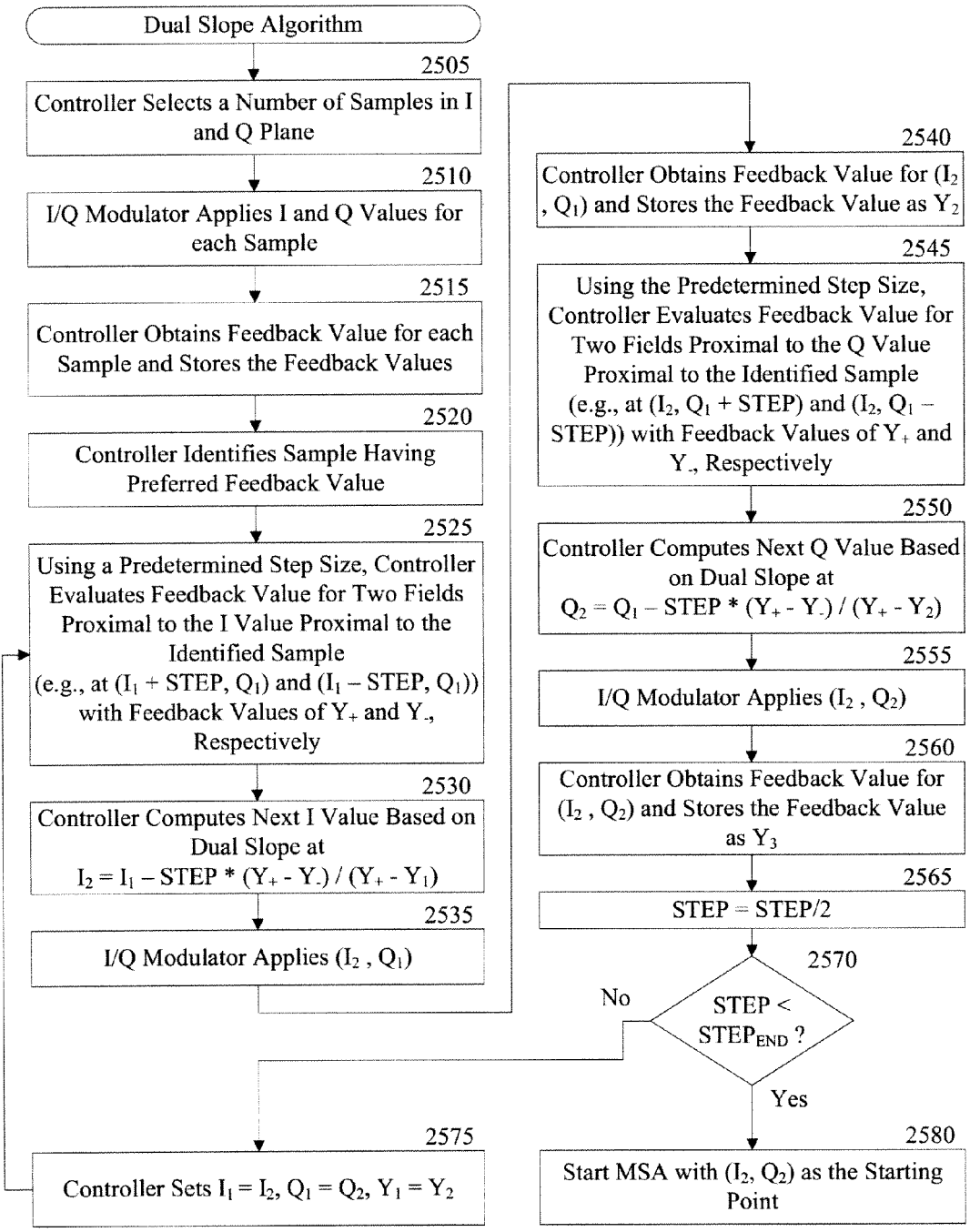
FIG. 25 is a flow chart depicting a DSA for canceling noise and/or interference, in accordance with certain exemplary embodiments.
Figure 26:
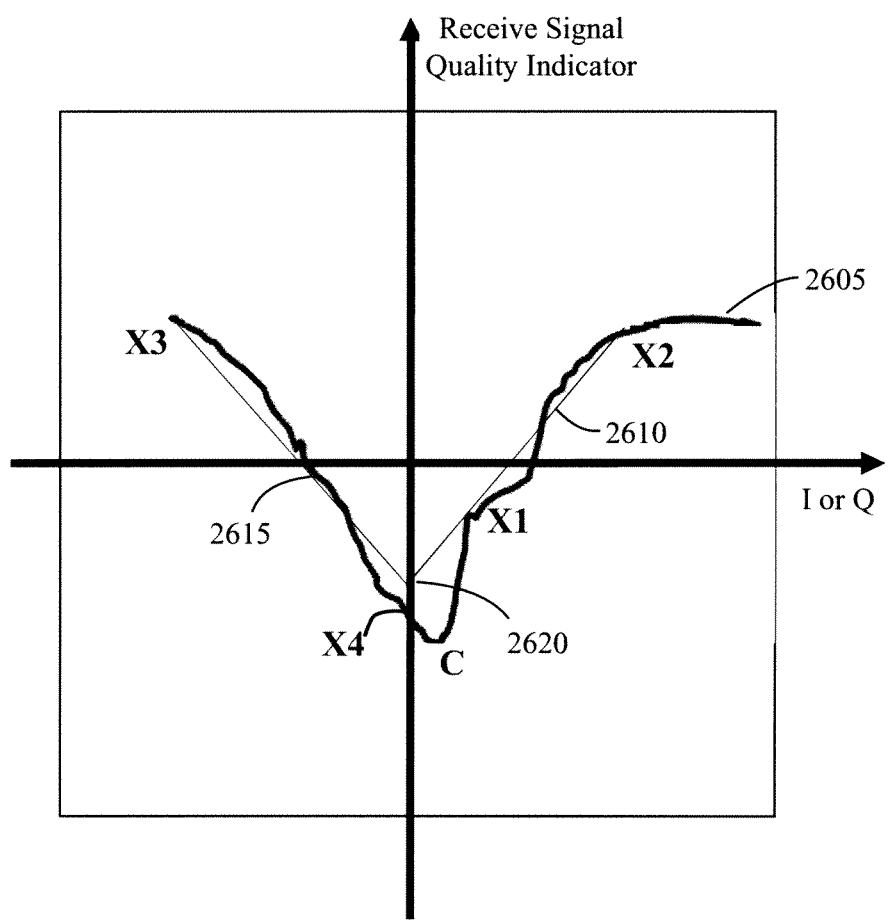
FIG. 26 is a graph depicting a receive quality indicator plotted versus I or Q values resulting from an implementation of the dual slope algorithm of FIG. 24, in accordance with certain exemplary embodiments.

FIG. 25 is a flow chart depicting a DSA 2500 for canceling noise and/or interference, in accordance with certain exemplary embodiments. FIG. 26 is a graph 2600 depicting a curve 2605 of receive signal quality indicator plotted versus either an I or Q axis (against I and Q axes if FIG. 26 is plotted in three dimensions) resulting from an implementation of the DSA 2500 of FIG. 25, in accordance with certain exemplary embodiments. The exemplary DSA 2500 uses an isosceles triangle approximation with two equal and opposite slopes for a noise funnel curve formed by the receiver signal quality indicator 2605. Referring to FIGS. 25 and 26, in block 2505, the controller 235 selects a number of samples of I-values and/or Q-values along the I or Q axis. For example, the controller 235 may select four samples. In certain exemplary embodiments, the controller 235 uses a BSA to select the location for the samples of I-values and/or Q-values.

In block 2510, the controller 235 communicates the samples to the I/Q modulator 230 and the I/Q modulator applies each of the samples one at a time. In block 2520, the controller 235 obtains a feedback value, such as a "receive signal quality indicator," for each of the applied samples and stores each feedback value and the corresponding sample I and Q values in the memory device 760. In certain exemplary embodiments, the controller 235 receives a "receive signal quality indicator" for each sample from the receiver 135.

In block 2520, the controller 235 compares the stored feedback values and identifies the better feedback value. For example, in FIG. 26, the controller 235 identifies point X1 as resulting in the better feedback value. Let point X1 have an I and Q value of $(I_1, Q_1)$ and a feedback value of $Y_1$.

In block 2525, with a preset step size, "STEP," (e.g., STEP=most significant bit (MSB) of the I-value or Q-value or the MSB/2 or the MSB/4) the controller 235 selects another two points around point X1 by varying the I-value. For example, the controller 235 may select points X2 (e.g., $I_1$+STEP, $Q_1$) and X3 (e.g., $I_1$−STEP, $Q_1$). The controller 235 communicates the samples X2 and X3 to the I/Q modulator 230 and the I/Q modulator 230 applies the settings for the samples X2 and X3 one at a time. For each sample, the controller 235 receives a feedback value, for example from the receiver 135. Let the feedback value for X2 be $Y_+$ and the feedback value for X3 be $Y_-$.

In block 2530, the controller 235 computes another sample point based on dual slope. In certain exemplary embodiments, the controller 235 computes another sample using SLOPE=$(Y_+-Y_1)$/STEP. This equation represents the slope of a straight line 2610 connecting points X2 and X1. Another straight line 2615 is illustrated in FIG. 26 extending from point X3 and having a slope opposite the line 2610. The lines 2610 and 2615 intersect at point 2620.

In block 2530, the controller computes the next I-value for point 2620 using: $I_2=I_1-STEP*(Y_+-Y_-)/(Y_+-Y_1)$. In block 2535, the controller communicates I and Q values of $(I_2, Q_1)$ to the I/Q modulator 230 and the I/Q modulator 230 applies the I and Q values. In block 2540, the controller 235 receives a feedback value for $(I_2, Q_1)$ and stores the feedback value in the memory device 760. Let the feedback value for $(I_2, Q_1)$ be $Y_2$.

In block 2545, with the preset step size, "STEP," the controller 235 selects another two points around point X1 by varying the Q-value from point $(I_2, Q_1)$. For example, the controller 235 may select points $(I_2, Q_1+STEP)$ and $(I_2, Q_1-STEP)$. The controller 235 communicates the samples to the I/Q modulator 230 and the I/Q modulator 230 applies the settings for the samples one at a time. For each sample, the controller 235 receives a feedback value. Let the feedback value for $(I_2, Q_1+STEP)$ be $Y_+$ and the feedback value for $(I_2, Q_1-STEP)$ be $Y_-$.

In block 2550, the controller 235 computes: $Q2=Q1-STEP*(Y_+-Y_-)/(Y_+-Y_2)$. In block 2555, the controller 235 communicates I and Q values of $(I_2, Q_2)$ to the I/Q modulator 230 and the I/Q modulator 230 applies the I and Q values. In block 2560, the controller 235 receives a feedback value for $(I_2, Q_2)$ and stores the feedback value in the memory device 760. Let the feedback value for $(I_2, Q_2)$ be Y3.

In block 2565, the controller 235 reduces the size of STEP. In this exemplary embodiment, the size of STEP is halved. However, other (e.g., less conservative) reduction sizes are also feasible. In block 2570, the controller 235 conducts an inquiry to determine whether the size of STEP is less than a threshold, "$STEP_{END}$." If the size of STEP is less than $STEP_{END}$, then the DSA 2500 proceeds to block 2580, where the controller 235 initiates an MSA (e.g., MSA 2200) using $(I_2, Q_2)$ as a starting point. If the size of STEP is not less than $STEP_{END}$, then the method 2500 proceeds to block 2575. In block 2575, the controller 235 assigns the I2, Q2, and Y2 values to I1, Q1, and Y1, respectively. After block 2575, the DSA 2500 returns to block 2525.

The exemplary DSA 2500 can be particularly useful when there are local preferred cancellation points with one global preferred cancellation point. The local preferred cancellation points refer to I and Q values where their feedback values are "locally" preferred. For example, an MSA, such as MSA 2200, would not jump outside the area proximal to the local preferred cancellation point. Implementing the DSA 2500 for upper bits, the controller 235 could avoid getting stuck with those local preferred cancellation points, while the MSA 2200 could finely tune to find the globally preferred cancellation point.

Figure 27:
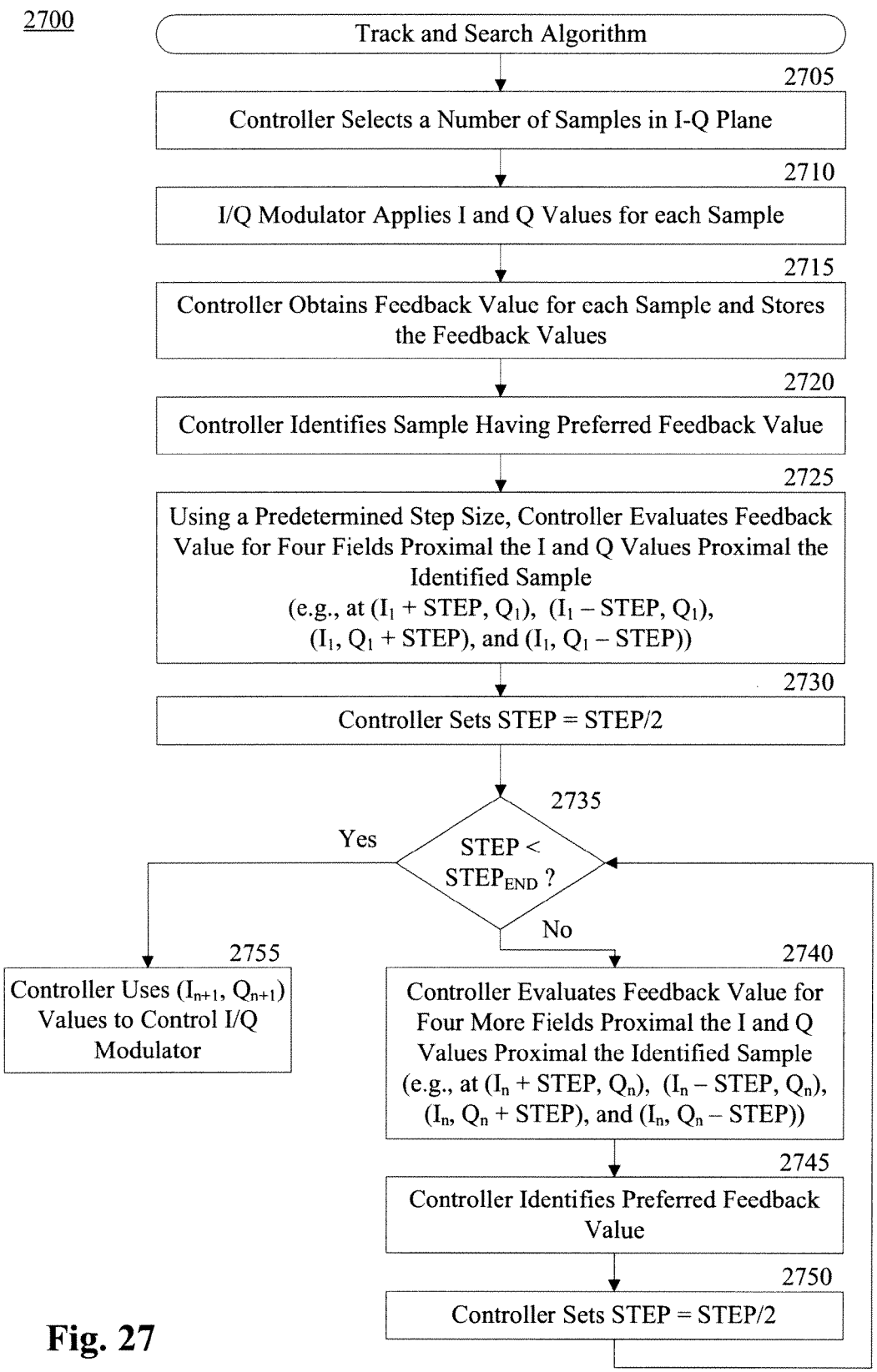
FIG. 27 is a flow chart depicting a track and search algorithm (TSA) for canceling noise and/or interference, in accordance with certain exemplary embodiments.
Figure 28:
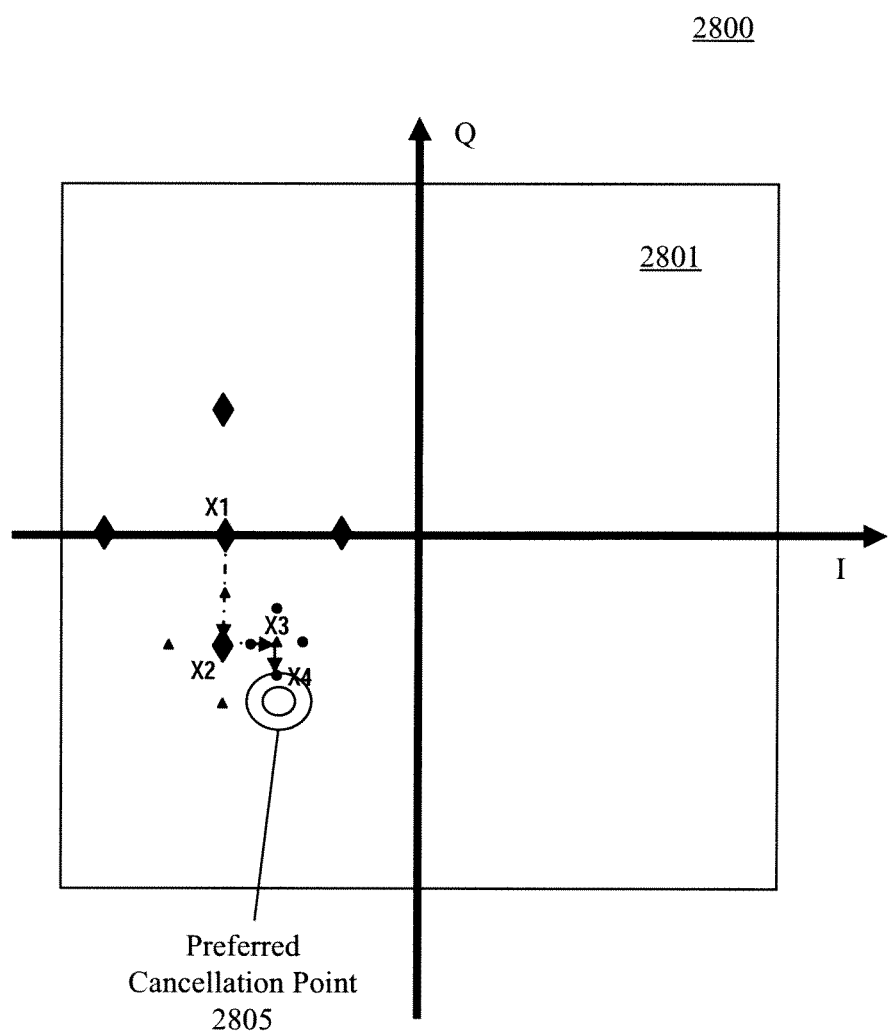
FIG. 28 is a graph depicting cancellation points along an I-Q plane evaluated in an implementation of the TSA of FIG. 27, in accordance with certain exemplary embodiments.

FIG. 27 is a flow chart depicting a TSA 2700 for canceling noise and/or interference, in accordance with certain exemplary embodiments. FIG. 28 is a graph 2800 depicting cancellation points along an I-Q plane 2801 evaluated in an implementation of the TSA of FIG. 27, in accordance with certain exemplary embodiments. Referring to FIGS. 27 and 28, in block 2705, the controller 235 selects a number (e.g., 4) of samples in the I-Q plane 2801. In certain exemplary embodiments, the controller 235 uses the BSA to select the location in the I-Q plane 2801 for the samples.

In block 2710, the controller 235 communicates the settings for the selected samples to the I/Q modulator 230 and the I/Q modulator 230 applies the settings for each sample one at a time. In block 2715, the controller 235 receives, for each sample, a feedback value (e.g., from the receiver 135) and stores the feedback value and its corresponding setting in the memory device 760. In block 2720, the controller 235 compares the feedback value and identifies the better or preferred feedback value. Let X1 in FIG. 28 be the sample resulting in the preferred feedback value.

In block 2725, with a predetermined step size, "STEP," (e.g., STEP=MSB/2 or MSB/4) the controller 235 selects another four samples proximal to X1. For example, the controller 235 may select $(I_1+STEP, Q_1)$, $(I_1-STEP, Q_1)$, $(I_1, Q_1+STEP)$, and $(I_1, Q_1-STEP)$. The controller 235 communicates the four settings to the I/Q modulator 230 and the I/Q modulator 230 applies the settings for each sample one at a time. The controller 235 receives a feedback value for each sample and stores the feedback value for each sample and the settings for each sample in the memory device 760. The controller 235 compares the feedback values for the four samples and identifies the preferred feedback value. Let X2 in FIG. 28 be the sample resulting in the preferred feedback value.

In block 2730, the controller 235 reduces the size of STEP. In this exemplary embodiment, the size of STEP is halved. Other size reductions are also feasible. In block 2735, the controller 235 conducts an inquiry to determine whether the size of STEP is less than a threshold, "$STEP_{END}$." If the size of STEP is less than $STEP_{END}$, then the TSA 2700 proceeds to block 2755, where the controller 235 uses the setting $(I_{n+1}, Q_{n+1})$ to control the I/Q modulator 230. If only one iteration of the TSA is performed, then the controller 235 uses the settings for the sample corresponding to the preferred feedback value in block 2725 to control the I/Q modulator 230. If the size of STEP is not less than $STEP_{END}$, then the TSA 2700 proceeds to block 2740.

In block 2740, the controller 235 selects another four samples proximal to the sample having the best stored feedback value. If it is the first iteration, the sample is X2 with ($I_2$, $Q_2$). This sample is designated as Xn as block 2740 may be executed multiple times. For example, the controller 235 selects samples ($I_n$+STEP, $Q_n$), ($I_n$–STEP, $Q_n$), ($I_n$, $Q_n$+STEP), ($I_n$, $Q_n$–STEP). The controller 235 communicates the four settings to the I/Q modulator 230 and the I/Q modulator 230 applies the settings for each sample one at a time. The controller 235 receives a feedback value for each sample and stores the feedback value for each sample and the settings for each sample in the memory device 760. In block 2745, the controller 235 compares the feedback values for the four samples and identifies the preferred feedback value. In block 2750, the controller 235 reduces the size of STEP and the TSA returns to block 2735. FIG. 28 illustrates the TSA 2700 employing four iterations, represented by points X1-X4, that identifies a preferred cancellation point 2815 in the I-Q plane 2801.

The exemplary TSA 2700 can be particularly useful when searching for an improved cancellation point and corresponding I/Q setting based on a previously preferred cancellation point, for example in response to a change in temperature. In such scenarios, the block 2705 can be adapted to use the previous preferred I/Q setting rather than selecting four samples. The TSA 2700 can narrow the field of search to the area in the I-Q plane 2801 near the previously preferred cancellation point.

Individual algorithms (e.g., BSA, FBA, BCA, MSA, DSA, and TSA) discussed above may be implemented as a standalone algorithm to decide acceptable I and Q values. Or, multiple ones of the algorithms can be employed together to increase the speed of the evaluation and attain a desired accuracy. For example, the BSA can be executed to determine either the first MSB or first MSB and second MSB of both I and Q values. Following the BSA, the FBA or BCA can be executed to determine the middle few bits of both I and Q values. Finally, the MSA can be executed to finely tune both I and Q values to achieve a better feedback value and thus, better noise or interference cancellation.

Multiple iterations of the algorithms can be executed and/or the algorithms can be executed for longer periods of time to achieve better results. In certain exemplary embodiments, algorithms used for fine tuning (e.g., MSA and TSA) are employed in an always "on" mode where the controller 150 continues to execute the algorithms while the noise canceller is in normal operation. This enables the controller 150 to adjust the settings of the noise canceller to account for environmental changes, such as changes in temperature or operating conditions. In addition, noise cancellers operating in parallel can each execute one or more of the algorithms simultaneously or sequentially.

Figure 29:
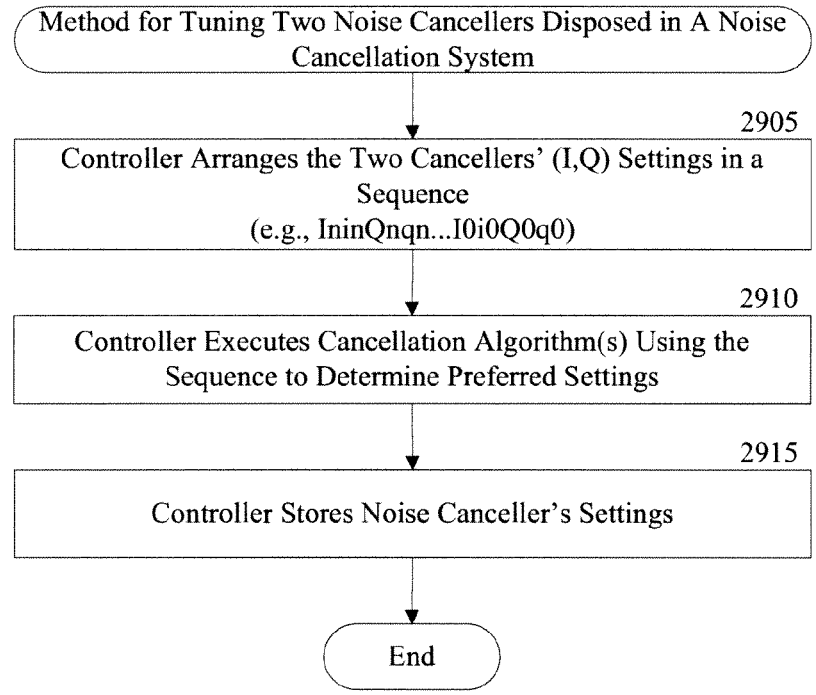
FIG. 29 is a flow chart depicting a method for finding a preferred noise cancellation point for two noise cancellers disposed in a communication system, in accordance with certain exemplary embodiments.

FIG. 29 is a flow chart depicting a method 2900 for finding a preferred noise cancellation point for two noise cancellers disposed in a communication system, such as the communication system 100, in accordance with certain exemplary embodiments. For example, the communication system 100 may include, in alternative embodiments, two HIPCF cancellers 130 in parallel.

In block 2905, a control device, such as the controller 235 of one of two HIPCF canceller 130, arranges the (I, Q) settings for the two cancellers in a sequence. For example, this sequence may be arranged as: (IninQnqn . . . I0i0Q0q0) with In . . . I0 and Qn . . . Q0 designating (I,Q) settings for a first canceller and in . . . i0 and qn . . . q0 designating IQ settings for a second canceller. The control device can then treat the two cancellers as a single canceller having the arranged sequence.

In block 2910, the control device executes one or more of the cancellation algorithms discussed above (e.g., BSA, FBA, BCA, MSA, DSA, or TSA) using the sequence to determine a preferred cancellation setting for the cancellers. In block 2915, the control device stores the preferred cancellation settings in memory.

Figure 30:
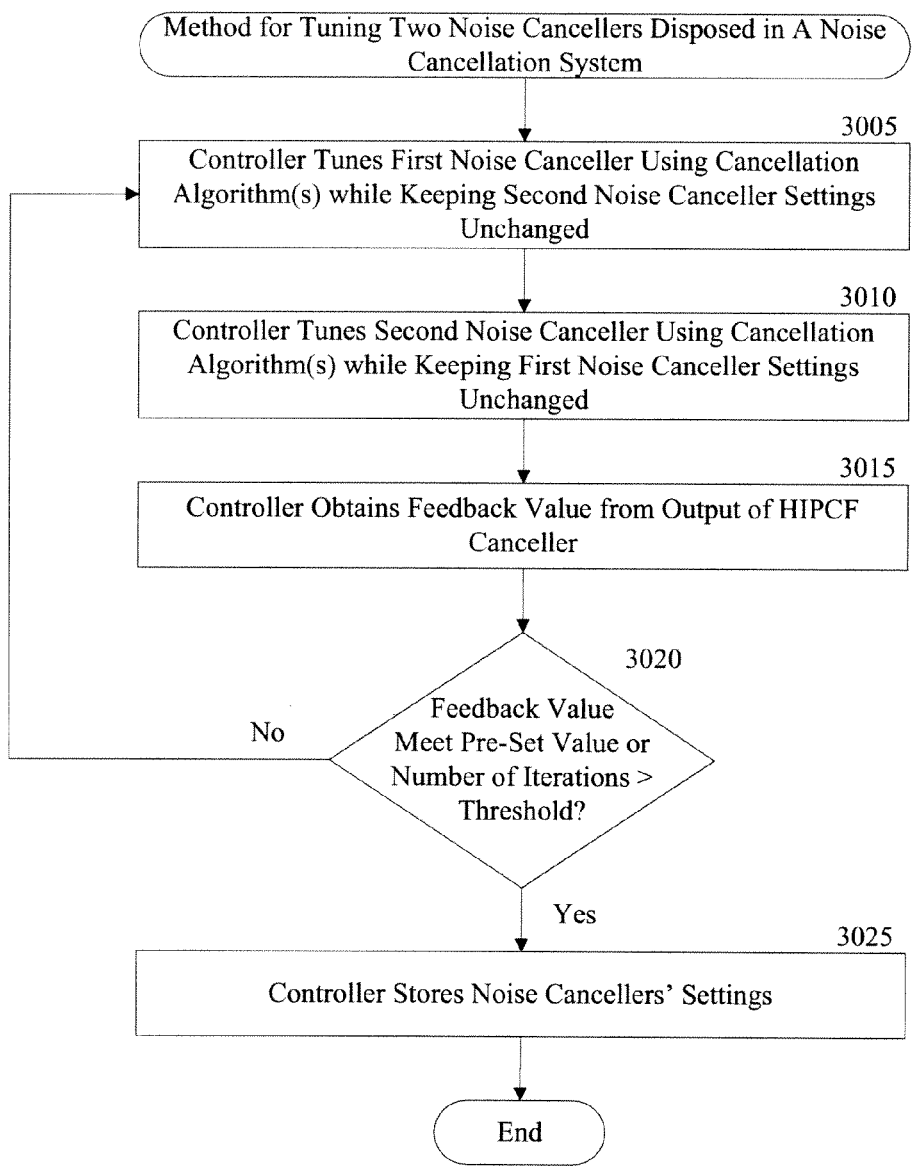
FIG. 30 is a flow chart depicting a method for finding a preferred noise cancellation point for two noise cancellers disposed in a communication system, in accordance with certain exemplary embodiments.

FIG. 30 is a flow chart depicting an alternative method 3000 for finding a preferred noise cancellation point for two noise cancellers disposed in a communication system, in accordance with certain exemplary embodiments. In block 3005, a control device, such as the controller 235 of one of the two noise cancellers, finds a preferred cancellation point for one of the two noise cancellers while the settings for the second of the two noise cancellers remain unchanged. One of the cancellation algorithms discussed above (e.g., BSA, FBA, BCA, MSA, DSA, or TSA) can be used to find the preferred noise cancellation point for the first noise canceller.

In block 3010, the control device finds a preferred cancellation point for the second noise canceller using one or more of the cancellation algorithms (e.g., BSA, FBA, BCA, MSA, DSA, or TSA) while the settings for the first noise canceller remain unchanged at the preferred cancellation point found during execution of block 3005. In block 3015, with both cancellers operating using their respective preferred cancellation points, the control device obtains a feedback value resulting from the two noise cancellers. In block 3020, the control device compares the obtained feedback value to a preset threshold value. If the feedback value is better than the threshold or the method 3000 has ran for more than a preset number of iterations, the method 3000 proceeds to block 3025. Otherwise, the method returns to block 3005 with the current (I, Q) settings for both cancellers as starting values for the algorithm(s). In block 3025, the control device stores the settings for the two noise cancellers and controls the noise cancellers using the settings.

Figure 31:
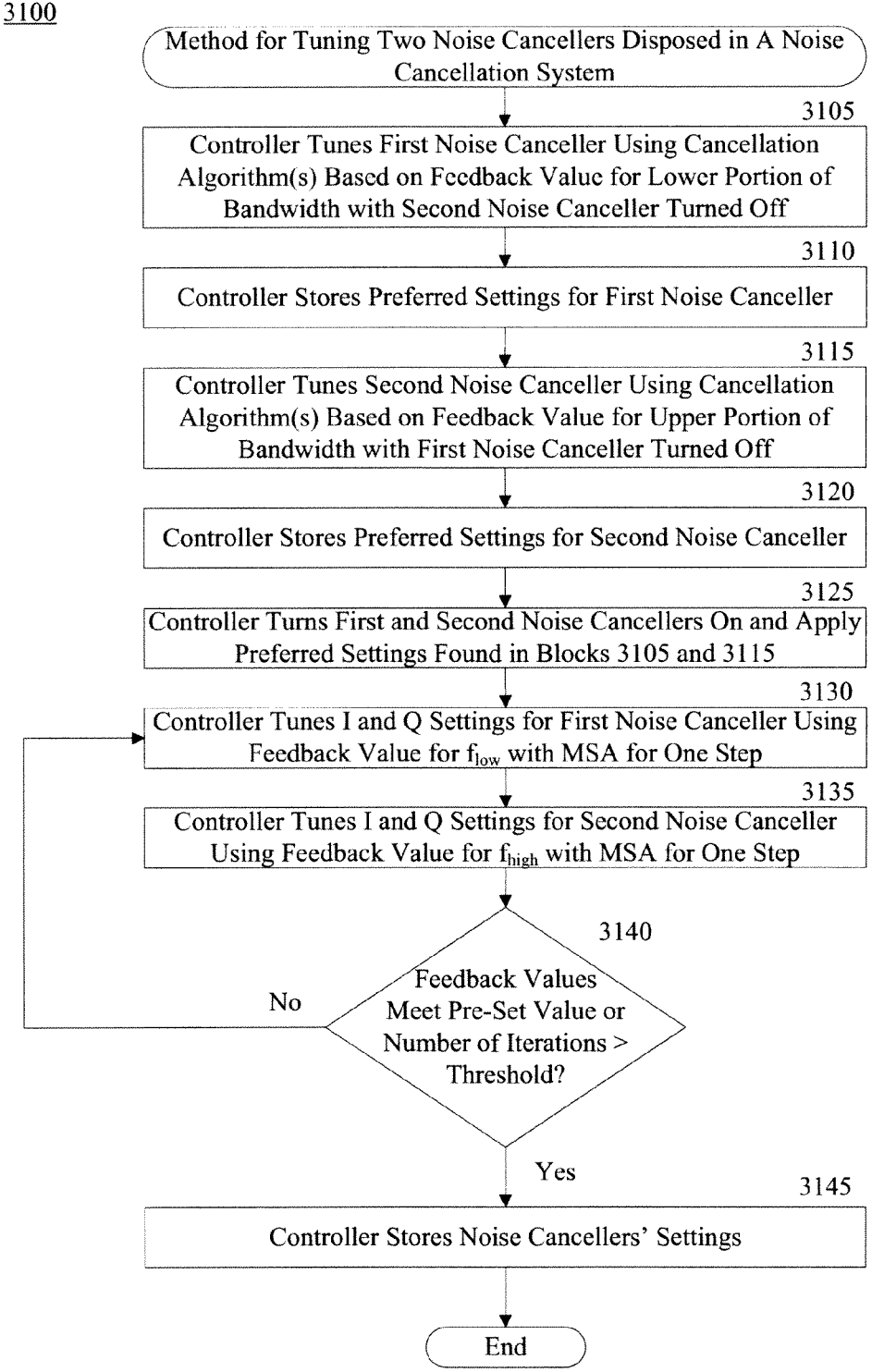
FIG. 31 is a flow chart depicting a method for finding a preferred noise cancellation point for two noise cancellers disposed in a communication system, in accordance with certain exemplary embodiments.

FIG. 31 is a flow chart depicting an alternative method 3100 for finding a preferred noise cancellation point for two noise cancellers disposed in a communication system, in accordance with certain exemplary embodiments. This method 3100 addresses implantations where two noise cancellers are used to increase cancellation bandwidth.

In block 3105, a control device, such as the controller 235 of one of the two noise cancellers, finds a preferred cancellation setting (e.g., (I, Q) settings) for the first of the two noise cancellers based on a feedback value for a lower portion of bandwidth while the second noise canceller is turned off. In block 3110, the control device stores the preferred noise cancellation setting for the first noise canceller.

In block 3115, the control device finds a preferred cancellation setting (e.g., (I, Q) settings) for the second of the noise cancellers based on a feedback value for an upper portion of bandwidth while the first noise canceller is turned off. In block 3120, the control device stores the preferred noise cancellation setting for the second noise canceller.

In block 3125, the control device turns both noise cancellers on and applies the respective preferred cancellation setting to each of the two noise cancellers. In block 3130, the control device executes an MSA for one step on the first noise canceller for the lower portion of the bandwidth. In block 3135, the control device executes an MSA for one step on the second noise canceller for the upper portion of the bandwidth.

In block 3140, the control device obtains a feedback value for the noise cancellers and compares the feedback value to a preset value. If the feedback value is greater than the preset value or if blocks 3130 and 3135 have been executed for more than a preset number of iterations, the method 3100 proceeds to block 3145. Otherwise, the method 3100 returns to block 3130. In block 3145, the control device stores the final settings in memory and controls the noise cancellers using the final settings. Although the methods 2900, 3000, 3100 are depicted and described in terms of determining preferred cancellation points for two noise cancellers, each method 2900, 3000, 3100 could also be employed to determine preferred cancellation points for any number of noise cancellers. For example, the methods 2900, 3000, 3100 could be employed to find preferred cancellation points for three or more noise cancellers arranged in parallel. Although the methods 2900, 3000, and 3100 are depicted to find the preferred or improved cancellation points for two noise cancellers, each method 2900, 3000, 3100 could also be employed to find the preferred or improved cancellation points for more than two noise cancellers, for example three or more noise cancellers.

In summary, a communication system in accordance with certain exemplary embodiments of the present invention can comprise a transmitter that communicates information at a first frequency, a receiver that receives communication signals at a second frequency that may be the same or near the first frequency, and an interference suppression device that cancels, corrects, addresses, or compensates for interference, EMI, noise, spurs, or other unwanted spectral components imposed onto the receiver by signals transmitted by the transmitter. The interference suppression device can be coupled to a transmit path of the transmitter (e.g., at the output of the transmitter's power amplifier) to obtain a sample of the transmitted signals. The interference compensation circuit can include a plurality of filters, such as band-pass filters, that block or suppress signals outside the frequency band of the receiver while passing noise or other interference signals within the frequency band of the receiver. The interference compensation circuit also can include an I/Q modulator that generates an interference compensation signal using the signal output by the filters. This interference compensation signal can have an amplitude the same as or close to the amplitude of the noise and a phase shift of 180 degrees relative to interference. These parameters are tuned in using a "receive signal quality indicator" feedback from the victim receiver. The interference compensation signal generated by the I/Q modulator is applied to a receive path of the receiver to cancel or suppress the interference imposed on the receiver by the transmitted signals.

The communication systems described herein can be embodied in various communication devices, including cellular telephones, mobile computers, PDAs, personal navigation devices (e.g., GPS devices), or any other communication device comprising two or more communication elements. For example, the communication system can be embodied in a smartphone having a LTE/CDMA/GSM transceiver and a mobile TV tuner. Another example is a smartphone having a GSM/PCS/DCS/W-CDMA transceiver and a GPS receiver. Yet another example includes a notebook computer having a WLAN transceiver and a WiMAX or Bluetooth transceiver.

In a mobile device embodiment, the two or more communication elements may communicate via two or more antennas with little spatial separation. Thus, signals transmitted by the two or more communication elements may impose interference on each other. To suppress or cancel this interference, a HIPCF canceller as described above can be employed in each communication direction. That is, a first HIPCF canceller can cancel or suppress interference imposed on a first of the two or more communication elements by a second of the two or more communication elements, while a second HIPCF canceller cancels or suppresses interference imposed on the second of the two or more communication elements by the first of the two or more communication elements. Certain components of both HIPCF cancellers can be fabricated on a single integrated circuit or on multiple integrated circuits, such as one or more CMOS circuits.

Embodiments of the invention can be used with computer hardware and software that perform the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claim(s), the scope of which is to be accorded the broadest interpretation so as to encompass such modifications and equivalent structures.

What is claimed is:

1. A method for determining a noise cancellation control setting for generating an interference compensation signal, the method comprising:
   (a) generating the interference compensation signal based at least on the control setting, wherein the control setting comprises an in-phase setting and a quadrature phase setting;
   (b) applying the interference compensation signal to an input signal path of a receiver;
   (c) receiving a feedback signal comprising a feedback value indicative of a level of interference imposed on the input signal path;
   (d) storing the feedback value and the control setting;
   (e) adjusting, by the controller, the control setting;
   (f) repeating (a) through (e) for a plurality of iterations, thereby storing a plurality of feedback values and a plurality of control settings, wherein adjusting the control setting comprises alternating between adjusting the in-phase setting and adjusting the quadrature phase setting for each of the iterations by inverting one or more bits of a first set of binary bits associated with the in-phase setting, and inverting one or more bits of a second set of binary bits associated with the quadrature phase setting; and
   (g) determining which one of the plurality of stored feedback values is preferred.

2. The method of claim 1, wherein generating the interference compensation signal comprises adjusting at least one of a phase, an amplitude, and a delay of a sample of a signal imposing interference on the input signal path based on the control setting.

3. The method of claim 1, wherein the feedback signal is received from the receiver and wherein the feedback value comprises one of a receive signal strength indicator, a bit-error-rate, a packet-error-rate, a noise floor, a signal to noise ratio, an error vector magnitude, a position accuracy, an adjacent channel leakage ratio, and an amplifier gain.

4. The method of claim 1, wherein the in-phase setting comprises the first set of binary bits corresponding to an in-phase value and the quadrature phase setting comprises the second set of binary bits corresponding to a quadrature value.

5. The method of claim 1, wherein the control setting is adjusted based on a previously received feedback value.

6. A method for determining a noise cancellation control setting for a noise cancellation device operable to generate an interference compensation signal based on the control setting, the control setting comprising an in-phase parameter and a quadrature parameter, the method comprising:
  receiving a first feedback value indicative of a first level of interference in response to applying the interference compensation signal to an input signal path of an electrical device;
  searching for an improved control setting by sequentially adjusting, one at a time in an alternating manner, the in-phase parameter and the quadrature parameter of the control setting until a stop condition is met, wherein the in-phase parameter and the quadrature parameter are adjusted sequentially in the alternating manner by:
    inverting one or more bits of the in-phase parameter; and
    inverting one or more bits of the quadrature parameter;
  for each adjustment to the in-phase parameter and each adjustment to the quadrature parameter:
    generating an updated interference compensation signal based on the adjusted control setting and receiving an updated feedback value in response to applying the updated interference compensation signal to the input signal path;
    determining whether the updated feedback value is preferred over a previous feedback value; and
    in response to a determination that the updated feedback value is preferred over the previous feedback value, using the adjusted control setting in a subsequent adjustment; and
  in response to the stop condition being met, operating the noise cancellation device using the adjusted control setting.

7. The method of claim 6, wherein generating the updated interference compensation signal comprises adjusting at least one of phase, amplitude, and delay of a sample of a signal imposing interference on the electrical device based on the adjusted control setting.

8. The method of claim 6, wherein the electrical device comprises a receiver, wherein the feedback value is received from the receiver, and wherein the feedback value comprises one of a receive signal strength indicator, a bit-error-rate, a packet-error-rate, a noise floor, a signal to noise ratio, an error vector magnitude, a position accuracy, an adjacent channel leakage ratio, and an amplifier gain.

9. The method of claim 6, wherein the stop condition comprises a number of iterations.

10. The method of claim 6, further comprising:
  comparing each updated feedback value to a threshold feedback value; and
  determining that the stop condition has been reached in response to one of the updated feedback values meeting or exceeding the threshold feedback value.

11. The method of claim 6, wherein after each adjustment, proceeding from the one or more bit of the in-phase parameter to a lower significant one or more bits of the in-phase parameter and proceeding from the one or more bit of the quadrature parameter to a lower significant one or more bits of the quadrature parameter.

12. The method of claim 6, wherein the in-phase parameter and the quadrature parameter are adjusted sequentially in an alternating manner by:
  incrementing the in-phase parameter;
  determining whether the incremented in-phase parameter results in an improved feedback value;
  in response to a determination that the incremented in-phase parameter did not result in an improved feedback value, decrementing the in-phase parameter;
  determining whether the decremented in-phase parameter results in an improved feedback value;
  incrementing the quadrature parameter;
  determining whether the incremented quadrature parameter results in an improved feedback value;
  in response to a determination that the incremented quadrature parameter did not result in an improved feedback value, decrementing the quadrature parameter; and
  determining whether the decremented quadrature parameter results in an improved feedback value.

13. The method of claim 6, wherein the in-phase parameter and the quadrature parameter are adjusted sequentially in an alternating manner by:
  decrementing the in-phase parameter;
  determining whether the decremented in-phase parameter results in an improved feedback value;
  in response to a determination that the decremented in-phase parameter did not result in an improved feedback value, incrementing the in-phase parameter;
  determining whether the incremented in-phase parameter results in an improved feedback value;
  decrementing the quadrature parameter;
  determining whether the decremented quadrature parameter results in an improved feedback value;
  in response to a determination that the decremented quadrature parameter did not result in an improved feedback value, incrementing the quadrature parameter; and
  determining whether the incremented quadrature parameter results in an improved feedback value.

14. A method for determining a control setting for a noise cancellation device operative to generate an interference compensation signal based on the control setting, the interference compensation signal operative to suppress interference imposed on a receiver in response to the interference compensation signal being applied to an input signal path of the receiver, the control setting comprising an in-phase parameter and a quadrature parameter, the method comprising:
  receiving a first feedback value indicative of a first level of interference in response to applying the interference compensation signal to the input signal path;
  searching for an improved control setting by sequentially adjusting, one at a time in an alternating manner, the in-phase parameter and the quadrature parameter until a stop condition is met, each adjustment comprising:
    incrementing one of the in-phase parameter and the quadrature parameter to generate a first adjusted control setting, generating a first updated interference compensation signal based on the first adjusted control setting, and receiving a first updated feedback value in response to applying the first updated interference compensation signal to the input signal path;
    decrementing one of the in-phase parameter and the quadrature parameter to generate a second adjusted control setting, generating a second updated interference compensation signal based on the second adjusted control setting, and receiving a second updated feedback value in response to applying the second updated interference compensation signal to the input signal path;
determining which one of the first updated feedback value, the second feedback value, and a previous feedback value is preferred; and
using the control setting resulting in the one preferred feedback value for a subsequent adjustment.

15. The method of claim 14, wherein generating each interference compensation signal comprises adjusting at least one of phase, amplitude, and delay of a sample of a signal causing the interference imposed on the receiver based on the control setting.

16. The method of claim 14, wherein the feedback value is received from the receiver and wherein the feedback value comprises one of a receive signal strength indicator, a bit-error-rate, a packet-error-rate, a noise floor, a signal to noise ratio, an error vector magnitude, a position accuracy, an adjacent channel leakage ratio, and an amplifier gain.

17. The method of claim 14, wherein incrementing one of the in-phase parameter and the quadrature parameter comprises incrementing the one in-phase parameter or quadrature parameter by a preset step size.

18. The method of claim 14, wherein decrementing one of the in-phase parameter and the quadrature parameter comprises decrementing the one in-phase parameter or quadrature parameter by a preset step size.

19. The method of claim 14, wherein the stop condition comprises a number of iterations.

20. The method of claim 14, further comprising:
comparing each feedback value to a threshold feedback value; and
determining that the stop condition has been reached in response to one of the feedback values meeting or exceeding the threshold feedback value.

21. A method for determining a noise cancellation control setting for generating an interference compensation signal, the method comprising:
(a) identifying one of a plurality of control settings as preferred for interference suppression, each control setting comprising an in-phase parameter and a quadrature parameter;
(b) storing the identified control setting;
(c) generating a first updated control setting and a second updated control setting, the first updated control setting comprising the quadrature parameter of the stored control setting and an incremented in-phase value comprising the in-phase value of the stored control setting incremented by a step size, the second updated control setting comprising the quadrature parameter of the stored control setting and a decremented in-phase value comprising the in-phase value of the stored control setting decremented by the step size;
(d) receiving a first feedback value corresponding to the first updated control setting and a second feedback value corresponding to the second updated control setting;
(e) generating an updated in-phase value based on the first updated control setting, the second updated control setting, the first feedback value, and the second feedback value using a dual-slope equation;
(f) generating a third updated control setting and a fourth updated control setting, the third updated control setting comprising the updated in-phase parameter and an incremented quadrature value comprising the quadrature value of the stored control setting incremented by a step size, the fourth updated control setting comprising the updated in-phase parameter of the stored control setting and a decremented quadrature value comprising the quadrature value of the stored control setting decremented by the step size;
(g) receiving a third feedback value corresponding to the third updated control setting and a fourth feedback value corresponding to the fourth updated control setting;
(h) generating an updated quadrature value based on the third updated control setting, the fourth updated control setting, the third feedback value, and the fourth feedback value using a dual-slope equation;
(i) reducing the value of the step size; and
(j) repeating (b) through (i) until a stop condition is met.

22. A method for determining a control setting for each of a plurality of noise cancellation devices, the plurality of noise cancellation devices configured to generate an interference compensation signal based on the control setting, the interference compensation signal operative to suppress interference imposed on a receiver in response to the interference compensation signal being applied to an input signal path of the receiver, each control setting comprising an in-phase value and a quadrature value, the method comprising:
creating a combined control setting for the noise cancellation devices comprising a combined in-phase value and a combined quadrature value, the combined in-phase value comprising the in-phase value for each control setting arranged in a sequence, the combined quadrature value comprising the quadrature value for each control setting arranged in a sequence; and
searching for a preferred combined control setting by modifying the combined control setting according to at least one computer program until a stop condition is met, wherein modifying the combined control setting comprises sequentially adjusting each of the combined in-phase value and the combined quadrature value in an alternating manner by inverting one or more bits of the combined in-phase value, and inverting one or more bits of the combined quadrature value;
for each modification to the combined control setting:
applying, to each noise cancellation device, the in-phase value and quadrature value of the modified combined control setting corresponding to the noise cancellation device;
generating an interference compensation signal by the noise cancellation devices;
receiving a feedback value indicative of a level of the interference in response to applying the interference compensation signal to the input signal path; and
storing the feedback value; and
in response to the stop condition being met, identifying which one of the stored feedback values results in preferred suppression of interference imposed on the receiver.

23. A method for determining a noise cancellation control setting for a noise cancellation device operable to generate an interference compensation signal based on the control setting, the control setting comprising an in-phase parameter and a quadrature parameter, the method comprising:
receiving a first feedback value indicative of a first level of interference in response to applying the interference compensation signal to an input signal path of an electrical device;
searching for an improved control setting by sequentially adjusting, one at a time in an alternating manner, the in-phase parameter and the quadrature parameter of the control setting until a stop condition is met, wherein the in-phase parameter and the quadrature parameter are adjusted sequentially in the alternating manner by:
incrementing the in-phase parameter;
determining whether the incremented in-phase parameter results in an improved feedback value;
in response to a determination that the incremented in-phase parameter did not result in an improved feedback value, decrementing the in-phase parameter;
determining whether the decremented in-phase parameter results in an improved feedback value;
incrementing the quadrature parameter;
determining whether the incremented quadrature parameter results in an improved feedback value;
in response to a determination that the incremented quadrature parameter did not result in an improved feedback value, decrementing the quadrature parameter; and
determining whether the decremented quadrature parameter results in an improved feedback value;
for each adjustment to the in-phase parameter and each adjustment to the quadrature parameter:
generating an updated interference compensation signal based on the adjusted control setting and receiving an updated feedback value in response to applying the updated interference compensation signal to the input signal path;
determining whether the updated feedback value is preferred over a previous feedback value; and
in response to a determination that the updated feedback value is preferred over the previous feedback value, using the adjusted control setting in a subsequent adjustment; and
in response to the stop condition being met, operating the noise cancellation device using the adjusted control setting.

24. A method for determining a noise cancellation control setting for a noise cancellation device operable to generate an interference compensation signal based on the control setting, the control setting comprising an in-phase parameter and a quadrature parameter, the method comprising:
receiving a first feedback value indicative of a first level of interference in response to applying the interference compensation signal to an input signal path of an electrical device;
searching for an improved control setting by sequentially adjusting, one at a time in an alternating manner, the in-phase parameter and the quadrature parameter of the control setting until a stop condition is met, wherein the in-phase parameter and the quadrature parameter are adjusted sequentially in the alternating manner by:
decrementing the in-phase parameter;
determining whether the decremented in-phase parameter results in an improved feedback value;
in response to a determination that the decremented in-phase parameter did not result in an improved feedback value, incrementing the in-phase parameter;
determining whether the incremented in-phase parameter results in an improved feedback value;
decrementing the quadrature parameter;
determining whether the decremented quadrature parameter results in an improved feedback value;
in response to a determination that the decremented quadrature parameter did not result in an improved feedback value, incrementing the quadrature parameter; and
determining whether the incremented quadrature parameter results in an improved feedback value;
for each adjustment to the in-phase parameter and each adjustment to the quadrature parameter:
generating an updated interference compensation signal based on the adjusted control setting and receiving an updated feedback value in response to applying the updated interference compensation signal to the input signal path;
determining whether the updated feedback value is preferred over a previous feedback value; and
in response to a determination that the updated feedback value is preferred over the previous feedback value, using the adjusted control setting in a subsequent adjustment; and
in response to the stop condition being met, operating the noise cancellation device using the adjusted control setting.

* * * * *